US007688841B2

(12) United States Patent  
Binder

(10) Patent No.: US 7,688,841 B2  
(45) Date of Patent: *Mar. 30, 2010

(54) MODULAR OUTLET

(75) Inventor: Yehuda Binder, Hasharon (IL)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 762 days.

This patent is subject to a terminal disclaimer.

(21) Appl. No.: 11/514,140

(22) Filed: Sep. 1, 2006

(65) Prior Publication Data

US 2007/0019669 A1 Jan. 25, 2007

Related U.S. Application Data

(63) Continuation of application No. 10/836,267, filed on May 3, 2004.

(30) Foreign Application Priority Data

Jul. 9, 2003 (IL) .................................. 157787

(51) Int. Cl.
*H04L 12/28* (2006.01)
*H04L 12/66* (2006.01)
*H04M 11/00* (2006.01)

(52) U.S. Cl. .................. 370/419; 370/356; 370/401; 370/463; 379/90.01; 379/93.01

(58) Field of Classification Search ......... 370/200–214, 370/352–467, 493–497; 379/90–93, 399–438; 725/78–81, 109–129

See application file for complete search history.

(56) References Cited

U.S. PATENT DOCUMENTS 2,320,400 A 6/1943 Bedell 3,730,980 A 5/1973 Kirk, Jr.
3,739,226 A 6/1973 Seiter et al.

(Continued)

FOREIGN PATENT DOCUMENTS

EP 0 241 152 10/1987

(Continued)

OTHER PUBLICATIONS

Grayson Evans, the CEBUs Standard User's Guide, 1st edition, May 1996, 317 pages.

(Continued)

*Primary Examiner*—Man Phan
(74) *Attorney, Agent, or Firm*—Browdy & Neimark, PLLC

(57) ABSTRACT

In conjunction with a wiring in a house carrying data network signal, a modular outlet comprising of a base module and interface module. The base module connects to the wiring and attached to a wall. The interface module provides a data unit connection. The interface module is mechanically attached to the base module and electrically connected thereto. The wiring may also carry basic service signal such as telephone, electrical power and cable television (CATV). In such a case, the outlet will provide the relevant connectivity either as part of the base module or as part of the interface module. Both proprietary and industry standard interfaces can be used to interconnect the module. Furthermore, a standard computer expansion card (such as PCI, PCMCIA and alike) may be used as interface module.

50 Claims, 42 Drawing Sheets

U.S. PATENT DOCUMENTS

| | | |
|---|---|---|
| 3,805,265 A | 4/1974 | Lester |
| 3,836,888 A | 9/1974 | Boenke et al. |
| 3,846,703 A | 11/1974 | Stewart et al. |
| 3,886,454 A | 5/1975 | Oakley et al. |
| 4,031,543 A | 6/1977 | Holz |
| 4,063,220 A | 12/1977 | Metcalfe et al. |
| 4,079,415 A | 3/1978 | Will |
| 4,303,993 A | 12/1981 | Panepinto, Jr. et al. |
| 4,343,042 A | 8/1982 | Schrock et al. |
| 4,362,905 A | 12/1982 | Ismail |
| 4,367,548 A | 1/1983 | Cotten, Jr. et al. |
| 4,413,229 A | 11/1983 | Grant |
| 4,484,185 A | 11/1984 | Graves |
| 4,484,218 A | 11/1984 | Boland et al. |
| 4,509,211 A | 4/1985 | Robbins |
| 4,512,025 A | 4/1985 | Frankel et al. |
| 4,512,033 A | 4/1985 | Schrock |
| 4,521,881 A | 6/1985 | Stapleford et al. |
| 4,538,174 A | 8/1985 | Gargini et al. |
| 4,551,721 A | 11/1985 | Kozlik |
| 4,623,920 A | 11/1986 | Dufresne et al. |
| 4,636,914 A | 1/1987 | Belli |
| 4,644,526 A | 2/1987 | Wu |
| 4,646,296 A | 2/1987 | Bartholet et al. |
| 4,647,725 A | 3/1987 | Dellinger et al. |
| 4,655,529 A | 4/1987 | Yokoyama |
| 4,750,094 A | 6/1988 | Krasik |
| 4,755,792 A | 7/1988 | Pezzolo et al. |
| 4,785,448 A | 11/1988 | Reichert et al. |
| 4,787,082 A | 11/1988 | Delaney et al. |
| 4,814,941 A | 3/1989 | Speet et al. |
| 4,835,343 A | 5/1989 | Graef et al. |
| 4,863,398 A | 9/1989 | Steenton et al. |
| 4,866,733 A | 9/1989 | Morishita |
| 4,875,881 A | 10/1989 | Caveny et al. |
| 4,885,803 A | 12/1989 | Hermann et al. |
| 4,891,694 A | 1/1990 | Way |
| 4,893,326 A | 1/1990 | Duran et al. |
| 4,896,349 A | 1/1990 | Kubo et al. |
| 4,901,218 A | 2/1990 | Cornwell |
| 4,912,721 A | 3/1990 | Pidgeon, Jr. et al. |
| 4,921,446 A | 5/1990 | DePatie et al. |
| 4,924,349 A | 5/1990 | Buehler et al. |
| 4,937,819 A | 6/1990 | King |
| 4,989,081 A | 1/1991 | Miyagawa et al. |
| 4,994,908 A | 2/1991 | Kuban et al. |
| 5,007,860 A | 4/1991 | Robinson et al. |
| 5,008,931 A | 4/1991 | Siemon et al. |
| 5,027,426 A | 6/1991 | Chiocca, Jr. |
| 5,036,168 A | 7/1991 | Kikuchi et al. |
| 5,064,386 A | 11/1991 | Dale et al. |
| 5,068,890 A | 11/1991 | Nilssen |
| 5,114,365 A | 5/1992 | Thompson et al. |
| 5,125,852 A | 6/1992 | Archer |
| 5,150,365 A | 9/1992 | Hirata et al. |
| 5,189,259 A | 2/1993 | Carson et al. |
| 5,221,814 A | 6/1993 | Colbaugh et al. |
| 5,239,540 A | 8/1993 | Rovira et al. |
| 5,243,627 A | 9/1993 | Betts et al. |
| 5,255,267 A | 10/1993 | Hansen et al. |
| 5,274,631 A | 12/1993 | Bhardwaj |
| 5,278,889 A | 1/1994 | Papanicolaou et al. |
| 5,321,736 A | 6/1994 | Beasley |
| 5,321,846 A | 6/1994 | Yokota et al. |
| 5,326,931 A | 7/1994 | Cain et al. |
| 5,334,975 A | 8/1994 | Wachob et al. |
| 5,343,240 A | 8/1994 | Yu |
| 5,356,311 A | 10/1994 | Liu |
| 5,384,428 A | 1/1995 | Luu |
| 5,402,902 A | 4/1995 | Bouley |
| 5,408,260 A | 4/1995 | Arnon |
| 5,418,328 A | 5/1995 | Nadeau |
| 5,418,559 A | 5/1995 | Blahut |
| 5,419,716 A | 5/1995 | Sciammarella et al. |
| 5,421,030 A | 5/1995 | Baran |
| 5,432,838 A | 7/1995 | Purchase et al. |
| 5,440,335 A | 8/1995 | Beveridge |
| 5,458,503 A | 10/1995 | Below |
| 5,473,517 A | 12/1995 | Blackman |
| 5,489,894 A | 2/1996 | Murray |
| 5,521,631 A | 5/1996 | Budow et al. |
| 5,539,449 A | 7/1996 | Blahut et al. |
| 5,539,821 A | 7/1996 | Blonder |
| 5,539,880 A | 7/1996 | Lakhani |
| 5,563,782 A | 10/1996 | Chen et al. |
| 5,570,355 A | 10/1996 | Dail et al. |
| 5,574,256 A | 11/1996 | Cottone |
| 5,574,964 A | 11/1996 | Hamlin |
| 5,581,555 A | 12/1996 | Dubberly et al. |
| 5,585,837 A | 12/1996 | Nixon |
| 5,586,121 A | 12/1996 | Moura et al. |
| 5,592,540 A | 1/1997 | Beveridge |
| 5,599,190 A | 2/1997 | Willette |
| 5,613,874 A | 3/1997 | Orlando et al. |
| 5,619,251 A | 4/1997 | Kuroiwa et al. |
| 5,634,191 A | 5/1997 | Beasley |
| 5,642,155 A | 6/1997 | Cheng |
| 5,647,045 A | 7/1997 | Robinson et al. |
| 5,658,166 A | 8/1997 | Freeman et al. |
| 5,666,293 A | 9/1997 | Metz et al. |
| 5,671,220 A | 9/1997 | Tonomura |
| 5,695,361 A | 12/1997 | Elisei |
| 5,700,978 A | 12/1997 | Huff |
| 5,708,705 A | 1/1998 | Yamashita et al. |
| 5,712,614 A | 1/1998 | Patel et al. |
| 5,719,858 A | 2/1998 | Moore |
| 5,719,872 A | 2/1998 | Dubberly et al. |
| 5,722,076 A | 2/1998 | Sakabe et al. |
| 5,729,824 A | 3/1998 | O'Neill et al. |
| RE35,774 E | 4/1998 | Moura et al. |
| 5,736,965 A | 4/1998 | Mosebrook et al. |
| 5,744,750 A | 4/1998 | Almond |
| 5,745,837 A | 4/1998 | Fuhrmann |
| 5,754,539 A | 5/1998 | Metz et al. |
| 5,760,822 A | 6/1998 | Coutinho |
| 5,767,895 A | 6/1998 | Yashiro et al. |
| 5,774,526 A | 6/1998 | Propp et al. |
| 5,777,769 A | 7/1998 | Coutinho |
| 5,793,265 A | 8/1998 | Spielman |
| 5,796,739 A | 8/1998 | Kim et al. |
| 5,801,635 A | 9/1998 | Price |
| 5,802,173 A | 9/1998 | Hamilton-Piercy et al. |
| 5,805,591 A | 9/1998 | Naboulsi et al. |
| 5,805,806 A | 9/1998 | McArthur |
| 5,812,184 A | 9/1998 | Martinez |
| 5,818,845 A | 10/1998 | Moura et al. |
| 5,822,677 A | 10/1998 | Peyrovian |
| 5,822,678 A | 10/1998 | Evanyk |
| 5,833,350 A | 11/1998 | Moreland |
| 5,841,360 A | 11/1998 | Binder |
| 5,845,190 A | 12/1998 | Bushue et al. |
| 5,847,751 A | 12/1998 | Safadi |
| 5,848,054 A | 12/1998 | Mosebrook et al. |
| 5,852,631 A | 12/1998 | Scott |
| 5,870,513 A | 2/1999 | Williams |
| 5,886,732 A | 3/1999 | Humpleman |
| 5,889,765 A | 3/1999 | Gibbs |
| 5,895,888 A | 4/1999 | Arenas et al. |
| 5,896,443 A | 4/1999 | Dichter |
| 5,896,556 A | 4/1999 | Moreland et al. |
| 5,900,584 A | 5/1999 | Cady et al. |
| 5,917,624 A | 6/1999 | Wagner |
| 5,919,060 A | 7/1999 | Lee |
| 5,923,361 A | 7/1999 | Sutton, Jr. |

| | | | | | | |
|---|---|---|---|---|---|---|
| 5,936,660 | A | 8/1999 | Gurantz | 6,449,291 B1 | 9/2002 | Burns et al. |
| 5,939,672 | A | 8/1999 | Tang | 6,452,923 B1 | 9/2002 | Gerszberg et al. |
| 5,946,047 | A | 8/1999 | Levan | 6,453,473 B1 | 9/2002 | Watson, Jr. |
| 5,946,048 | A | 8/1999 | Levan | 6,463,588 B1 | 10/2002 | Jenkins et al. |
| 5,953,344 | A | 9/1999 | Dail et al. | 6,473,609 B1 | 10/2002 | Schwartz et al. |
| 5,953,670 | A | 9/1999 | Newson | 6,474,829 B2 | 11/2002 | Clodfelter |
| 5,961,345 | A | 10/1999 | Finn et al. | 6,480,510 B1 | 11/2002 | Binder |
| 5,963,844 | A | 10/1999 | Dail | 6,481,013 B1 | 11/2002 | Dinwiddie et al. |
| 5,968,118 | A | 10/1999 | Sutton, Jr. | 6,492,897 B1 | 12/2002 | Mowery, Jr. |
| 5,982,363 | A | 11/1999 | Naiff | 6,493,875 B1 | 12/2002 | Eames et al. |
| 5,987,303 | A | 11/1999 | Dutta et al. | 6,513,163 B1 | 1/2003 | Silvia et al. |
| 6,005,189 | A | 12/1999 | Anker | 6,518,724 B2 | 2/2003 | Janik |
| 6,009,465 | A | 12/1999 | Decker et al. | 6,526,581 B1 | 2/2003 | Edson |
| 6,010,228 | A | 1/2000 | Blackman et al. | 6,535,480 B1 | 3/2003 | Bhagavath et al. |
| 6,014,386 | A | 1/2000 | Abraham | 6,546,017 B1 | 4/2003 | Khaunte |
| 6,028,860 | A | 2/2000 | Laubach et al. | 6,549,616 B1 | 4/2003 | Binder |
| 6,029,047 | A | 2/2000 | Ishida et al. | 6,553,568 B1 | 4/2003 | Fijolek et al. |
| 6,032,057 | A | 2/2000 | Kiiski | 6,560,319 B1 | 5/2003 | Binder |
| 6,052,380 | A | 4/2000 | Bell | 6,577,642 B1 | 6/2003 | Fijolek et al. |
| 6,055,242 | A | 4/2000 | Doshi et al. | 6,581,208 B1 | 6/2003 | Inaguma |
| 6,061,261 | A | 5/2000 | Chen et al. | 6,583,353 B2 | 6/2003 | Murakoshi et al. |
| 6,069,588 | A | 5/2000 | O'Neill, Jr. | 6,587,479 B1 | 7/2003 | Bianchi et al. |
| 6,075,787 | A | 6/2000 | Bobeck et al. | 6,601,097 B1 | 7/2003 | Cheston et al. |
| 6,081,519 | A | 6/2000 | Petler | 6,609,927 B2 | 8/2003 | Kidman |
| 6,081,533 | A | 6/2000 | Laubach et al. | 6,615,407 B1 | 9/2003 | Inaguma |
| 6,088,569 | A | 7/2000 | Bach et al. | 6,616,005 B1 | 9/2003 | Pereira et al. |
| 6,101,228 | A | 8/2000 | Hebron et al. | 6,618,353 B2 | 9/2003 | Merrill et al. |
| 6,104,727 | A | 8/2000 | Moura et al. | 6,618,387 B1 | 9/2003 | Liu et al. |
| 6,108,331 | A | 8/2000 | Thompson | 6,622,304 B1 | 9/2003 | Carhart |
| 6,109,959 | A | 8/2000 | Burlinson et al. | 6,637,030 B1 | 10/2003 | Klein |
| 6,123,577 | A | 9/2000 | Contois et al. | 6,653,932 B1 | 11/2003 | Beamish et al. |
| 6,137,793 | A | 10/2000 | Gorman et al. | 6,658,010 B1 | 12/2003 | Enns et al. |
| 6,144,399 | A | 11/2000 | Manchester et al. | 6,690,677 B1 | 2/2004 | Binder |
| 6,147,304 | A | 11/2000 | Doherty | 6,697,864 B1 | 2/2004 | Demirtjis et al. |
| 6,157,645 | A | 12/2000 | Shobatake | 6,708,444 B2 | 3/2004 | Aesch et al. |
| 6,166,730 | A | 12/2000 | Goode et al. | 6,721,298 B1 | 4/2004 | Vella-Coleiro |
| 6,167,120 | A | 12/2000 | Kikinis | 6,723,921 B2 | 4/2004 | Vagedes |
| 6,172,301 | B1 | 1/2001 | Goodsell | 6,732,368 B1 | 5/2004 | Michael et al. |
| 6,188,557 | B1 | 2/2001 | Chaudhry | 6,745,392 B1 | 6/2004 | Basawapatna et al. |
| 6,188,871 | B1 | 2/2001 | Kitamura et al. | 6,747,859 B2 | 6/2004 | Walbeck et al. |
| 6,192,399 | B1 | 2/2001 | Goodman | 6,748,080 B2 | 6/2004 | Russ et al. |
| 6,207,895 | B1 | 3/2001 | Engel | 6,750,398 B1 | 6/2004 | Richardson |
| 6,207,899 | B1 | 3/2001 | Gillespie | 6,751,441 B1 | 6/2004 | Murray et al. |
| 6,216,160 | B1 | 4/2001 | Dichter | 6,757,368 B2 * | 6/2004 | Binder .................. 379/90.01 |
| 6,216,171 | B1 | 4/2001 | Isono et al. | 6,765,149 B1 | 7/2004 | Ku |
| 6,219,409 | B1 | 4/2001 | Smith et al. | 6,765,931 B1 | 7/2004 | Rabenko et al. |
| 6,222,124 | B1 | 4/2001 | Pritchard et al. | 6,774,307 B2 | 8/2004 | Kruse et al. |
| 6,222,853 | B1 | 4/2001 | Marttinen et al. | 6,778,817 B1 | 8/2004 | Bullock et al. |
| 6,236,653 | B1 | 5/2001 | Dalton et al. | 6,779,423 B2 | 8/2004 | Hammons et al. |
| 6,243,413 | B1 | 6/2001 | Beukema | 6,781,530 B2 | 8/2004 | Moore |
| 6,243,571 | B1 | 6/2001 | Bullock et al. | 6,806,425 B1 | 10/2004 | O'Neill |
| 6,252,754 | B1 | 6/2001 | Chaudhry | 6,819,682 B1 | 11/2004 | Rabenko et al. |
| 6,281,439 | B1 | 8/2001 | Reiker | 6,822,946 B1 | 11/2004 | Wallace |
| 6,282,075 | B1 | 8/2001 | Chaudhry | 6,834,057 B1 | 12/2004 | Rabenko et al. |
| 6,297,450 | B1 | 10/2001 | Yu | 6,838,997 B1 | 1/2005 | Davidson |
| 6,307,862 | B1 | 10/2001 | Silverman | 6,848,116 B1 | 1/2005 | Land |
| 6,317,884 | B1 | 11/2001 | Eames et al. | 6,854,895 B2 | 2/2005 | Coffey et al. |
| 6,349,133 | B1 | 2/2002 | Matthews et al. | 6,856,799 B1 | 2/2005 | Ritter |
| 6,362,987 | B1 | 3/2002 | Yurek et al. | 6,857,132 B1 | 2/2005 | Rakib et al. |
| 6,364,535 | B1 | 4/2002 | Coffey | 6,864,798 B2 | 3/2005 | Janik |
| 6,373,944 | B1 | 4/2002 | Beavers | 6,868,058 B1 | 3/2005 | Cooper et al. |
| 6,380,852 | B1 | 4/2002 | Hartman et al. | 6,868,265 B2 | 3/2005 | Zodnik |
| 6,381,745 | B1 | 4/2002 | Paul | 6,880,020 B1 | 4/2005 | Rubinstein et al. |
| 6,396,391 | B1 | 5/2002 | Binder | 6,901,439 B1 | 5/2005 | Bonasia et al. |
| 6,397,288 | B1 | 5/2002 | Rye et al. | 6,912,209 B1 | 6/2005 | Thi et al. |
| 6,400,815 | B1 | 6/2002 | Gilboy et al. | 6,927,340 B1 | 8/2005 | Binder et al. |
| 6,418,149 | B1 | 7/2002 | Swisher et al. | 6,931,659 B1 | 8/2005 | Kinemura |
| 6,420,964 | B1 | 7/2002 | Nishikawa et al. | 6,932,624 B1 | 8/2005 | Hoopes et al. |
| 6,433,672 | B1 | 8/2002 | Shirmard | 6,933,686 B1 | 8/2005 | Bischel |
| 6,438,109 | B1 | 8/2002 | Karaoguz et al. | 6,937,056 B2 | 8/2005 | Binder |
| 6,441,304 | B1 | 8/2002 | Currier et al. | 6,940,956 B1 | 9/2005 | Leach |
| 6,441,723 | B1 | 8/2002 | Mansfield, Jr. et al. | 6,941,576 B2 | 9/2005 | Amit |
| 6,448,899 | B1 | 9/2002 | Thompson | 6,943,296 B2 | 9/2005 | Perrella et al. |

| Patent/Publication | Date | Name |
|---|---|---|
| 6,943,297 B2 | 9/2005 | Capella |
| 6,943,683 B2 | 9/2005 | Perret |
| 6,946,988 B2 | 9/2005 | Edwards et al. |
| 6,955,560 B1 | 10/2005 | Biggs |
| 6,956,169 B1 | 10/2005 | Shotey et al. |
| 6,956,826 B1 | 10/2005 | Binder |
| 6,961,303 B1 | 11/2005 | Binder |
| 6,963,931 B2 | 11/2005 | Bunn et al. |
| 6,981,892 B1 | 1/2006 | Kostelnik |
| 6,993,289 B2 | 1/2006 | Janik |
| 6,996,837 B1 | 2/2006 | Miura et al. |
| 7,002,898 B1 | 2/2006 | Lou |
| 7,003,102 B2 | 2/2006 | Kiko |
| 7,023,868 B2 | 4/2006 | Rabenko et al. |
| 7,030,319 B2 | 4/2006 | Johnsen et al. |
| 7,034,225 B2 | 4/2006 | Thompson et al. |
| 7,035,270 B2 | 4/2006 | Moore, Jr. et al. |
| 7,036,140 B2 | 4/2006 | Terry et al. |
| 7,047,555 B1 | 5/2006 | Inaguma et al. |
| 7,088,238 B2 | 8/2006 | Karaoguz et al. |
| 7,099,368 B2 | 8/2006 | Santhoff et al. |
| 7,106,388 B2 | 9/2006 | Vorenkamp et al. |
| 7,106,721 B1 | 9/2006 | Binder |
| 7,116,685 B2 | 10/2006 | Brown et al. |
| 7,117,520 B2 | 10/2006 | Stewart |
| 7,123,701 B2 * | 10/2006 | Binder .................... 379/90.01 |
| 7,138,886 B2 | 11/2006 | Strull et al. |
| 7,142,560 B2 | 11/2006 | Mansfield |
| 7,149,474 B1 | 12/2006 | Mikhak |
| 7,151,575 B1 | 12/2006 | Landry et al. |
| 7,164,690 B2 | 1/2007 | Limb et al. |
| 7,209,497 B2 | 4/2007 | Weinstein et al. |
| 7,295,518 B1 | 11/2007 | Monk et al. |
| 7,317,793 B2 | 1/2008 | Binder |
| 7,453,895 B2 * | 11/2008 | Binder ....................... 370/401 |
| 7,463,732 B1 * | 12/2008 | Hiscock et al. ......... 379/399.02 |
| 7,483,524 B2 * | 1/2009 | Binder .................... 379/93.08 |
| 7,522,713 B2 * | 4/2009 | Binder .................... 379/90.01 |
| 7,522,714 B2 * | 4/2009 | Binder .................... 379/90.01 |
| 2001/0036199 A1 | 11/2001 | Terry |
| 2001/0039660 A1 | 11/2001 | Vasilevsky et al. |
| 2002/0019875 A1 | 2/2002 | Garrett et al. |
| 2002/0031114 A1 | 3/2002 | Terry et al. |
| 2002/0035624 A1 | 3/2002 | Kim |
| 2002/0038153 A1 | 3/2002 | Amodeo et al. |
| 2002/0039388 A1 | 4/2002 | Smart et al. |
| 2002/0060617 A1 | 5/2002 | Walbeck et al. |
| 2002/0061012 A1 | 5/2002 | Thi et al. |
| 2002/0064039 A1 | 5/2002 | Clodfelter |
| 2002/0069417 A1 | 6/2002 | Kliger et al. |
| 2002/0075806 A1 | 6/2002 | Shalvi et al. |
| 2002/0104009 A1 | 8/2002 | Zodnik |
| 2002/0116720 A1 | 8/2002 | Terry et al. |
| 2002/0146207 A1 | 10/2002 | Chu |
| 2002/0150155 A1 | 10/2002 | Florentin et al. |
| 2002/0166124 A1 | 11/2002 | Gurantz et al. |
| 2002/0166125 A1 | 11/2002 | Fulmer, II |
| 2002/0174423 A1 | 11/2002 | Fifield et al. |
| 2002/0194383 A1 | 12/2002 | Cohen et al. |
| 2002/0194605 A1 | 12/2002 | Cohen et al. |
| 2003/0003873 A1 | 1/2003 | Raghothaman |
| 2003/0005450 A1 | 1/2003 | Smith |
| 2003/0018975 A1 | 1/2003 | Stone |
| 2003/0062990 A1 | 4/2003 | Schaeffer, Jr. et al. |
| 2003/0066082 A1 | 4/2003 | Kliger et al. |
| 2003/0099228 A1 | 5/2003 | Alcock |
| 2003/0106067 A1 | 6/2003 | Hoskins et al. |
| 2003/0112965 A1 | 6/2003 | McNamara et al. |
| 2003/0133476 A1 | 7/2003 | Stone et al. |
| 2003/0151695 A1 | 8/2003 | Sahlin et al. |
| 2003/0154273 A1 | 8/2003 | Caveney |
| 2003/0154276 A1 | 8/2003 | Caveney |
| 2003/0224728 A1 | 12/2003 | Heinonen et al. |
| 2004/0013098 A1 | 1/2004 | Tseng et al. |
| 2004/0073597 A1 | 4/2004 | Caveney et al. |
| 2004/0077310 A1 | 4/2004 | Levy |
| 2004/0083262 A1 | 4/2004 | Trantow |
| 2004/0085976 A1 | 5/2004 | Dale et al. |
| 2004/0087214 A1 | 5/2004 | Cho |
| 2004/0121648 A1 | 6/2004 | Voros |
| 2004/0123322 A1 | 6/2004 | Erkocevic et al. |
| 2004/0136384 A1 | 7/2004 | Cho |
| 2004/0147232 A1 | 7/2004 | Zodnik |
| 2004/0158649 A1 | 8/2004 | Ophir et al. |
| 2004/0162117 A1 | 8/2004 | Liebenow |
| 2004/0177381 A1 | 9/2004 | Kliger et al. |
| 2004/0178888 A1 | 9/2004 | Hales et al. |
| 2004/0187156 A1 | 9/2004 | Palm et al. |
| 2004/0192285 A1 | 9/2004 | Capobianco et al. |
| 2004/0198236 A1 | 10/2004 | Paine et al. |
| 2004/0203387 A1 | 10/2004 | Grannan |
| 2004/0204017 A1 | 10/2004 | Eckel et al. |
| 2004/0255332 A1 | 12/2004 | Bertonis et al. |
| 2004/0259538 A1 | 12/2004 | Agbegnenow |
| 2004/0268160 A1 | 12/2004 | Atkinson et al. |
| 2005/0018648 A1 | 1/2005 | Scheelke |
| 2005/0018857 A1 | 1/2005 | McCarty et al. |
| 2005/0025162 A1 | 2/2005 | Binder |
| 2005/0034159 A1 | 2/2005 | Ophir et al. |
| 2005/0038875 A1 | 2/2005 | Park |
| 2005/0047379 A1 | 3/2005 | Boyden et al. |
| 2005/0053087 A1 | 3/2005 | Pulyk |
| 2005/0073968 A1 | 4/2005 | Perlman |
| 2005/0076148 A1 | 4/2005 | Chan et al. |
| 2005/0076149 A1 | 4/2005 | McKown et al. |
| 2005/0076151 A1 | 4/2005 | Tapperson et al. |
| 2005/0076375 A1 | 4/2005 | Nakamura |
| 2005/0084004 A1 | 4/2005 | Bione |
| 2005/0086389 A1 | 4/2005 | Chang |
| 2005/0086694 A1 | 4/2005 | Hicks et al. |
| 2005/0125083 A1 | 6/2005 | Kiko |
| 2005/0129069 A1 | 6/2005 | Binder |
| 2005/0136972 A1 | 6/2005 | Smith et al. |
| 2005/0144647 A1 | 6/2005 | Zussman et al. |
| 2005/0152306 A1 | 7/2005 | Bonnassieux et al. |
| 2005/0152337 A1 | 7/2005 | Wurtzel et al. |
| 2005/0177640 A1 | 8/2005 | Rubinstein et al. |
| 2005/0184915 A1 | 8/2005 | Nagel et al. |
| 2005/0194176 A1 | 9/2005 | Johnsen et al. |
| 2005/0208825 A1 | 9/2005 | Chan |
| 2005/0228889 A1 | 10/2005 | Cohen et al. |
| 2005/0232299 A1 * | 10/2005 | Binder ....................... 370/463 |
| 2005/0235333 A1 | 10/2005 | Bertonis et al. |
| 2005/0281326 A1 | 12/2005 | Yu |
| 2005/0289638 A1 | 12/2005 | Steading |
| 2006/0092967 A1 | 5/2006 | Bergeron et al. |
| 2006/0098638 A1 * | 5/2006 | Binder ....................... 370/356 |
| 2006/0193336 A1 | 8/2006 | Landry et al. |
| 2006/0222086 A1 | 10/2006 | Frye, Jr. |
| 2006/0251094 A1 | 11/2006 | Van Vleck et al. |
| 2006/0280197 A1 | 12/2006 | Stone |
| 2006/0291575 A1 | 12/2006 | Berkman et al. |
| 2007/0036171 A1 | 2/2007 | Magin |
| 2007/0041339 A1 * | 2/2007 | Binder ....................... 370/264 |
| 2008/0120663 A1 * | 5/2008 | Binder ....................... 725/109 |
| 2008/0205606 A1 * | 8/2008 | Binder .................... 379/93.01 |

FOREIGN PATENT DOCUMENTS

| | | |
|---|---|---|
| EP | 0385695 A2 | 9/1990 |
| EP | 0 724 365 | 7/1996 |
| EP | 0 961 466 | 12/1999 |
| EP | 1 343 253 | 9/2003 |
| GB | 2 368 979 | 5/2002 |
| JP | 55-132197 | 10/1980 |
| WO | 9623377 A1 | 8/1996 |

| | | |
|---|---|---|
| WO | WO 97/50193 | 12/1997 |
| WO | WO 9827748 A2 | 6/1998 |
| WO | WO 9831133 A2 | 7/1998 |
| WO | WO 99/12330 | 3/1999 |
| WO | WO 9935753 A2 | 7/1999 |
| WO | WO 0028689 A2 | 5/2000 |
| WO | WO 01/43238 | 6/2001 |
| WO | WO 01/80543 | 10/2001 |
| WO | WO 0180030 A1 | 10/2001 |
| WO | WO 0219623 A2 | 3/2002 |
| WO | WO 02/065229 | 8/2002 |
| WO | WO 02/091652 | 11/2002 |
| WO | WO 02/102019 | 12/2002 |
| WO | WO 03/005691 | 1/2003 |
| WO | WO 03/039150 | 5/2003 |
| WO | WO 2004/068827 | 8/2004 |
| WO | WO 2005/022692 | 3/2005 |
| WO | WO 2006052216 A1 | 5/2006 |

OTHER PUBLICATIONS

Mark Hachman, Compaq to Ride the CEBus, EBN, Jan. 22, 1996, 1 page.
Home Automation Buses: Protocols Really Hit Home, EDN, Apr. 13, 1995, 9 pages.
Brian E. Markwalter, et al; CEBus Router Testing, IEEE Transactions on Consumer Electronics, Nov. 1991, vol. 37, No. 4, 8 pages.
J. Hofmann, Cable, Television, and the Consumer Electronic Bus, 9 pages.
Draft IS-60.04 Node Communications Protocol Part 6: Application Layer Specification, Rev. Apr. 18, 1996, 129 pages.
'High-Speed Cable Modems', pp. 1-246 By Albert A. Azzam, 1997, ISBN: 0-07-006417-2 (276 pages).
'High-Speed Cable Modems', pp. 247-570 By Albert A. Azzam, 1997, ISBN: 0-07-006417-2 (321 pages).
M. Ise et al. "Sharp Home Bus System" Sharp Technical Journal No. 29 1984 pp. 49-55.
S. Tsuruta "Home Media Bus: An Integrated Network for Home Information Systems" 1984 IEEE International Conference on Consumer Electronics. Digest of Technical Papers Jun. 6-8, 1984 Rosemont Illinois 2 pp.
C. Dougligeris et al. "Communications and Control for a Home Automation System" Conference: IEEE Proceedings of the Southeastcon '91 vol. 1 pp. 171-175.
D.G.J. Fanshawe "Architures for Home Systems" Conference: IEEE Colloquium on Home Systems—Information Entertainment and Control Oct. 1, 1990 London United Kingdom pp. 3/1-3/3.
M. Inoue et al. "A Home Automation System" IEEE Transactions on Consumer Electronics vol. CE-31 No. 3 Aug. 1985 pp. 516-527.
"CEBus: US Households are Being Networked" Funkschau No. 9 Apr. 1989 pp. 45-47.
Coaxial Feeder Cables [Engineering Notes] PYE Telecommunications Limited Publication Ref No. TSP507/1 Jun. 1975 Cambridge England 15 pages.
Freeman "Telecommunication Transmission Handbook" 2.sup.nd Ed. Cover pp. xi-xxvii Chapter 3 (pp. 79-127) Chapter 5 (pp. 172-252) Chapter 6 (pp. 253-288) 1981.
Hoe-Young Noh "Home Automation" Korea Information Science Society Review Apr. 1989 vol. 7 No. 2 pp. 40-44 Republic of Korea. (Translation Provided).
EIA-600.33 Coax Cable Physical Layer & Medium Specification; Revision: IS-60 9-25-95 (50 pages).
Motorola Announces Key New Features to CyberSURFR Cable Modem System; Motorola Mar. 17, 1997 (3 pages).
CyberSURFR Cable Modem Specifications; Motorola Mon. Apr. 13, 1998 (4 pages).
High Speed Cable Modems Including IEEE 802.14 Standards; Albert A. Azzam: ISBN 0-07-006417-2 1997.
Mark Sumner: "DOCSIS 1.1 Overview" Cablemodem.Com—Documents 'Online! May 3-7, 1999 pp. 1-16 XP-002165493 http://www.cablemodem.com/Euroll.sub.—Overview.pdf retrieved on Apr. 18, 2001.

Sdralia et al "Performance Characterisation of the MCNS DOCSIS 1.0 CATV Protocol with Prioritised First come First Served Scheduling" IEEE Transactions on Broadcasting US vol. 45 No. 2 Jun. 1999 pp. 196-205.
Tzerefos et al "Delivery of Low Bit Rate Isochronous Streams Over the DOCSIS 1.0 Cable Television Protocol" IEEE Transactions on Broadcasting US vol. 45 No. 2 Jun. 1999 pp. 206-214.
A.D. Little S. Lipoff: "Cable Modem Termination System—Network Side Interface Specification" Data Over Cable Interface Specification Online 1996 pp. 1-17 XP002165494 http://www.cablemodem.com/SP.sub.—CMTS.sub.—NSII01-960702.pdf retrieved on Apr. 18, 2001.
M. Laubach "To foster residential area broadband internet techology: IP datagrams keep going and going and going . . . " Computer Communications NL Elsevier Science Publishers BV Amsterdam vol. 19 No. 11 Sep. 1, 1996 pp. 867-875.
Goldberg "MCNS/DOCSIS MAC Clears a Path for the Cable-Modem Invasion" Electronic Design US Penton Publishing vol. 45 No. 27 Dec. 1, 1997 pp. 69-70 74 78 80.
Quigley "Cablemodem Standards for Advanced Quality of Service Deployments" Digest of Technical Papers International Conference on Consumer Electronics Jun. 22-24, 1999 pp. 282-283.
Cable Television Laboratories Inc. "Data-Over-Cable Service Interface Specifications: Baseline Privacy Plus Interface Specification" SP-BPI+-I09-020830 Aug. 30, 2002.
Cable Television Laboratories Inc. "Data-Over-Cable Service Interface Specifications: Radio Frequency Interface Specification" SP-RFIv1.1-I09-020830 Aug. 30, 2002.
Cable Television Laboratories Inc. "Data-Over-Cable Service Interface Specifications: Radio Frequency Interface Specification" SP-RFIv2.0-I03-021218 Dec. 18, 2002.
Cisco "Internal DOCSIS Configurator File Generator for the Cisco Cable Modem Termination System" Cisco Cable Modem Termination System Feature Guide Chapter 6.
Communications Technology "Cable Modem Security: Insulating Your Network While Keeping Your Subscribers Safe from Each Other" Oct. 2001.
Croft et al "Bootstrap Protocol (BOOTP)" Sep. 1985.
Droms "Dynamic Host Configuration Protocol" Mar. 1997.
Jacobs et al "Bandwidth Burglary in Broad Daylight: How to Prevent a Simple Hack" Jan. 2003.
Pfendtner "DOCSIS Network Security at WH-Netz" Nov. 20, 2002.
Society of Cable Telecommunications Engineers Inc. "Data-Over-Cable Service Interface Specification: DOCSIS 1.0 Radio Frequency Interface (RRI)" ANSI/SCTE 22-1 2002 (formerly DSS 02-05).
"MCNS Data-Over-Cable Service Interface Specifications: Baseline Privacy Interface Specification SP-BPI-I02-990319" Mar. 1999.
Cable Television Laboratories Inc.; Data-Over-Cable Service Interface Specifications—Radio Frequency Interface Specification—SP-RFI-I04-980724; 1997; pp. 1-196.
"MCNS Data-Over-Cable Service Interface Specifications: Cable Modem to Customer Premise Equipment Interface Specification SP-CMCI-I04-000714" Jul. 2000.
"Data-Over-Cable Service Interface Specifications: Cable Modem Termination System—Network Side Interface Specification SP-CMTS-NSII01-960702" Jul. 1996.
Data-Over Cable Service Interface Specifications; Radio Frequency Interface Specification; SPRFIv1.1-101-990311; 1999; Cable Television Laboratories Inc.; pp. 1-310.
Ciciora W. et al. "Protocol Issues" Modern Cable Television Technology: Video Voice and Data Communications Section 4.4 pp. 194-205 Copyright 1999 by Morgan Kaufmann Publishers Inc.
Ciciora W. et al "Chapter 4.5: The DOCSIS Protocol for Cable Modems" Modern Cable Television Technology: Video Voice and Data Communications Section 4.5 pp. 205-213 Copyright 1999 by Morgan Kaufmann Publishers Inc.
Data-Over Cable Technical Reports; Operations Support System Framework for Data Over Cable Services; TR-DOCS-OSSIW08-961016; MCNS Holdings LP; pp. 1-20.
Data-Over Cable Service Interface Specifications; Operations Support System Interface Specification; SP-OSSI-102-990113; Cable Television Laboratories Inc.; pp. 1-26.

Data-Over Cable Service Interface Specifications; Operations Support System Interface Specification Radio Frequency Interface; SP-OSSI-RFI-I03-990113; Cable Television Laboratories Inc.; pp. 1-29.

Data-Over Cable Service Interface Specifications; Operations Support System Interface Specification Baseline Privacy Interface MIB; SP-OSSI-BPI-I01-980331; 1997 & 1998; MCNS Holdings LP; pp. 1-33.

Extended DQRAP (EXQRAP) A Cable TV Protocol Functioning as a Distributed Switch; Chien-Ting Wu & Graham Campbell; Illinois Institute of Technology (Comp. Science Dept.); pp. 1-7.

A Review of Contention Resolution Algorithms for IEEE 802.14 Networks; Nada Glomie; Yves Saintillan & David H. Su; National Institute of Standards and Technology; pp. 1-11.

A Review of Contention Resolution Algorithms for IEEE 802.14 Networks; Nada Glomie; Yves Saintillan & David H. Su; National Institute of Standards and Technology; pp. 1-12.

On IEEE 802.14 Medium Access Control Protocol; Ying-Dar Lin; 1998.

On IEEE 802.14 Medium Access Control Protocol; Ying-Dar Lin; 1998; IEEE Communications Survey Fourth Quarter pp. 2-10.

Hybrid-Fiber Coax; Hung Nguyen and Felix Yao; Apr. 22, 1996; pp. 1-11.

Cable Data Modem Performance Evaluation A Primer for Non-Technical Readers; Cable Television Laboratories Inc.; Nov. 15, 1996; pp. 1-8.

Data-Over Cable Service Interface Specifications: Cable Modem to Customer Premise Equipment Interface Specification; SP-CMCI-12-980317; 1988; Cable Television Laboratories Inc.; pp. 1-40.

Cable Device Management Information Base for DOCSIS Complaint Cable Modems and Cable Modem Termination Systems; Michael St. Johns; Mar. 30, 1999; pp. 1-54.

Data-Over Cable Service Interface Specifications; Cable Modem Telephony Return Interface Specification; SP-CMTRI-101-970804; 1997; Cable Television Laboratories Inc.; pp. 1-74.

Radio Frequency (RF) Interface Management Information Base for MCNS Complaint RF Interfaces Draft-ietf-Jipcdn-rf-interface-mib-04.txt; May 22, 1009; Guenter Roeck (editor); pp. 1-55.

Cable Device Management Information Base for MCNS Complaint Cable Modems and Cable Modem Termination Systems draft-ietf-ipcdn-cable-device-mib-04.txt; May 22, 1998; Guenter Roeck (editor); pp. 1-32.

Baseline Privacy Interface Management Information Base for MCNS Complaint Cable Modems and Cable Modem Termination Systems; R. Woundy; Jan. 17, 1999; pp. 1-35.

Logical IP Subnetworks over IEE 802.14 Services; Mark Laubach; Mar. 13, 1998; pp. 1-13.

MAC Protocols for Multimedia Data over HFC Architecture; Dolors Sala Batlle; Nov. 27, 1995; pp. 1-28.

An Access Protocol to Support Multimedia Traffic Over Hybrid Fiber/Coax Systems; John O. Limb Dolors Sala; pp. 1-6.

Radio Frequency (RF) Interfaces Management Information Base for MCNS/DOCSIS Compliant RF Interfaces; Mike St. Johns (Editor); Feb. 17, 1999; pp. 1-67.

Telephony-Return Interface (TRI) Management Information Base for DOCSIS complaint Telephony-Return Cable Modems and Cable Modem Termination systems; S. Adiraju J. Fijolek; Apr. 2, 1999; pp. 1-27.

Data Over Cable System Quality of Service Management Information Base (DOCSIS-QOS MIB); M. Patrick J. Harvey Motorola ING; Jun. 25, 1999 pp. 1-43.

Docsis 1.1 IGMP MIB; H. Abramson Motorola; Jun. 1999; pp. 1-13.

Scheduling Disciplines for HFC Systems: What can we learn from ATM scheduling; Dolors Sala John O. Limb; GA Tech; pp. 1-6.

A Protocol for Efficient Transfer of Data over Fiber/Cable Systems; Dolors Sala John O. Limb; GA Tech; pp. 1-8.

Claim Chart presented in request for reexamination of U.S. Patent No. 6,480,510 request filed Jun. 10, 2009.

Claim Chart presented in request for reexamination of U.S. Patent No. 5,841,360 request filed May 26, 2009.

* cited by examiner

Figure 1 (Prior-Art)

Figure 2 (Prior-Art)

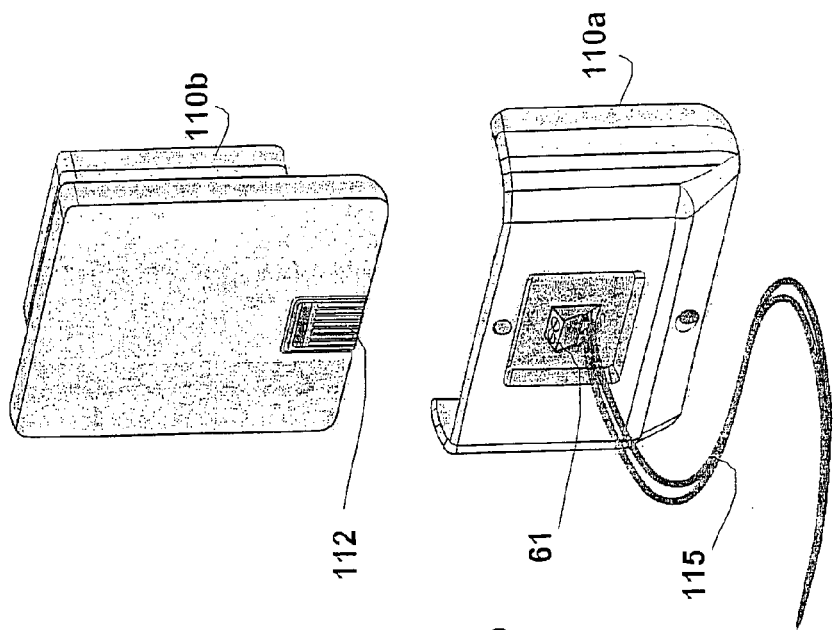
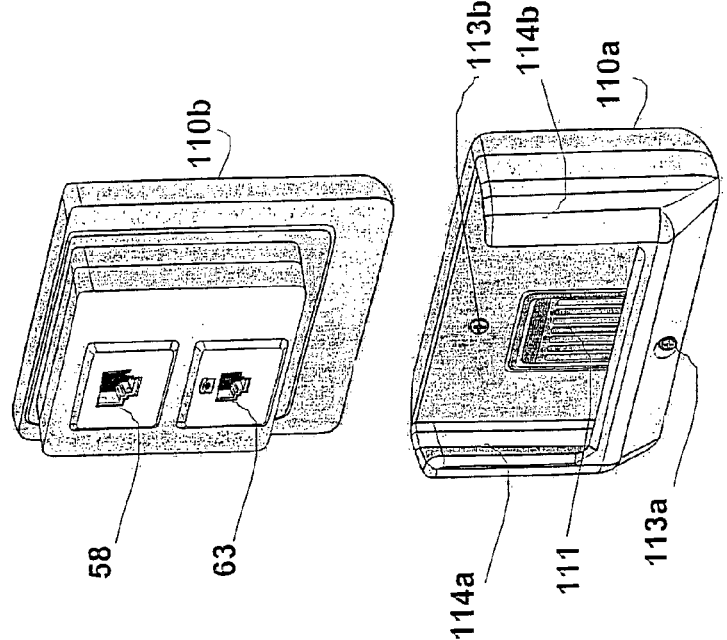
Figure 10b
Figure 10a

MODULAR OUTLET

CROSS-REFERENCE TO RELATED APPLICATION

The present application is a continuation of U.S. application Ser. No. 10/836,267, filed on May 3, 2004, now pending, the disclosure of which is incorporated herein by reference.

FIELD OF THE INVENTION

The present invention relates to the field of wired networks using outlets, and, more specifically, to a modular outlet for use in such networks.

BACKGROUND OF THE INVENTION

Outlets

The term "outlet" herein denotes an electro-mechanical device, which facilitates easy, rapid connection and disconnection of external devices to and from wiring installed within a building. An outlet commonly has a fixed connection to the wiring, and permits the easy connection of external devices as desired, commonly by means of an integrated connector in a faceplate. The outlet is normally mechanically attached to, or mounted in, a wall. Non-limiting examples of common outlets include: telephone outlets for connecting telephones and related devices; CATV outlets for connecting television sets, VCR's, and the like; outlets used as part of LAN wiring (a.k.a. structured wiring) and electrical outlets for connecting power to electrical appliances. The term "wall" herein denotes any interior or exterior surface of a building, including, but not limited to, ceilings and floors, in addition to vertical walls.

LAN Environment

FIG. 1 shows a typical prior art LAN environment 10. Such a network commonly uses 10BaseT or 100BaseTX Ethernet IEEE802.3 interfaces and topology, and features a hub 11 as a concentrating device, into which all devices are connected. Devices are connected to the hub 11 by data connectors 14a, 14b, and 14c, which are housed within network outlets 15a, 15b, and 15c respectively. Connections to the hub 11 are via cables 13a, 13b, and 13c respectively. Data connectors 14a, 14b, and 14c may be, for example, type RJ-45 connectors; and cables 13a, 13b, and 13c may be, for example, Category 5 cabling. Such configuration is described, for example, in EIT/TIA-568 and EIA/TIA-570. The data portion of network 10 uses data units (which may be computers) 7a, 7b, and 7c, which connect to network connectors 14a, 14b, and 14c via cables 16a, 16b, and 16c, respectively. A server 12 may also be connected to the hub 11, and can perform the external connection functionality, as well as other server functions as applied in the art.

Although FIG. 1 refers to the hub 11 as a concentrating device, it is to be understood that any type of device having multiple network interfaces and supporting a suitable connectivity can be used, non-limiting examples of which include shared hubs, switches (switched hubs), routers, and gateways. Hence, the term "hub" herein denotes any such device without limitation. Furthermore, network 10 can be a packet-based network, either in-building or distributed, such as a LAN or the Internet.

Home Networking

Most existing offices and some of the newly built buildings facilitate the network structure of network 10. However, implementing such a network in existing buildings typically requires installation of new wiring infrastructure. Such installation of new wiring may be impractical, expensive and hassle-oriented. As a result, many technologies (referred to as "no new wires" technologies) have been proposed in order to facilitate a LAN in a building without adding new wiring. Some of these techniques use existing wiring used also for other purposes such as telephone, electricity, cable television, and so forth. Doing so offers the advantage of being able to install such systems and networks without the additional and often substantial cost of installing separate wiring within the building. In order to facilitate multiple use of wiring within a building, specialized outlets are sometimes installed, which allow access to the wiring for multiple purposes. Home networking using existing telephone lines will be hereinafter described as an example.

Telephony Definitions and Background

The term "telephony" herein denotes in general any kind of telephone service, including analog and digital service, such as Integrated Services Digital Network (ISDN).

Analog telephony, popularly known as "Plain Old Telephone Service" ("POTS") has been in existence for over 100 years, and is well-designed and well-engineered for the transmission and switching of voice signals in the 3-4 KHz portion (or "band") of the audio spectrum. The familiar POTS network supports real-time, low-latency, high-reliability, moderate-fidelity voice telephony, and is capable of establishing a session between two end-points, each using an analog telephone set.

The terms "telephone", "telephone set", and "telephone device" herein denote any apparatus, without limitation, which can connect to a Public Switch Telephone Network ("PSTN"), including apparatus for both analog and digital telephony, non-limiting examples of which are analog telephones, digital telephones, facsimile ("fax") machines, automatic telephone answering machines, voice modems, and data modems.

The terms "data unit", "computer" and "personal computer" ("PC") are used herein interchangeably to include workstations, Personal Digital Assistants (PDA) and other data terminal equipment (DTE) with interfaces for connection to a local area network, as well as any other functional unit of a data station that serves as a data source or a data sink (or both).

In-home telephone service usually employs two or four wires, to which telephone sets are connected via telephone outlets.

Home Networking Over Telephone Lines.

FIG. 2 shows the wiring configuration of a prior-art telephone system including a network 20 for a residence or other building, wired with a telephone line 5, which has a single wire pair that connects to a junction-box 34, which in turn connects to a Public Switched Telephone Network (PSTN) 41 via a cable 33 ('local loop'), terminating in a public switch 32, which establishes and enables telephony from one telephone to another. The term "high-frequency" herein denotes any frequency substantially above such analog telephony audio frequencies, such as that used for data. ISDN typically uses frequencies not exceeding 100 KHz (typically the energy is concentrated around 40 KHz). The term "telephone line" herein denotes electrically-conducting lines which are intended primarily for the carrying and distribution of analog telephony signals, and includes, but is not limited to, such electrically-conducting lines which may be pre-existing within a building and which may currently provide analog telephony service.

Junction box 34 separates the in-home circuitry from the PSTN and is used as a test facility for troubleshooting as well as for new wiring in the home. A plurality of telephones may connect to telephone lines 5 via a plurality of telephone outlets 35. Each outlet has a connector 36 (often referred to as a "jack"), commonly being in the form of RJ-11 connectors in North-America. Each outlet may be connected to a telephone unit via a compatible "plug" connector that inserts into the jack.

Wiring 5 is normally based on a serial or "daisy-chained" topology, wherein the wiring is connected from one outlet to the next in a linear manner; but other topologies such as star, tree, or any arbitrary topology may also be used. Regardless of the topology, however, the telephone wiring system within a residence always uses wired media: two or four copper wires terminating in one or more outlets which provide direct access to these wires for connecting to telephone sets.

It is often desirable to use existing telephone wiring simultaneously for both telephony and data networking. In this way, establishing a new local area network in a home or other building is simplified, because there is no need to install additional wiring.

The concept of frequency domain/division multiplexing (FDM) is well-known in the art, and provides means of splitting the bandwidth carried by a wire into a low-frequency band capable of carrying an analog telephony signal and a high-frequency band capable of carrying data communication or other signals. Such a mechanism is described, for example, in U.S. Pat. No. 4,785,448 to Reichert et al. (hereinafter referred to as "Reichert"). Also widely used are xDSL systems, primarily Asymmetric Digital Subscriber Loop (ADSL) systems.

Examples of relevant prior-art in this field are the technology commonly known as HomePNA (Home Phoneline Networking Alliance), WO 99/12330 to Foley and as disclosed in U.S. Pat. No. 5,896,443 to Dichter (hereinafter referred to as "Dichter"). Dichter and others suggest a method and apparatus for applying a frequency domain/division multiplexing (FDM) technique for residential telephone wiring, enabling the simultaneous carrying of telephony and data communication signals. The available bandwidth over the wiring is split into a low-frequency band capable of carrying an analog telephony signal, and a high-frequency band capable of carrying data communication signals. In such a mechanism, telephony is not affected, while a data communication capability is provided over existing telephone wiring within a home.

In addition to illustrating a residential telephone system, FIG. 2 also shows the arrangement of a Dichter/HomePNA network. Network 20 serves both analog telephones and provides a local area network of data units. Data units 7a, 7b and 7c are connected to the local area network via phonelines carrier (PNC) modems 64a, 64b and 64c, respectively. Examples of Data Communication Equipment include, but are not limited to, modems, line drivers, line receivers, and transceivers (the term "transceiver" herein denotes a combined transmitter and receiver), which enables data communication over the high spectrum of telephone line 5. PNC units ('phoneline modems') 64a, 64b and 64c are respectively connected to high pass filters (HPF) 38a, 38b and 38c, which allow access to the high-frequency band carried by telephone line 5. In order to avoid interference to the data network caused by the telephones, low pass filters (LPF's) 37a, 37b and 37c are added to isolate the POTS carrying band, so that telephones 22a, 22b and 22c connect to telephone line 5 respectively using cords 6a, 6b and 6c for providing PSTN. Furthermore, a low pass filter (not shown) may also be connected to Junction Box 34, in order to filter noise induced from or input to PSTN wiring 33.

U.S. Pat. No. 6,549,616 entitled "Telephone Outlet for implementing a Local Area Network Over Telephone Lines and a Local Area Network using such Outlets" by the present inventor and assigned to the present assignee, describes the integration of PNC modem 64, HPF 38, and LPF 37 components into outlets 35 in order to reduce complexity, as shown in FIG. 2. This allows direct connection of telephone sets 6a, b and 6c to the respective outlets 35a, 35b and 35c, via dedicated connectors (as is done in prior-art common telephone outlets), as well as direct and easy connection of data units 7a, 7b and 7c to the respective outlets via dedicated jacks, as is usually done in LAN systems (as shown in FIG. 1).

Similarly, a network in a house based on using powerline-based home network is also known in the art. The medium for networking is the in-house power lines, which is used for carrying both the mains power and the data communication signals. For the sake of simplicity, the power related functions are not shown in the Figure. A PLC modem converts data communication interface (such as Ethernet IEEE802.3) to a signal which can be carried over the power lines, without affecting and being affected by the power signal available over those wires. An example for such PLC modem is Home-Plug1.0 based Ethernet-to-Powerline Bridge model DHP-100 from D-Link® Systems, Inc. of Irvine, Calif., USA.

Active Outlets.

Outlets in general (to include LAN structured wiring, electrical power outlets, telephone outlets, and cable television outlets) have evolved as passive devices being part of the wiring system house infrastructure and solely serving the purpose of providing access to the in-wall wiring. However, there is a trend towards embedding active circuitry in the outlet in order to use them as part of the home/office network. In most cases, the circuits added serve the purpose of adding data interface connectivity to the outlet, added to its basic passive connectivity function. An example of home networking over coaxial cables using outlets is described in WO 02/065229 published 22 Aug., 2002 entitled: 'Cableran Networking over Coaxial Cables' to Cohen et al.

US20020060617A1 (Walbeck et al) published May 23, 2002 and entitled "Modular power line network adaptor" discloses a modular feed-through adapter that allows an electrical connection to a power line network adapter without "using up" an electrical outlet.

WO0143238A1 (Kurt et al.) published Jun. 14, 2001 and entitled "Assembly for transmitting information via a low-voltage power supply network" discloses a coupling device for connecting a data terminal to a low-voltage power supply network. The device includes a network connection in the form of a coupling power plug and a device connection in the form of a coupling socket, both of which are located in a housing. The coupling device also has a combined data/network connection, which is located at the end of a data/network cable leading from the housing. The coupling device is connected to the low-voltage power supply network by plugging the coupling power plug into a network socket. The data terminal is plugged into the coupling socket using its power plug and a modem is connected to the data/network connection.

In time, as the technology and environment change, a need to upgrade, modify or change the outlet functionalities, features and characteristics may arise. For example, the data interface may need to be upgraded to interconnect with new standards. In another example, the circuitry will need to be upgraded to support higher bandwidth. Similarly, management and Quality of Service (QoS) functionalities may need to be either introduced or upgraded. In yet another example, additional functionalities and interfaces may need to be added. In most cases, any such modification will require dismantling the existing outlet and installing a new one having the improved features. Such activity is cumbersome, expensive and will often require professional skill.

There is thus a widely recognized need for, and it would be highly advantageous to have, a method and system for allowing easy and simple upgrading of outlets, preferably without requiring professional installation.

SUMMARY OF THE INVENTION

It is therefore an object of the invention to provide a method and system for allowing easy and simple upgrading of outlets, preferably without requiring professional installation.

In conjunction with a wired Local area Network (LAN), a multi-port active network outlet is described. Such outlet comprises a transceiver to allow data communication over the network wiring. The outlet supports one or more connectors, each allowing for data unit coupling to the data communication signal by a respective transceiver. Furthermore, the outlet comprises an adapter and connected respective connector allowing for coupling a data unit to the data communication signal via a distinct interface. The outlet further optionally comprises a hub for the multiple data streams to be coupled. An optional management/processing functionality may also be embedded in the outlet.

Furthermore, an outlet to be used in conjunction with a data network carried over wiring simultaneously serving basic service is described. The basic service may be telephony carried over telephone wiring, power carried over powerlines and CATV carried over coaxial cable television infrastructure. In such a case, the outlet comprises a data/service splitter/combiner for separating the basic service signal carried over the wiring, and allowing access thereto by a respective connector (telephone, power or CATV connector). The data signal is separated by a respective medium modem, and coupled to a data unit via a connector coupled to an adapter. A hub and management may be optionally employed as explained above.

In one aspect of the present invention, the above outlets comprise two modules, each providing part of the outlet functionalities. The base module connects to the wiring and the interface module allows for coupling to a data unit. The two modules are interconnected by mating connectors. The base module is mechanically secured to a wall, and the interface module is secured to the base module using dedicated means such as screws, slide-in rails, snap-on clips or others. In the case of the LAN environment, the additional LAN connections may be part of the base module or part of the interface module. Similarly, in the case of basic service outlets, the basic service connector may be part of the base module or part of the interface module.

In another aspect of the present invention, a non-wired interface, such as light (e.g. infrared), audio or radio-frequency (wireless) based, is used for coupling to a data unit. In such a case, the data unit connector is substituted by an appropriate non-wired transceiver.

In another aspect of the present invention, the network wiring is fiber optics based, and the outlet employs fiber optics connector and transceiver to couple to the network wiring.

In another aspect of the present invention, an industry standard expansion card (such as PCI, or PCMCIA) is used as the interface module, and the base module supports the required interface and connectors to connect thereto.

It is understood that other embodiments of the present invention will become readily apparent to those skilled in the art from the following detailed description, wherein are shown and described only embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

The invention is herein described, by way of non-limiting example only, with reference to the accompanying drawings, wherein:

FIG. 10a shows a front pictorial view of an exemplary outlet over telephone wiring according to the present invention.

FIG. 10b shows a rear pictorial view of an exemplary outlet over telephone wiring according to the present invention.

DETAILED DESCRIPTION OF EXEMPLARY EMBODIMENTS

Figure 1:
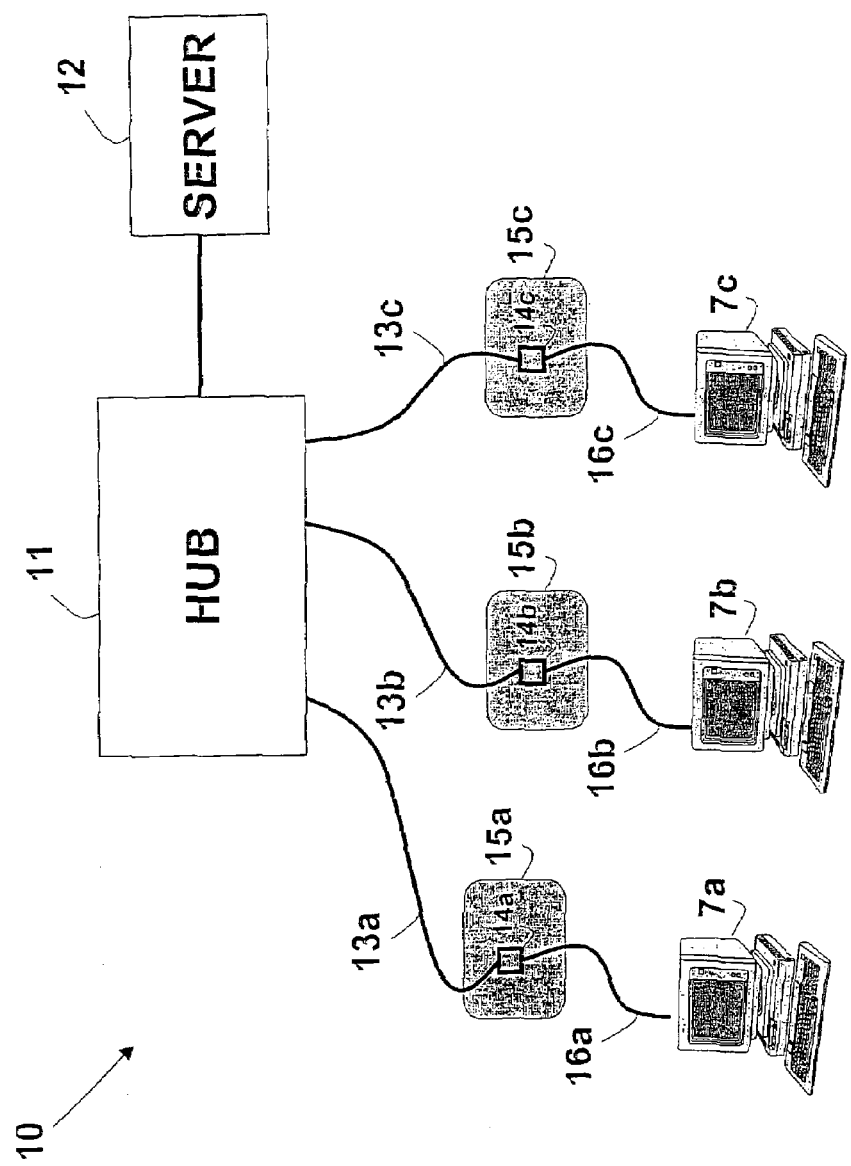
FIG. 1 shows an exemplary prior art local area network.
Figure 2:
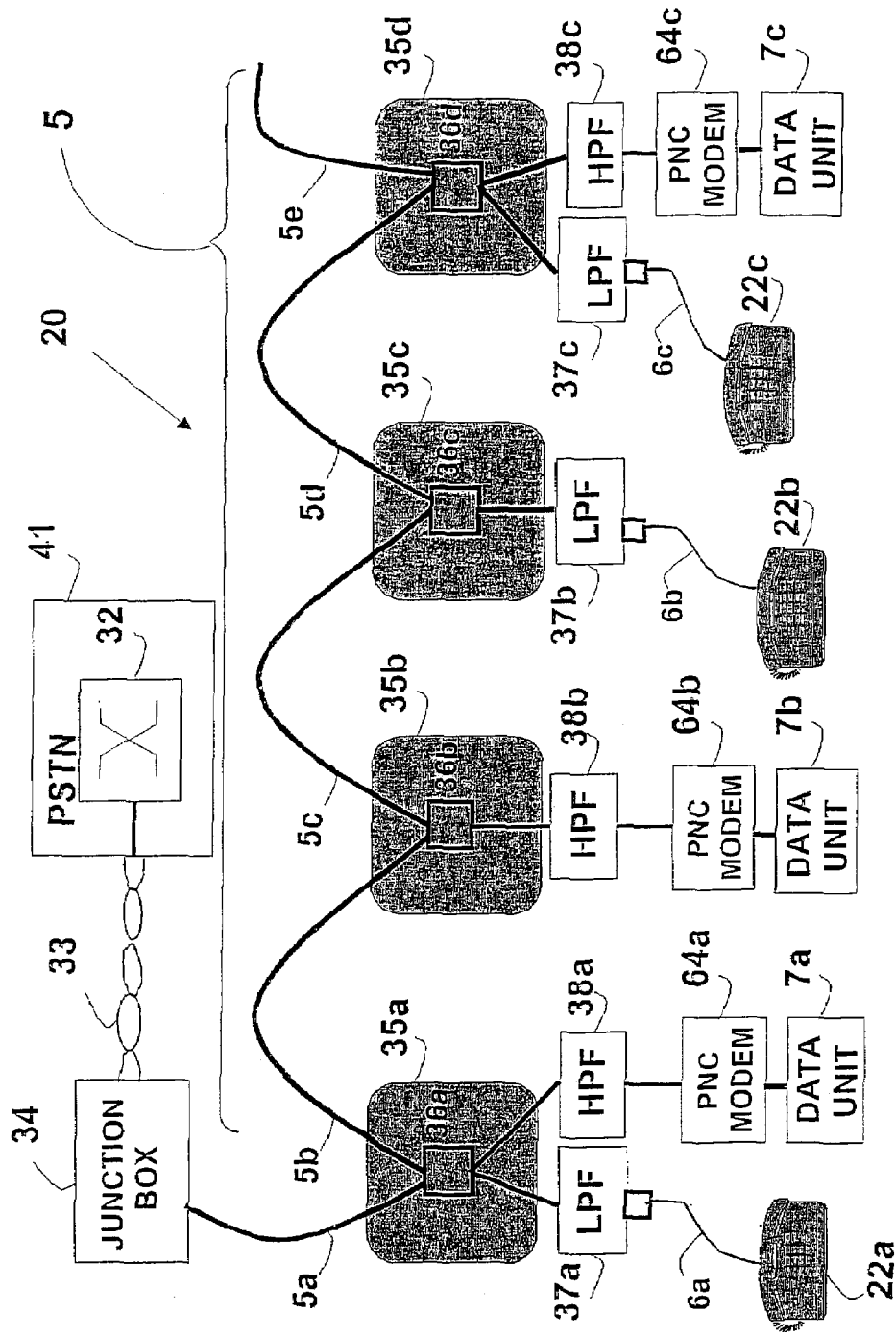
FIG. 2 shows an exemplary prior art local area network over telephone lines.

The principles and operation of a network according to the present invention may be understood with reference to the drawings and the accompanying description. The drawings and descriptions are conceptual only. In actual practice, a single component can implement one or more functions; alternatively, each function can be implemented by a plurality of components and circuits. In the drawings and descriptions, identical reference numerals indicate those components that are common to different embodiments or configurations.

Home Network Based Outlet.

Figure 3:
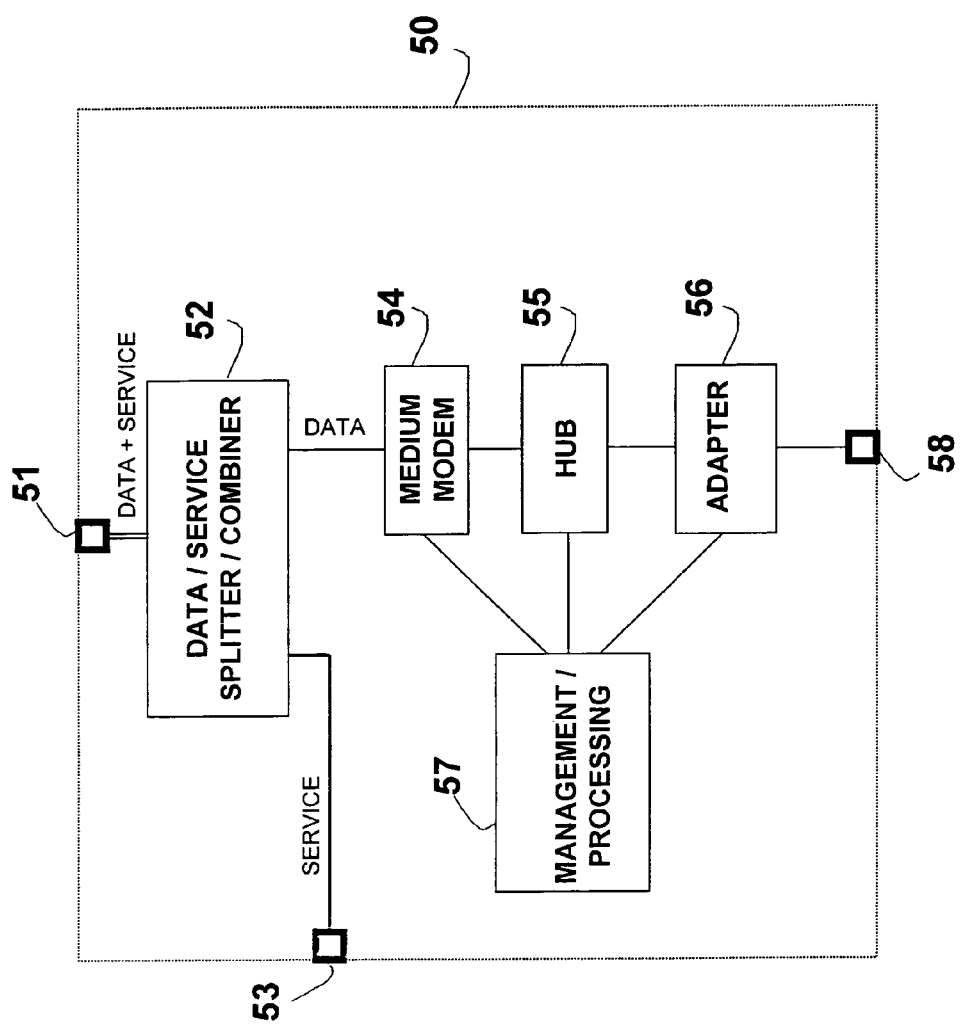
FIG. 3 shows a block diagram of an exemplary outlet over existing wiring.

A general functional schematic block diagram of an outlet 50 typically used in home network environment is shown in FIG. 3. The outlet 50 facilitates a data network over in-house wiring simultaneously with the basic service for which the wiring was originally installed to support. Non-limiting examples are telephone outlet connected to the telephone wiring to support telephone service, power outlet connected to the power wiring to support AC power distribution and CATV outlet connected to the CATV cabling to support CATV distribution. The outlet connects to the wiring via connector 51. Since in most cases the outlet 50 is required to retain the basic service (being telephony, AC power or CATV) added to data networking functionality, the outlet 50 embed a service connector 53 used to provide the original service. A data/service splitter/combiner 52 is used to separate (and combine) the basic service signal carried over the wiring from the data signal. For example, in the case wherein the data and the service each signals use a different frequency spectrum over the wiring (FDM—Frequency Division Multiplexing), the splitter/combiner 52 will use a first filter to isolate the service signal spectrum and to couple it to service connector 53 as well as a second filter to isolate the data signal spectrum and to feed it to medium modem 54. Similarly, the service and data signals are combined by the splitter/combiner 52 and fed to the wiring via connector 51. In some implementations, the technology enables a direct connection of the medium modem 54 and the service connector 53, thus obviating the need for the data/service splitter/combiner 52, and both the medium modem 54 and the service connector 53 are directly connected to the wiring connector 51. Medium modem 54 functions to transmit and receive data over the wiring. In the case of a power outlet, the medium modem 54 enables carrying data over the powerlines. Similarly, the medium modem 54 enables carrying data over the telephone wiring in the case of telephone outlet and over the CATV cables in the case of CATV outlet. In most cases, the modem 54, working together with the splitter/combiner 52, is optimized neither to interfere with the basic service signal carried over the wiring nor to be interfered by it.

The outlet 50 provides access to the data carried over the in-house wiring via outlet integrated interface, comprising data connector 58 and interface adapter 56. Interface adapter 56 functions to include all circuitry required in order to support the required interface when connected to the data network, while the actual physical connection uses interface connector 58. In general, any serial or parallel data interface may be used. However, in most cases, the data interface supported as well as the connector 58 will adhere to a common standard data interface. Examples of such digital data interfaces are IEEE802.3-2002 10/100/1000BaseT, USB (Universal Serial Bus), IEEE1284-1994, EIA/TIA-232, IEEE1394-1995, as well as others. Furthermore, the interface supported by the outlet 50 through connector 58 may also be of analog type rather than the digital type described. Some examples are:

1. Analog video interface. The outlet may be used to input analog video, output analog video or both. It should be noted that this video is to be distinguished from the CATV video signal carries as basic service, but rather involves a video signal carried in digital form as part of the data network formed. An outlet supporting an analog video interface is described in WO 03/039150 entitled: "OUTLET WITH ANALOG SIGNAL ADAPTER, A METHOD FOR USE THEREOF AND A NETWORK USING SAID OUTLET" to the present inventor and assignee. In such an outlet, the interface adapter 56 comprises Analog to Digital (A/D) or Digital to Analog (D/A) converters as appropriate.

2. Analog voice (audio) interface. The outlet may be used to input analog voice, output analog voice or both. It should be noted that this voice is to be distinguished from the telephony signal carried as basic service, but rather involves a voice signal carried in digital form as part of the data network formed. In such an outlet, the interface adapter 56 comprises Analog to Digital (A/D) or Digital to Analog (D/A) converters as appropriate.

3. Telephone interface. The outlet may be used to connect to a telephone device. It should be noted that this telephone signal is to be distinguished from the telephone signal carried as basic service, but rather involves a telephone signal carried in digital form as part of the data network formed. An outlet supporting telephone interface is described in WO 03/005691 entitled: "TELEPHONE OUTLET WITH PACKET TELEPHONY ADAPTER, AND A NETWORK USING SAME" to the present inventor and assignee. In such an outlet, the interface adapter 56 comprises Analog to Digital (A/D) or Digital to Analog (D/A) converters as appropriate.

In the basic scenario, interface adapter 56 can be directly connected to the medium modem 54, allowing signal flow from a unit connected to the outlet via connector 58 and interface adapter 56 to the wiring via the wiring connector 51 through the medium modem 54 and the splitter/combiner 52. In such cases, hub 55 and management 57 are not required.

In a managed data network environment, it would be beneficial to include part or all of the network management functionalities into the outlet 50. For example, addressing means may be integrated into the outlet in order to allow the outlet to be remotely referenced. In yet another example, QoS (Quality of Service) tools are embedded into the outlet for measuring the service. Outlet integrated network management functionalities may comprise or support:

1. Performance management. Measure and track network variables such as throughput, response time and line utilization.
2. Configuration management. Monitor and change configuration information to track the affects of software and hardware elements.
3. Accounting management. Measure utilization so that use of network resources can be tracked and regulated.
4. Fault management. Detect, log, notify users of problems relating to the network running effectively.
5. Security management. Control access to network resources.

The network management functionalities are supported by the optional manage-ment/processing unit 57. Management functionalities may also include local—on outlet—visual indicators. The management/processing unit 57 is coupled to all relevant functions in the outlet such as medium modem 54, hub 55 and interface adapter 56.

An optional multi-port unit (hub) 55, identical to hub 11 described above, may be used in order to mediate the multiple data streams in the outlet. Basically, the hub 55 mediates between the data stream associated with the external data device connected via connector 58 and interface adapter 56 and the network formed over the wiring via medium modem 54.

Figure 4:
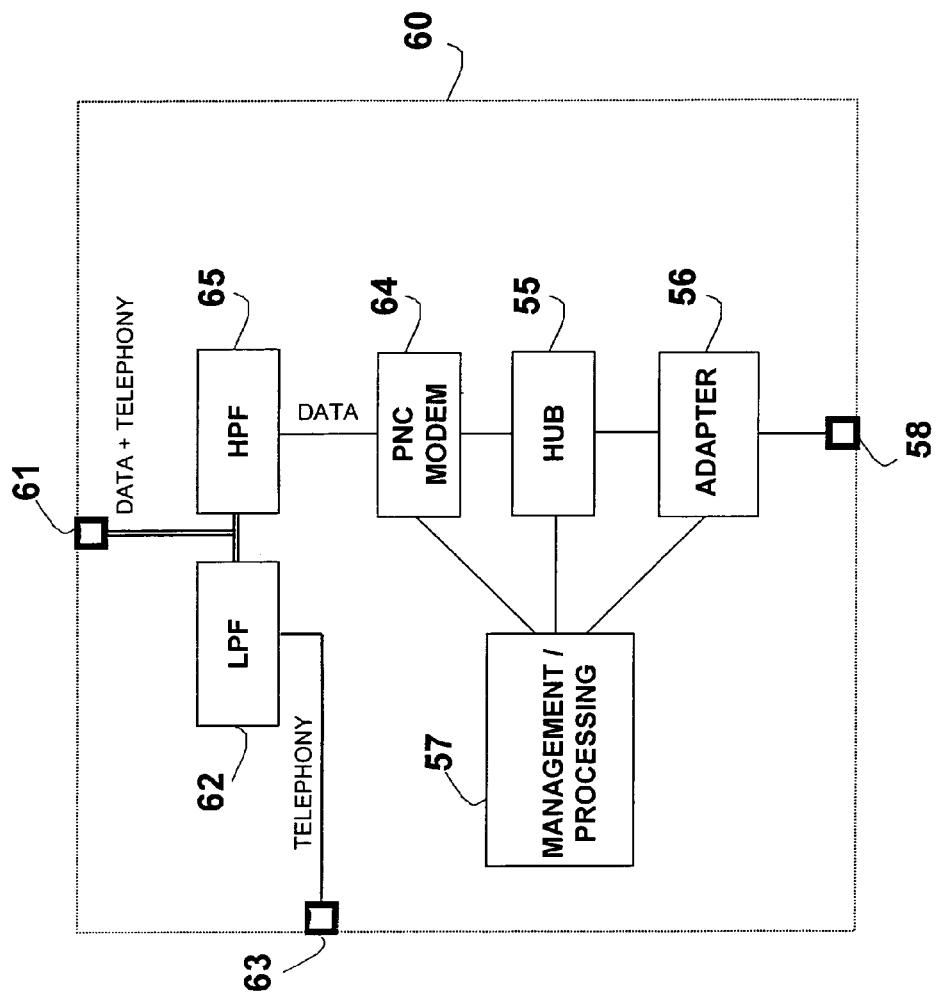
FIG. 4 shows a block diagram of an exemplary outlet over telephone wiring.

A telephone outlet 60 is shown in FIG. 4 as a non-limiting example of outlet 50. The outlet 60 is based on HomePNA-based network 40 described above in FIG. 3. Connector 61, associated with connector 51 of outlet 50, is used to connect to the in-house telephone wiring. Splitter/combiner 52 of general outlet 50 are implemented by a set of Low Pass Filter (LPF) 62 and High Pass Filter (HPF) 65, which are respectively equivalent to LPF 37 and HPF 38 of network 40. Similarly, the medium modem 54 of general outlet 50 is implemented by PNC (phonelines carrier) modem 64. Connector 63 is a standard telephone connector (e.g. RJ-11 in North America) representing general service connector 53 of general outlet 50.

Figure 5:
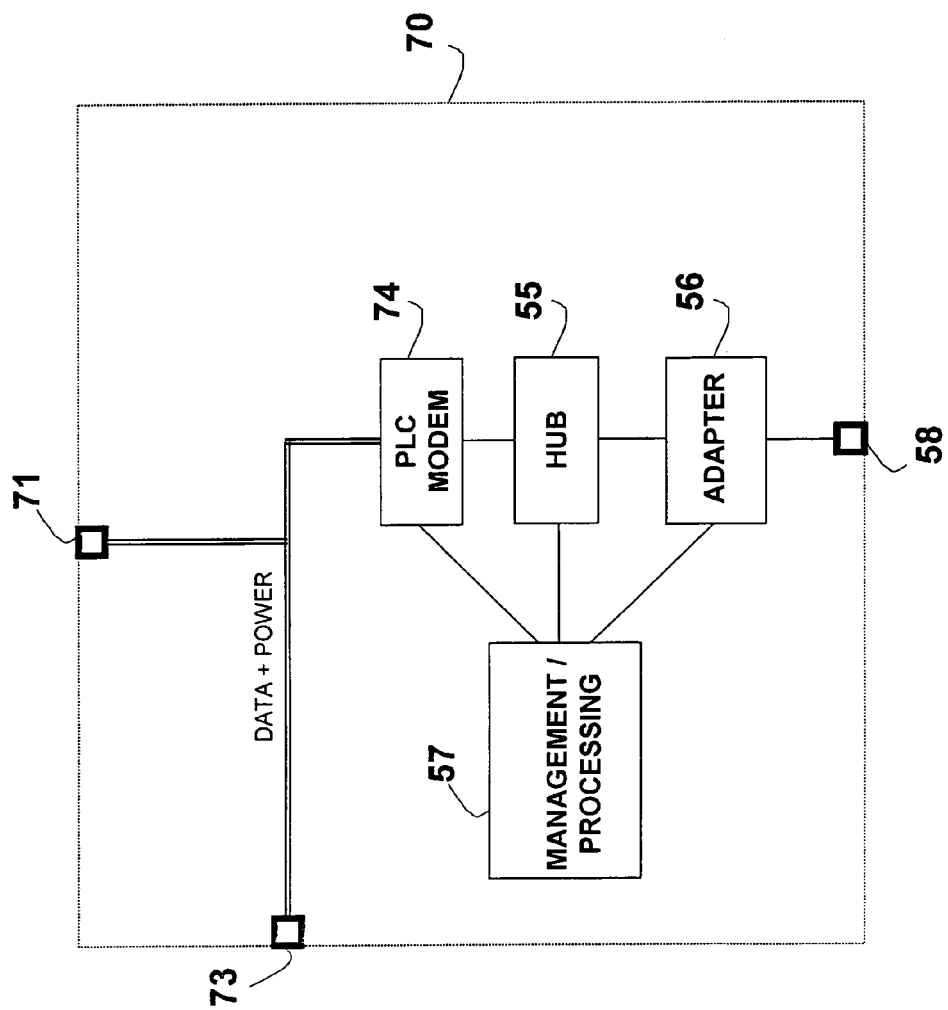
FIG. 5 shows a block diagram of an exemplary outlet over electricity power wiring.

Similarly, an example of powerline outlet 70 is shown in FIG. 5. The outlet comprises power connector 73 retaining the original AC power device, wiring connector 71 to connect to the AC power wiring and PLC modem 74 (identical to PLC 82 above). In this example, no separation is required between the wiring, the PLC modem 74 and the power connection 73, hence splitter/combiner 52 of the general outlet 50 is not required. Some PLC modem 74 implementations may still require such separation device.

Figure 6:
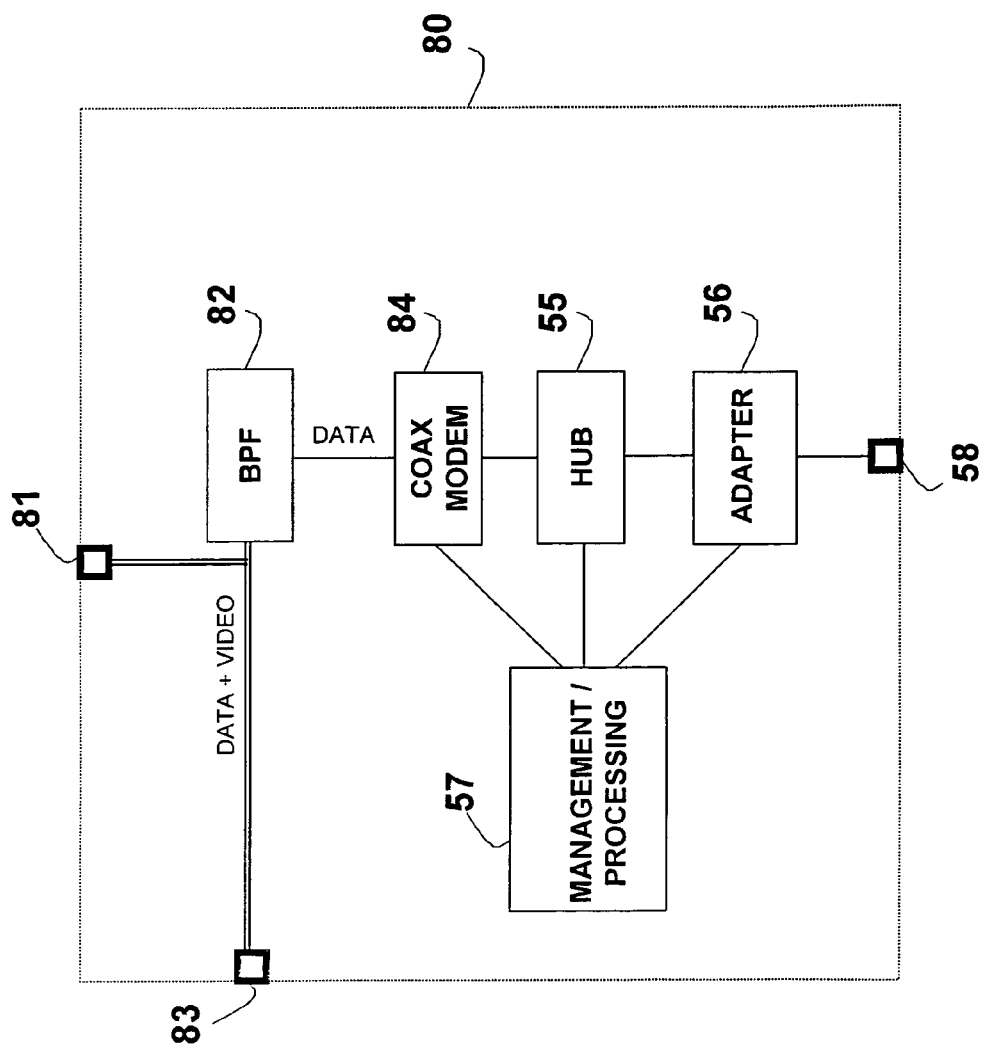
FIG. 6 shows a block diagram of an exemplary outlet over CATV wiring.

Another example of the general outlet 50 is the CATV outlet 80 shown in FIG. 6. Connector 81 provides the connection to the coaxial cable, and the CATV service is retained via RF connector 83. A coax modem 84 is used as the medium modem 54. In most cases the data network uses one of the video channels carried over the coaxial cable, the splitter/combiner 52 is implemented by BPF 82, and the connector 83 is directly connected to the wiring connector 81.

Modular Outlet.

The current invention teaches a network-based outlet whose functions are partitioned into two distinct parts in a modular approach. The first part of the outlet is referred to herein as a 'base module' and consists of a mechanical structure which is mechanically attached to the wall and connects to the in-wall wiring in the same way as applied to a typical outlet. The second part of the outlet, referred to herein as an 'interface module' allows for access to the data network, and is mechanically secured to the base module. The electrical connection between the modules makes use of a pair of mating connectors. The base module is installed in the same way as outlets are known to be installed, requiring the same skill-set and know-how. However, the interface module is attached to the base module in a quick, hassle-free, non-professional and simple process, hence allowing a typical consumer to execute 'Do-It-Yourself' installation.

Figure 7:
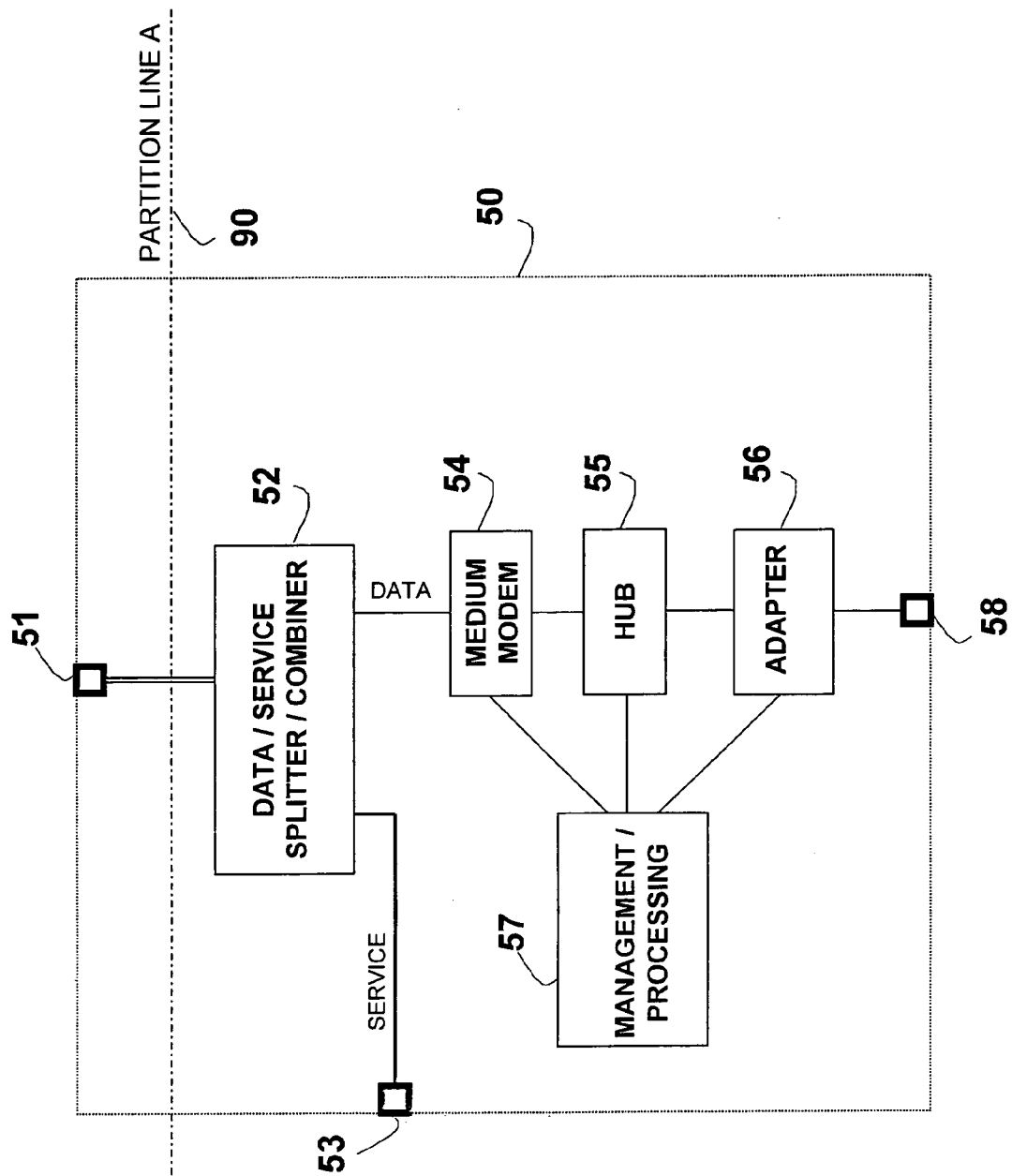
FIG. 7 shows a partition A of a block diagram of an exemplary outlet over existing wiring.
Figure 8:
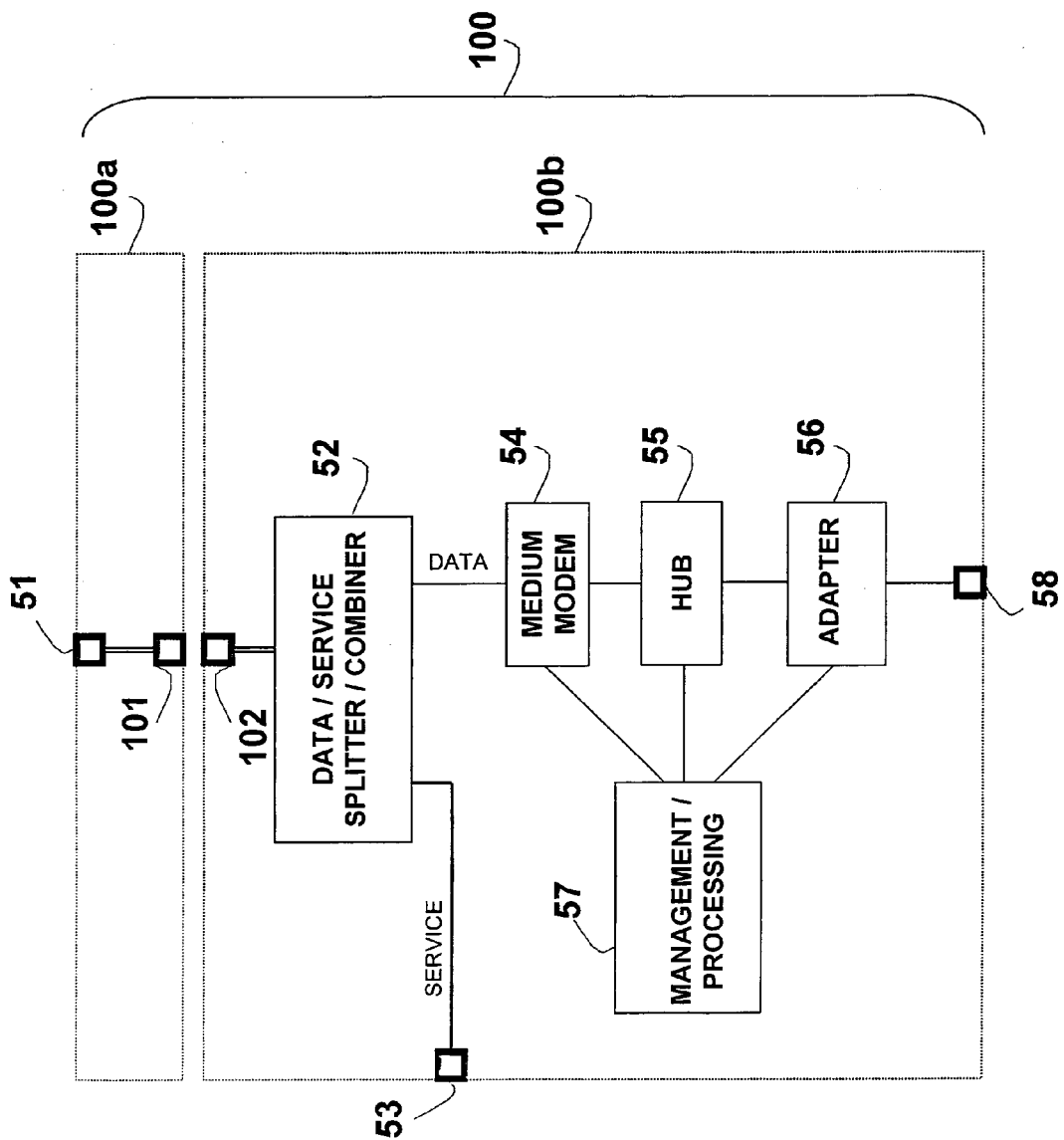
FIG. 8 shows a block diagram of an exemplary outlet over existing wiring according to the present invention.

The functions included in such an outlet are partitioned between the base and the interface modules. Various partitions may apply, as will be described hereinafter. For the sake of simplicity, the following examples will be applied to a telephone outlet Partition A A first partition according to the invention, referred to as 'partition A', is shown by partition A denoted by a partition line 90 in FIG. 7. In partition A, the partition line 90 is inserted between the wiring connector 51 and the splitter/combiner 52 of outlet 50. A general outlet 100 implementing partition A is shown in FIG. 8. Outlet 100 comprises base module 100a and interface module 100b. The two modules are connected by mating connectors 101 and 102, integrated within base module 100a and interface module 100b respectively. In this configuration, all the active components and functionalities of the outlet 50 are included in the interface module 100b, while the base module 100a comprises the wiring connector 51 and an interface connector 101, being directly connected to each other. It should be noted that said connectors are distinct, wherein connector 51 is used for connecting to the wiring and the interface connector 101 is used for connecting to a mating connector 102 of the interface module 100b. In some implementations, base module 100a may also comprise protection devices (e.g. power surge or lightning protection).

Figure 9:
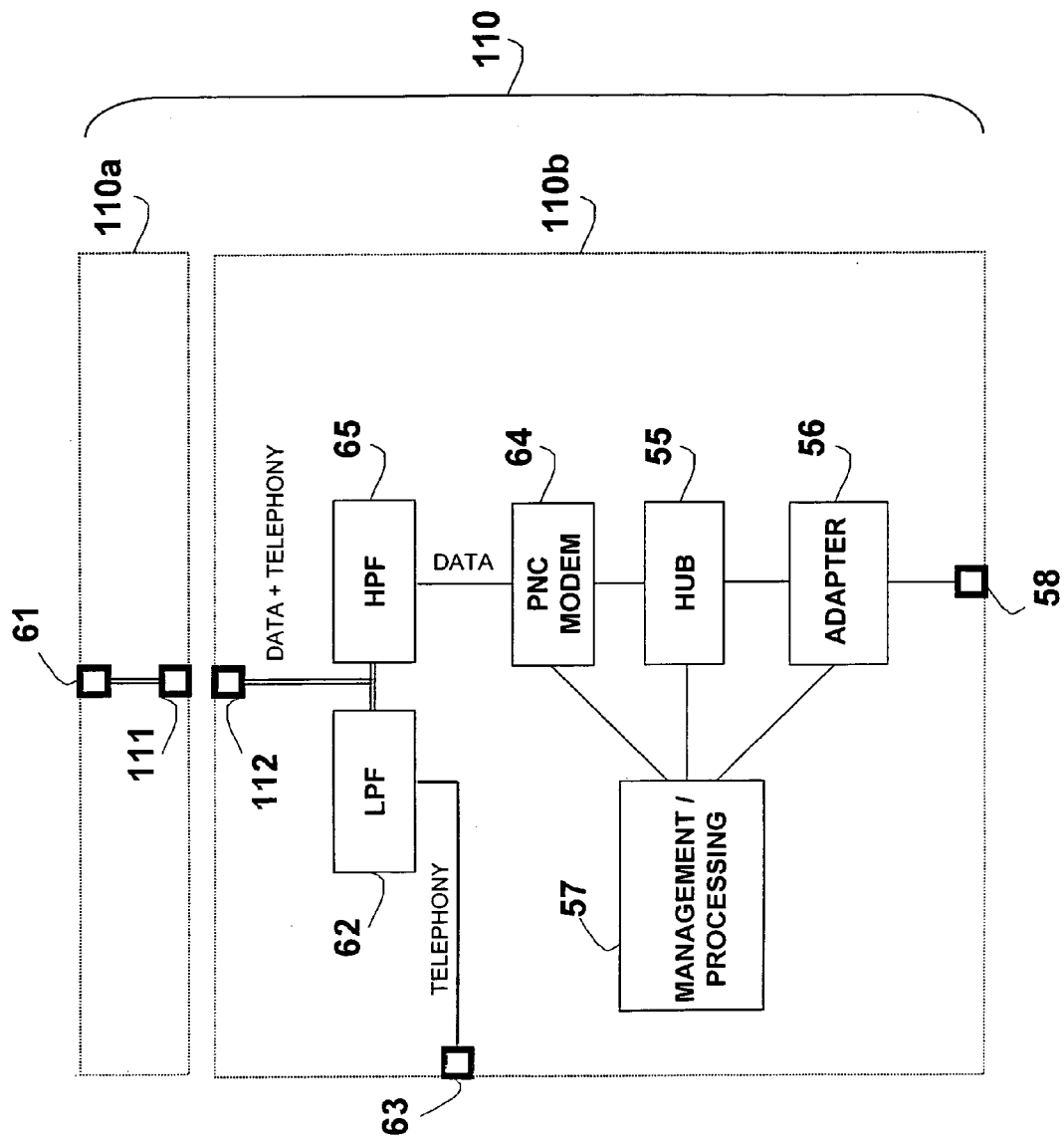
FIG. 9 shows a block diagram of an exemplary outlet over telephone wiring according to the present invention.

Outlet 110 shown in FIG. 9 is an example of implementing partition A in telephone outlet 60. Outlet 110 comprises a base module 110a and interface module 110b, corresponding to the module 100a of the general outlet 100 and to the interface module 100b, respectively. Similarly, mating connectors 111 and 112 are used to interconnect the modules, respectively corresponding to connectors 101 and 102 of outlet 100.

Figure 11:
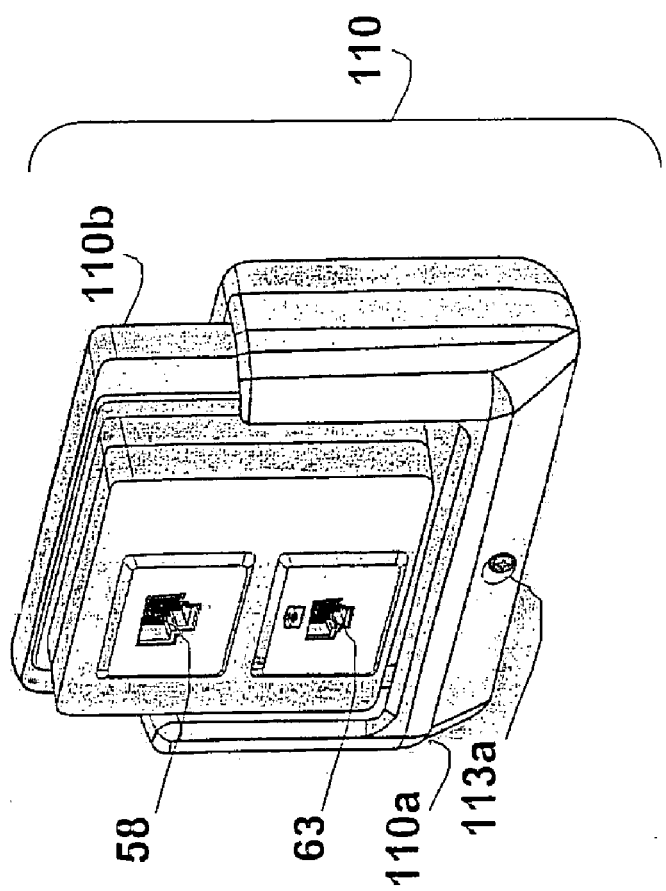
FIG. 11 shows a pictorial view of an exemplary outlet over telephone wiring according to the present invention.

A non limiting example of a pictorial view of outlet 110 is shown in FIGS. 10a through 11. FIG. 10a illustrates a front view of the base module 110a and the interface module 110b. Screw holes 113a and 113b serve as a first mount for securing a casing 114 of the base module 110a to the outlet cavity, as usually used for attaching outlets to a wall in North America. Base module 110a comprises side rails 115a and 115b, into which the interface module 110b slides, and which serve as a second mount for mechanically attaching the interface module 110b to the base module 110a. Upon securing the interface module 110b within the rails, contact is made between connector 111 in the base module 110a and the mating connector 112 shown in FIG. 10b. RJ-11 telephone connector common in North America is shown as connector 63 and RJ-45 data connector used in Ethernet 10/100/1000BaseT networks is shown as connector 58, both comprise part of the interface module 110b. FIG. 10b shows the rear view of the two mating modules. Screw type connector 61 is shown, used to connect the telephone wire pair 116 to the base module 110a. A complete outlet 110 comprising both modules attached mechanically and connected electrically is shown in FIG. 11.

For the sake of brevity, the above example of partition A is demonstrated relating only to telephone outlet 60. However, it should be noted that the partition can be equally applied to power outlet 70 and CATV outlet 80.

Partition A uses simple and cheap wiring-only base module 100a, while all the outlet functionalities are included in the interface module 100b. As such, the user has full flexibility to change and upgrade either the data network related functions (such as the medium modem 54) or the interface related functions (such as interface connector 58 and the related interface adapter 56) or both. Such upgrade will not require any change or modification of the base module 100a.

Partition B

In most cases the network-based outlet is required to retain the basic service, being telephone, power or CATV. In partition A configuration, the basic service can be accessed only as part as the interface module. Hence the base module cannot be used a stand-alone unit, but rather must always be accompanied and used as a set with the interface module. As such, outlets not used as part of the network must also include data networking functionalities, thus requiring always use of complex and expensive outlets.

Figure 12:
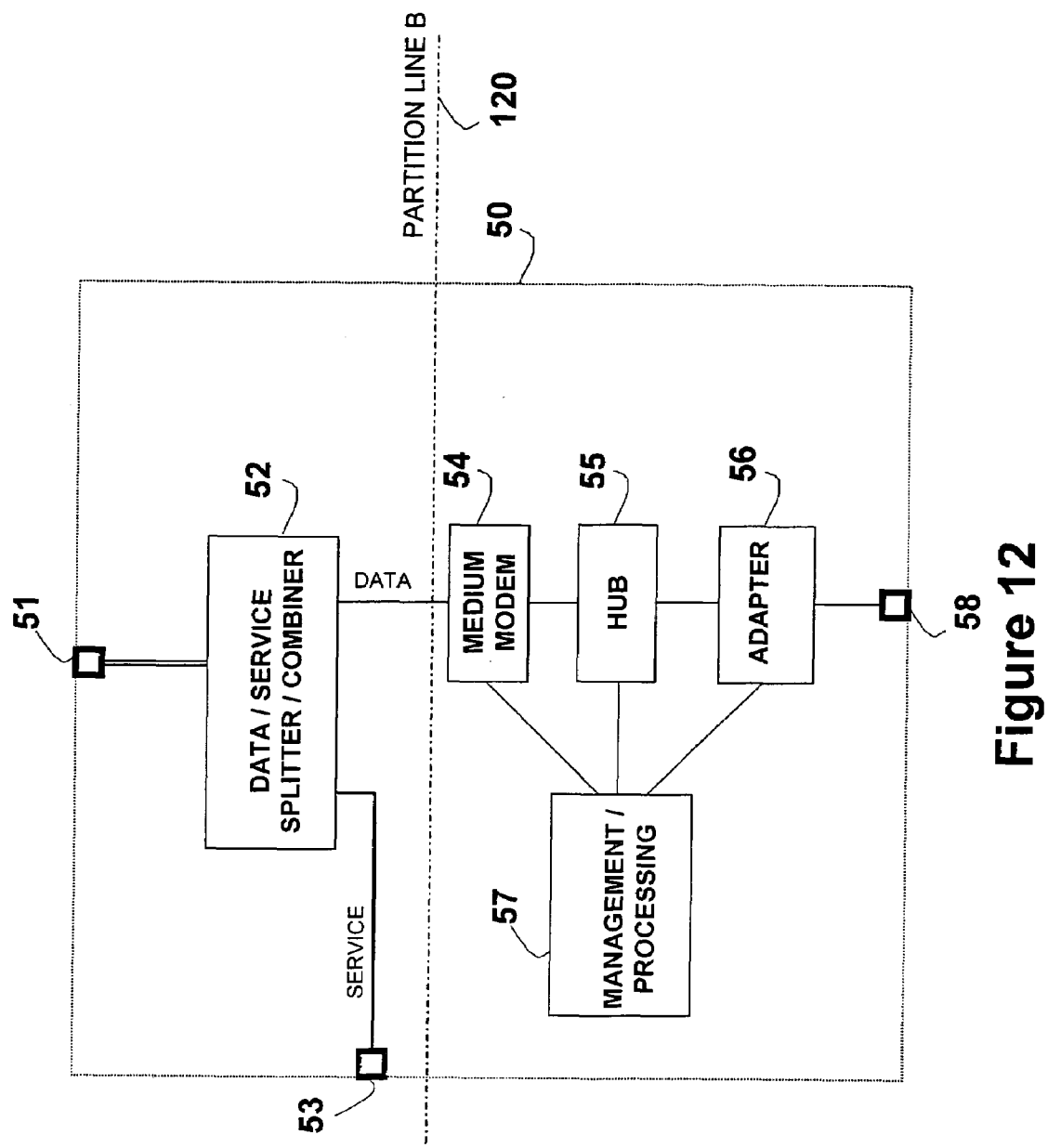
FIG. 12 shows a partition B of a block diagram of an exemplary outlet over existing wiring.
Figure 13:
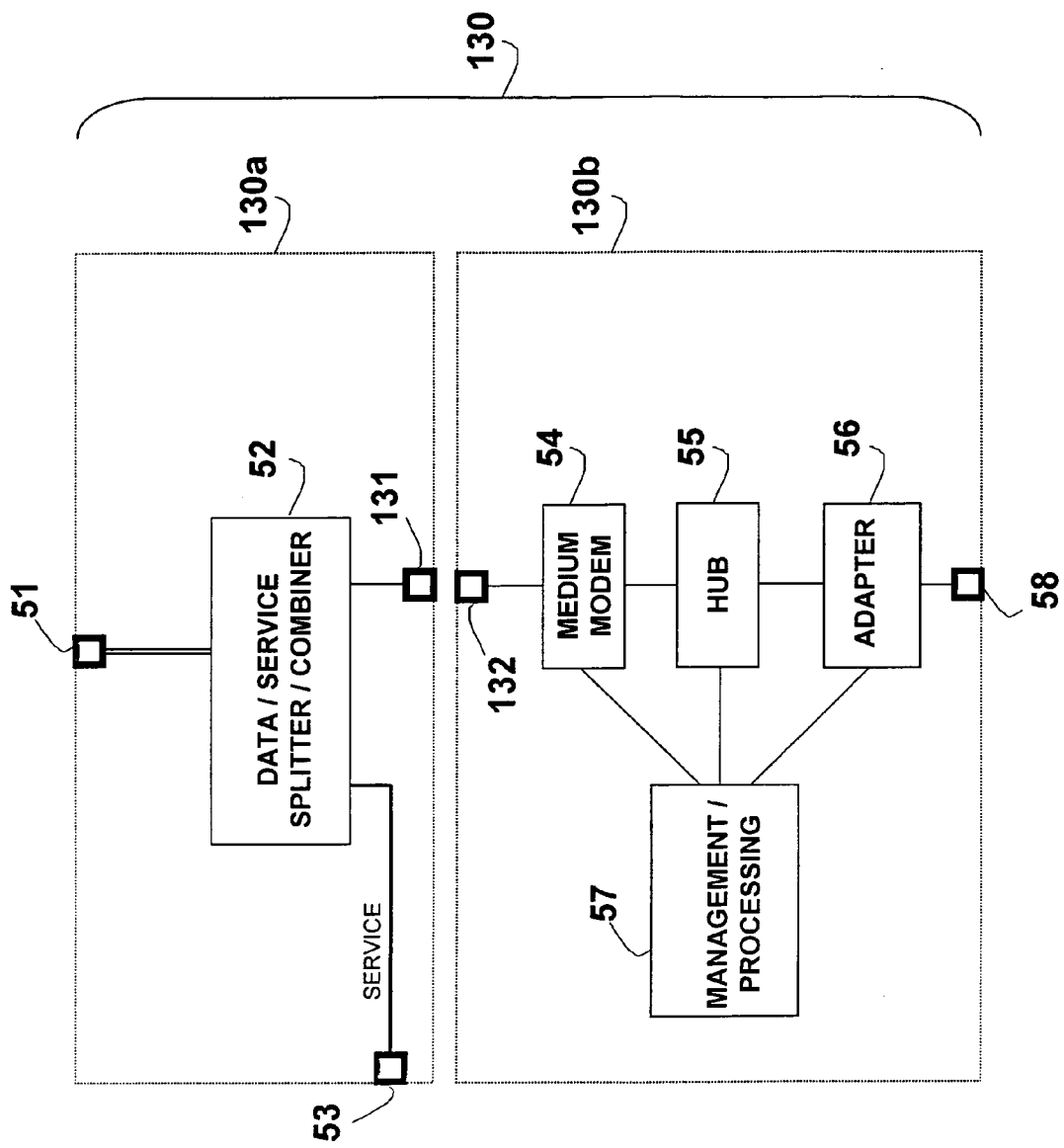
FIG. 13 shows a block diagram of an exemplary outlet over existing wiring according to the present invention.

Partition B is shown as partition line 120 in FIG. 12. In this configuration, the partition affects the connection between the splitter/combiner 52 to the medium modem 54. General outlet 130 described in FIG. 13 implements partition B and comprises base module 130a and interface module 130b. The two modules use the mating connectors 131 and 132 for interconnection, respectively housed as part of the base module 130a and the interface module 130b. The service connector 53 is part of the base module 130a, hence allowing for the basic service function even in the case wherein only the base module 130a is installed. In the case wherein the splitter/combiner 52 is not implemented, the base module consists only of the three connectors and interconnected wiring, being the wiring connector 51, the service connector 53 and interface connector 131 for connecting to the interface module 130b.

Since the base module 130a supports and retains the basic service via connector 53, the base module 130a can be used as a stand-alone device obviating the need for interface module 130b, in the case wherein a specific outlet is not required to support network connectivity. Still, the user has full flexibility to change and upgrade either the data network related functions (such as the medium modem 54) or the interface related functions (such as interface connector 58 and the related interface adapter 56) or both. Such upgrade will not require any change or modification of the base module 130a.

It should be noted that the interface connector 131 may be identical to the service connector 53. In such a case, two service connectors are supported, wherein one is targeted to be used for the basic service and the other may be used to serve the data communication network. In any case, both connectors are distinct from the wiring connector 51.

Figure 14:
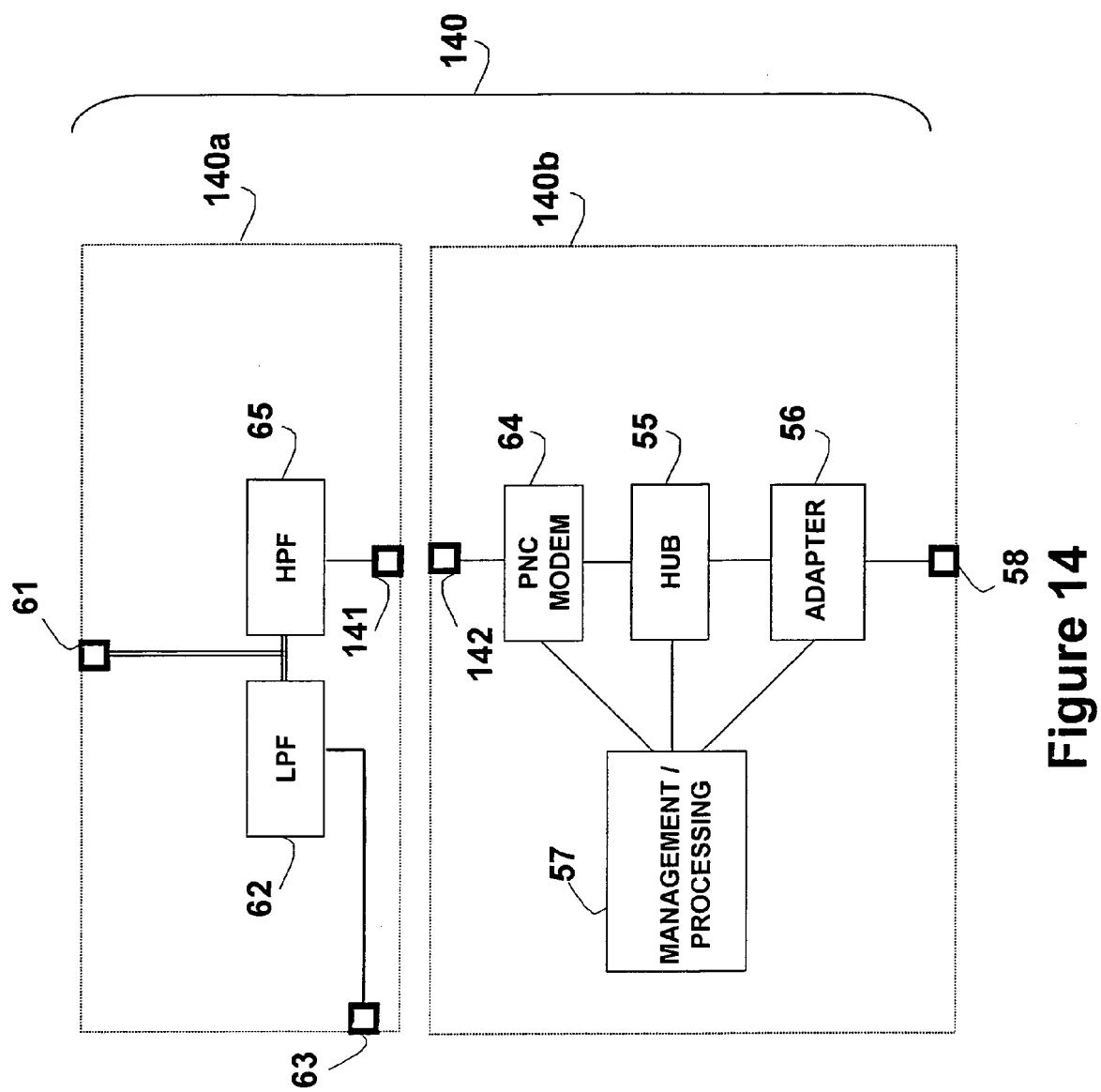
FIG. 14 shows a block diagram of an exemplary outlet over telephone wiring according to the present invention.
Figure 14B:
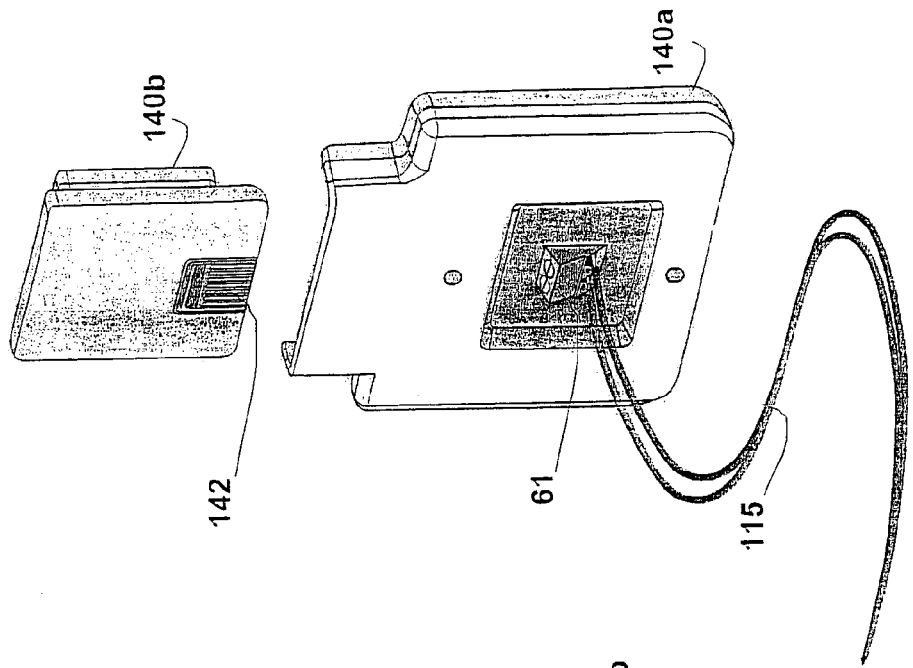
FIG. 14b shows a rear pictorial view of an exemplary outlet over telephone wiring according to the present invention.
Figure 14A:
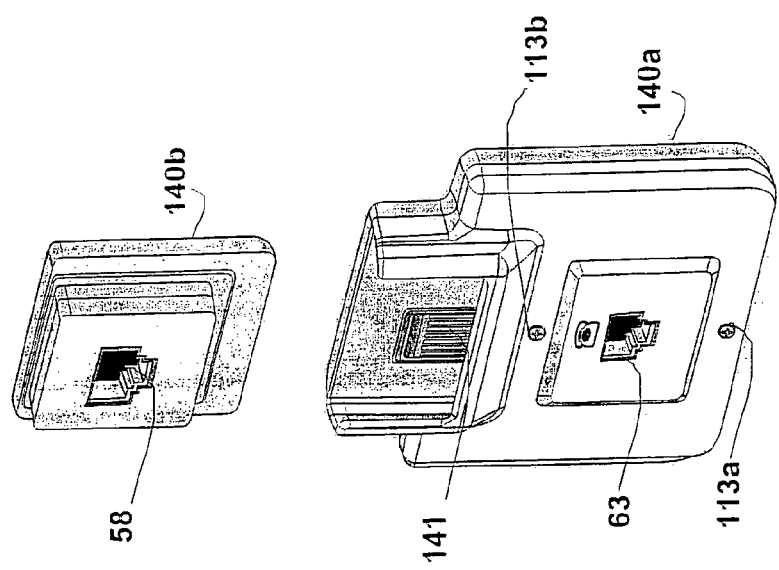
FIG. 14a shows a front pictorial view of an exemplary outlet over telephone wiring according to the present invention.
Figure 14C:
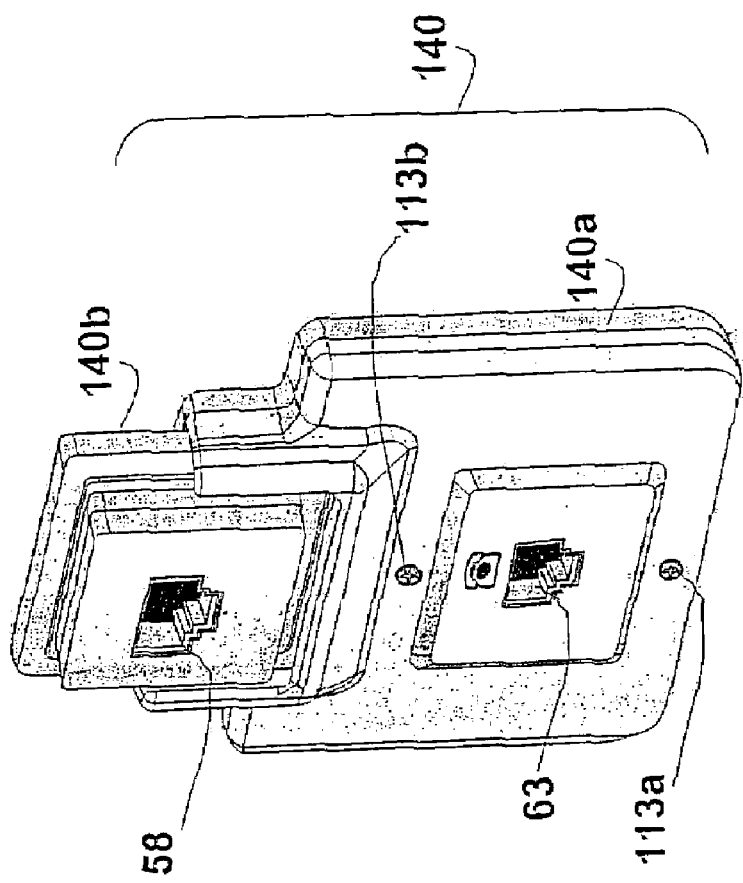
FIG. 14c shows a pictorial view of an exemplary outlet over telephone wiring according to the present invention.

The application of partition B to telephone outlet 60 will now be described with reference to a telephone outlet 140 shown in FIG. 14, comprising a base module 140a and interface module 140b, corresponding to base module 130a and interface module 130b of outlet 130. Similarly, mating connectors 141 and 142 correspond respectively to connectors 131 and 132 of outlet 130. A non limiting example of a pictorial view of outlet 140 is shown in FIGS. 14a through 14c. Similar to FIGS. 10a through 11, FIG. 11 illustrates front view of base module 140a and interface module 140b. Screw holes 113a and 113b allow for securing the base module 140a to the outlet cavity, as usually used for attaching outlets to a wall in North America. As shown in FIGS. 14a through 14c, the external view of the outlet 140 is different from outlet 110 shown in FIGS. 10a through 11 by the telephone connector 63 (and the relevant hardware) being housed in the base module rather than in the interface module.

For the sake of brevity, the above example of partition B is demonstrated relating only to telephone outlet 60. However, it should be noted that the partition can be equally applied to power outlet 70 and CATV outlet 80.

Partition C

Figure 15:
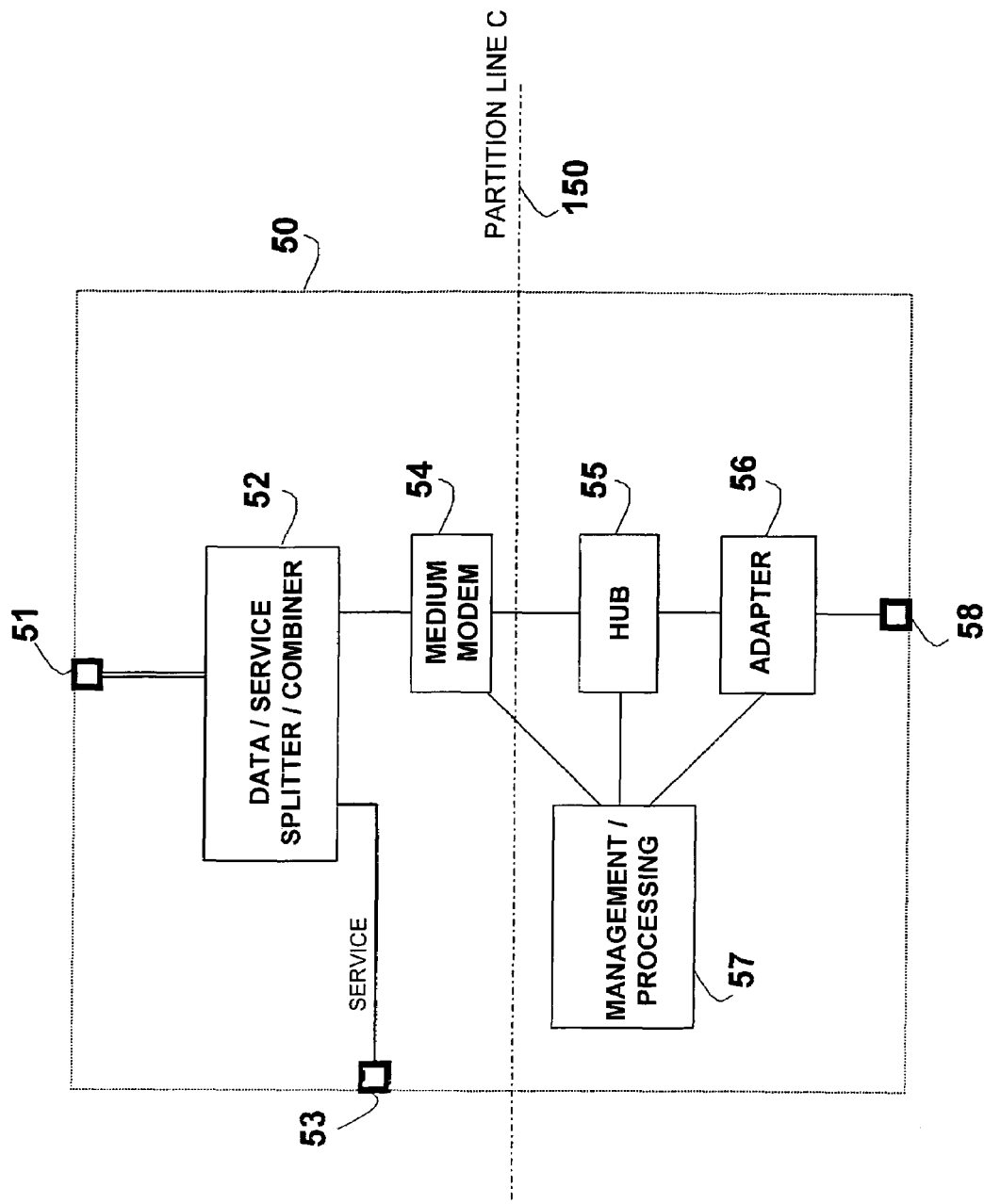
FIG. 15 shows a partition C of a block diagram of an exemplary outlet over existing wiring.

Since any outlet is always associated with specific wiring (e.g. telephone outlet is always connected to telephone wiring), and since the medium modem 54 is also always tailored towards the specific wiring (e.g. PNC modem 64 is optimized to communicate over the telephone wiring), it make sense to include the medium mode 54 within the base module. In this way the network backbone (signal and protocol) may be clearly distinguished from the user interface. In most cases, the medium modems 54 in all network-based outlets communicate with each other. As such, replacing or upgrading only a single outlet may result in interoperability malfunctions. By housing the medium modem 54 in the base module, which is expected to be rarely substituted, and separating it from the interface adapter 56 housed in the interface module, which is expected to be frequently modified in order to adapt to the evolving interfaces (but does not require to be inter-operable with other outlets), minimizes the interoperability issues which may be caused as part of replacing interface modules. Such partition is referred to herein as partition C, and is shown as partition line 150 in FIG. 15.

Figure 16:
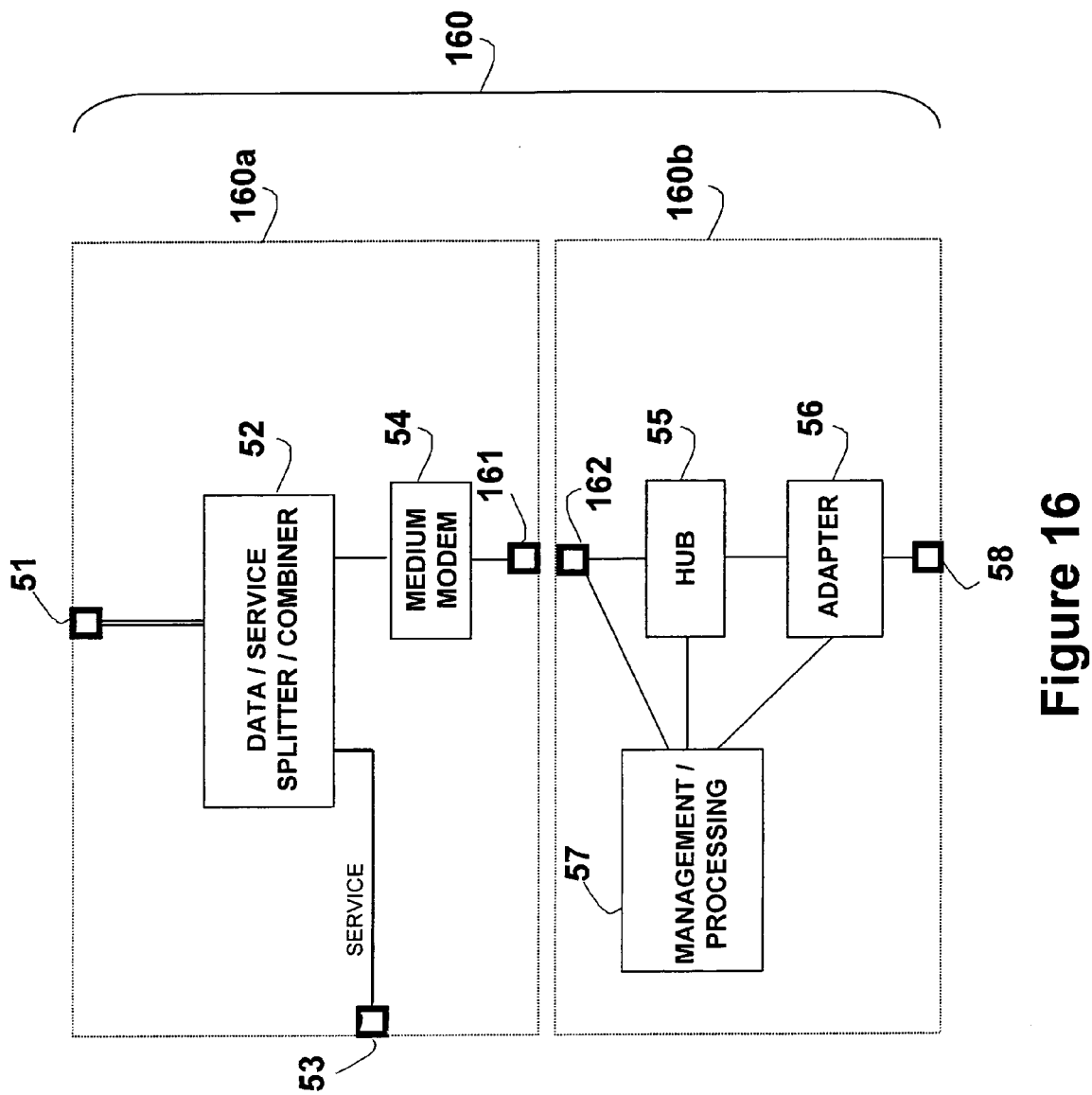
FIG. 16 shows a block diagram of an exemplary outlet over existing wiring according to the present invention.
Figure 16A:
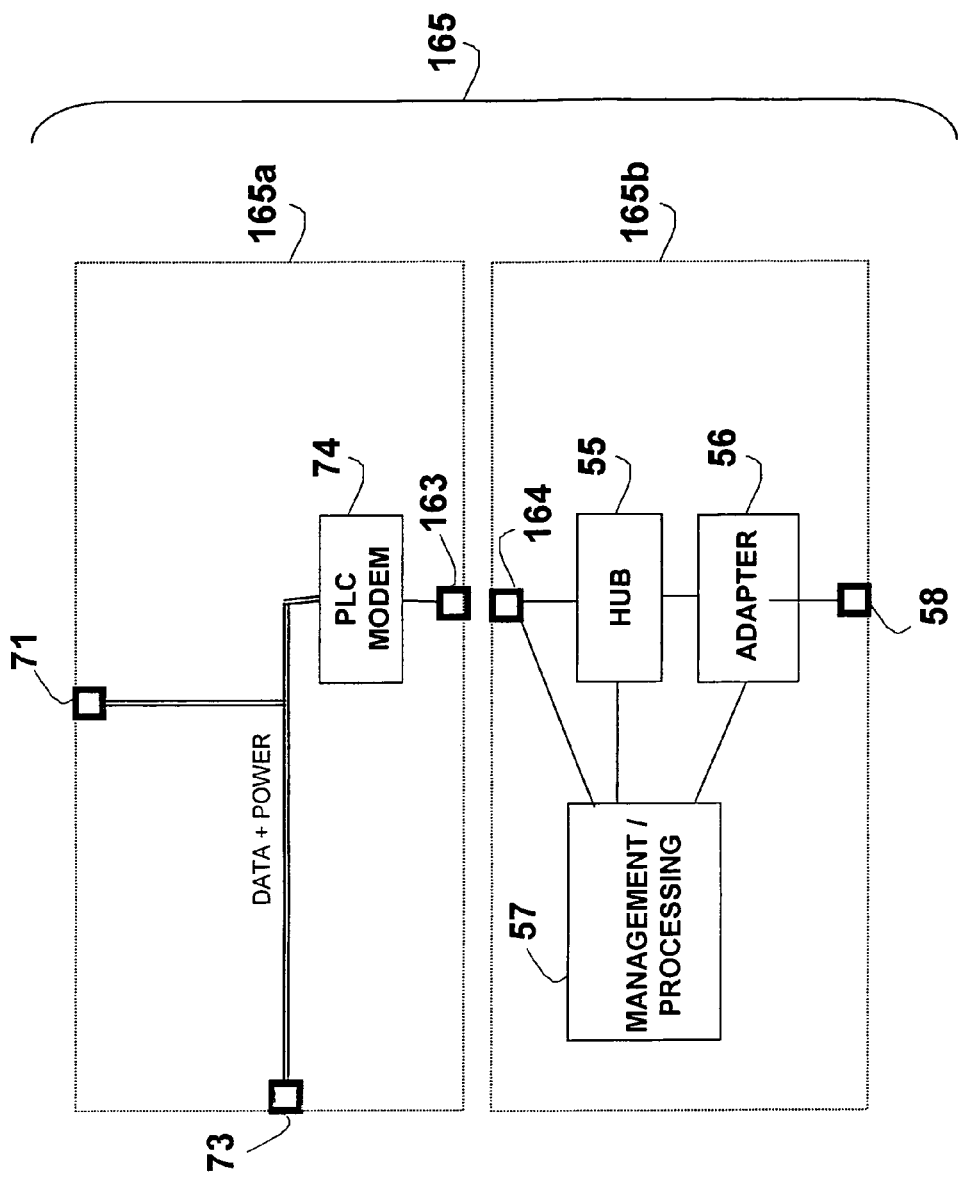
FIG. 16a shows a block diagram of an exemplary outlet over electrical power wiring according to the present invention
Figure 16B:
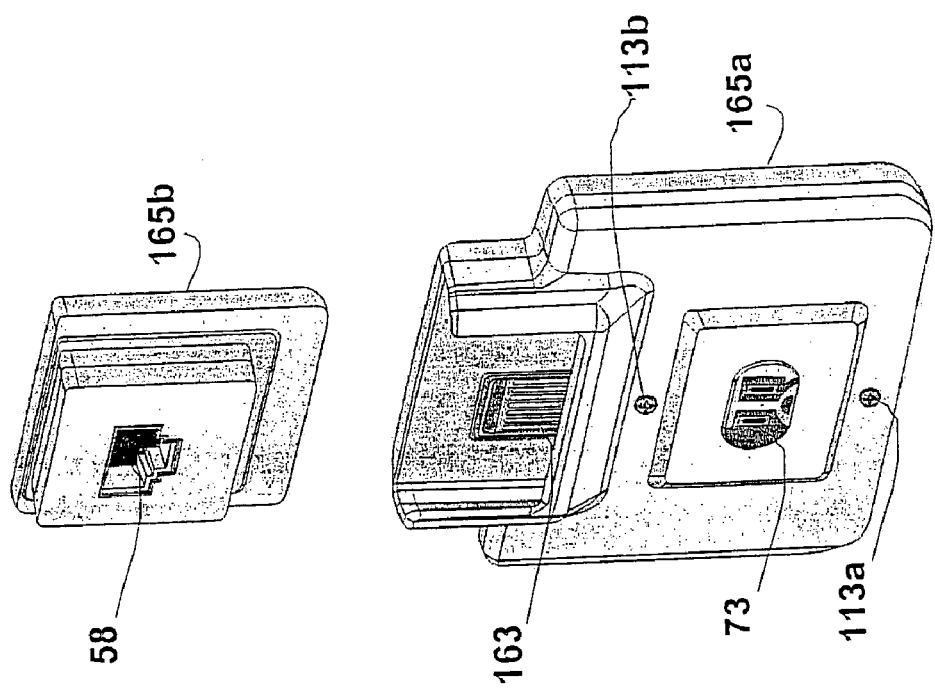
FIG. 16b shows a front pictorial view of an exemplary outlet over electrical power wiring according to the present invention.

General outlet 160 implementing partition C is shown in FIG. 16. The outlet 160 comprises base module 160a and interface module 160b, interconnected by the respectively mating connectors 161 and 162. Application of partition C with respect to power outlet 70 is shown in FIG. 16a, wherein connectors 163 and 164 are added to the base module 165a and interface module 165b, respectively. Similar to above FIGS. 11a and 14a the pictorial views of base module 165a and the interface module 165b are shown in FIG. 16b. Visually, power connector 73 is used, rather than the telephony connector 63 shown in the above figures.

For the sake of brevity, the above example of partition C is demonstrated relating only to power outlet 70. However, it should be noted that the partition can be equally applied to telephone outlet 60 and CATV outlet 80.

Partition D

Figure 17:
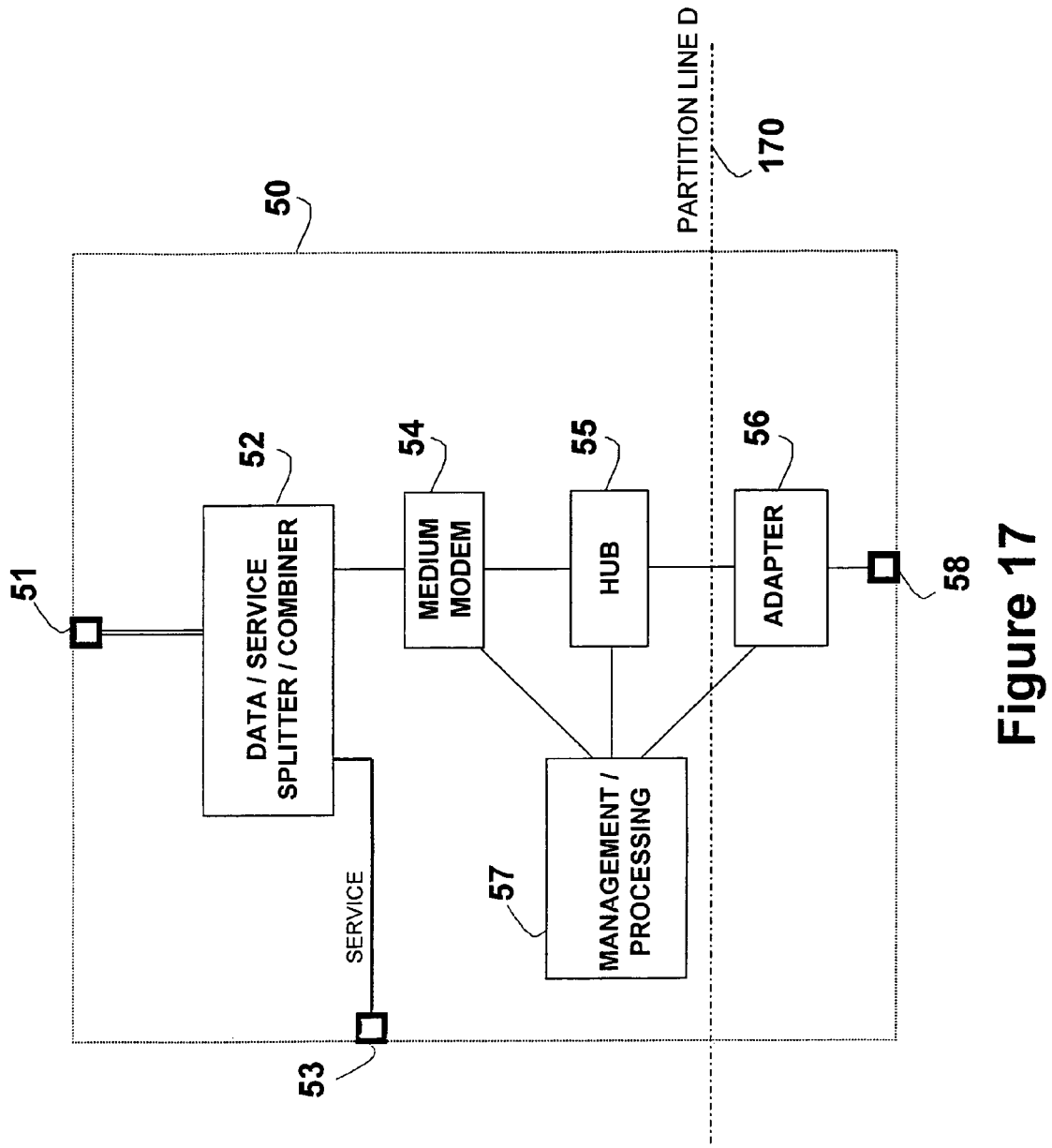
FIG. 17 shows a partition D of a block diagram of an exemplary outlet over existing wiring.
Figure 18:
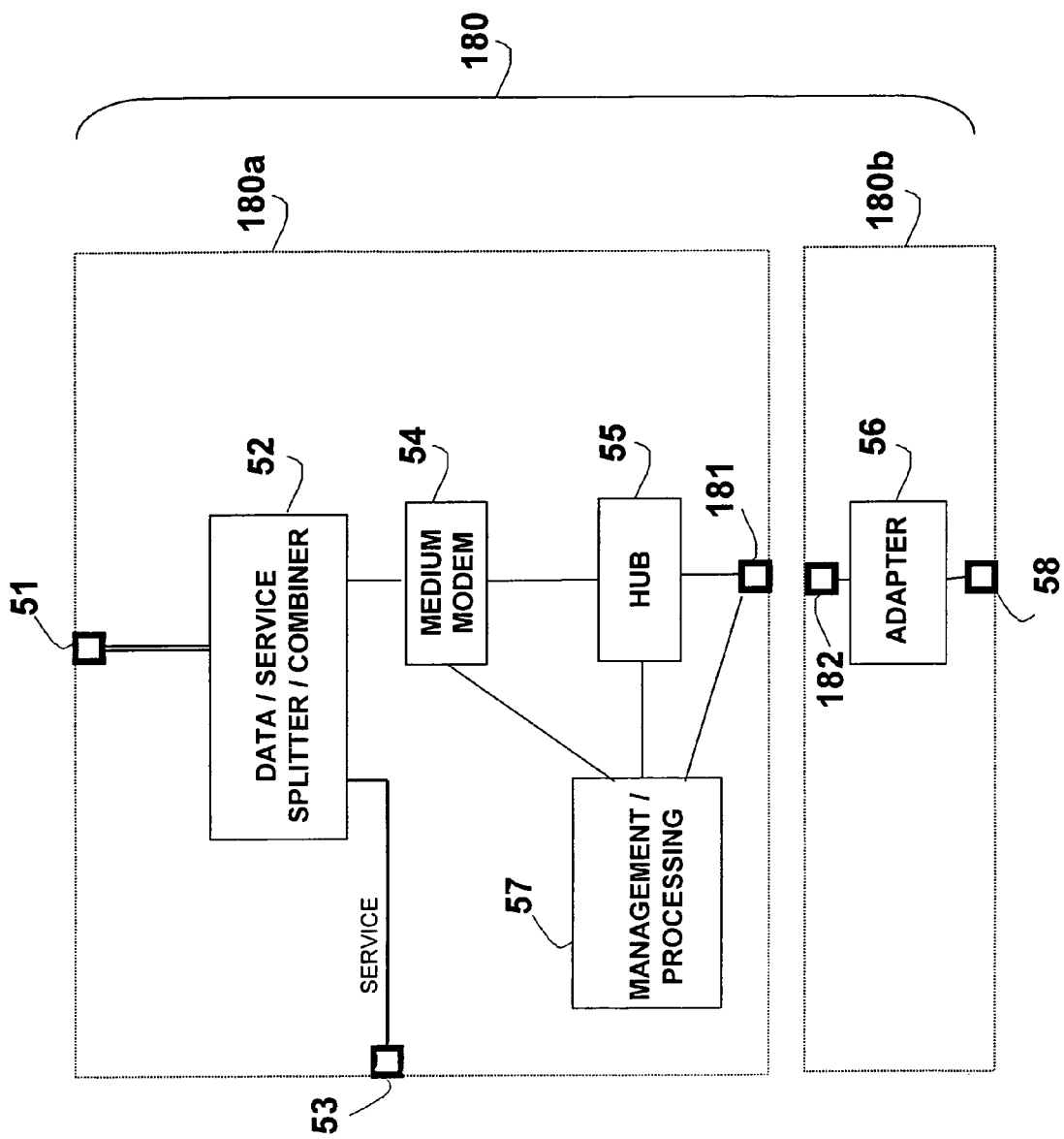
FIG. 18 shows a block diagram of an exemplary outlet over existing wining according to the present invention.
Figure 18A:
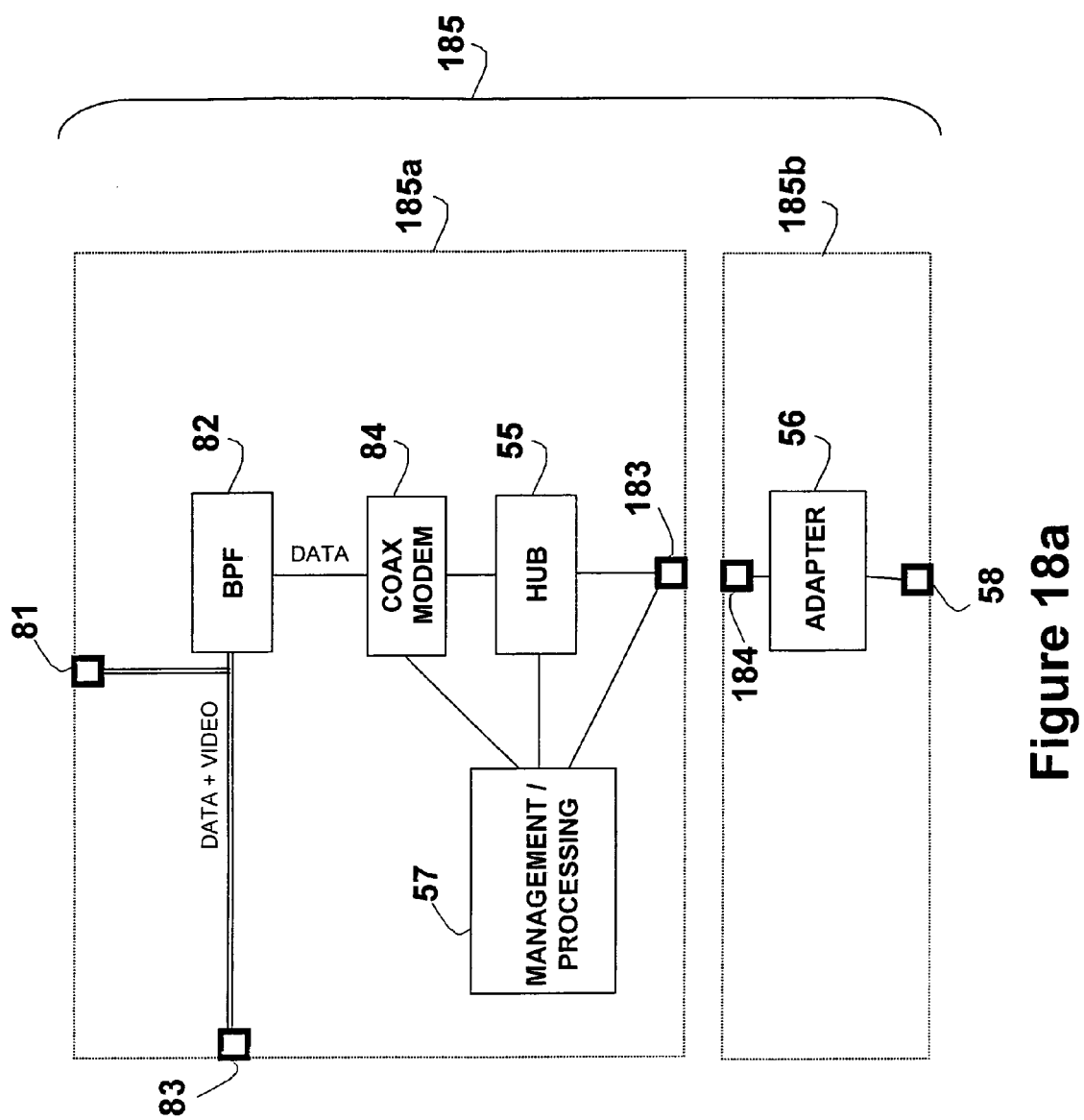
FIG. 18a shows a block diagram of an exemplary outlet over CATV wiring according to the present invention.
Figure 18B:
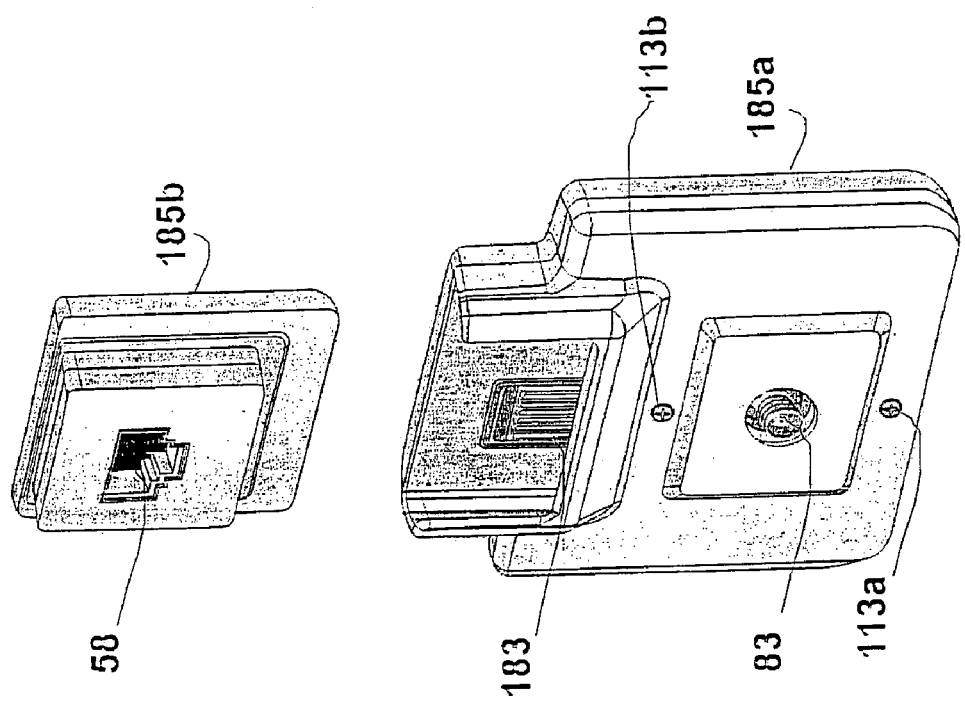
FIG. 18b shows a front pictorial view of an exemplary outlet over CATV wiring according to the present invention

Partition D, described by partition line 170 in FIG. 17 involves an interface module comprising all user interface-specific components such as interface adapter 56 and interface connector 58. Such partition allows for quick and easy upgrading of the outlet to support evolving and new interfaces and standards. General outlet 180 shown in FIG. 18 implements partition D, comprises base module 180a and interface module 180b, respectively interconnected by the mating connectors 181 and 182. Application of partition D with respect to CATV outlet 80 is shown in FIG. 18a, wherein connectors 183 and 184 are added to the base module 185a and interface module 185b, respectively. Similar to above FIGS. 11a and 14a the pictorial views of base module 185a and the interface module 185b are shown in FIG. 18b. Visually, F-Type CATV connector 83 is used, rather than the telephony connector 63 shown in the above figures.

For the sake of brevity, the above example of partition D is demonstrated relating only to CATV outlet 80. However, it should be noted that the partition can be equally applied to telephone outlet 60 and power outlet 70.

Partition E

Figure 19:
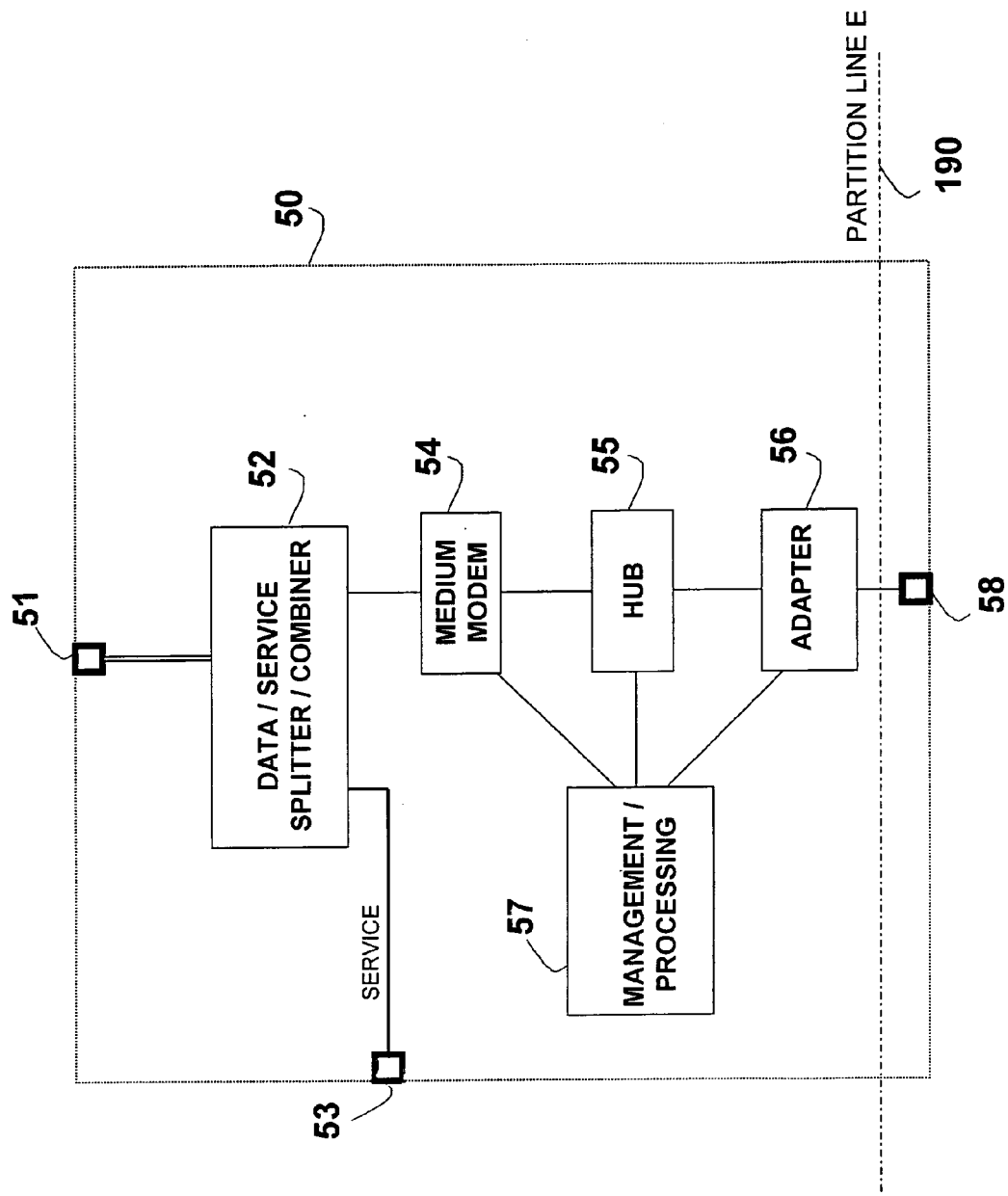
FIG. 19 shows a partition E of a block diagram of an exemplary outlet over existing wiring.
Figure 20:
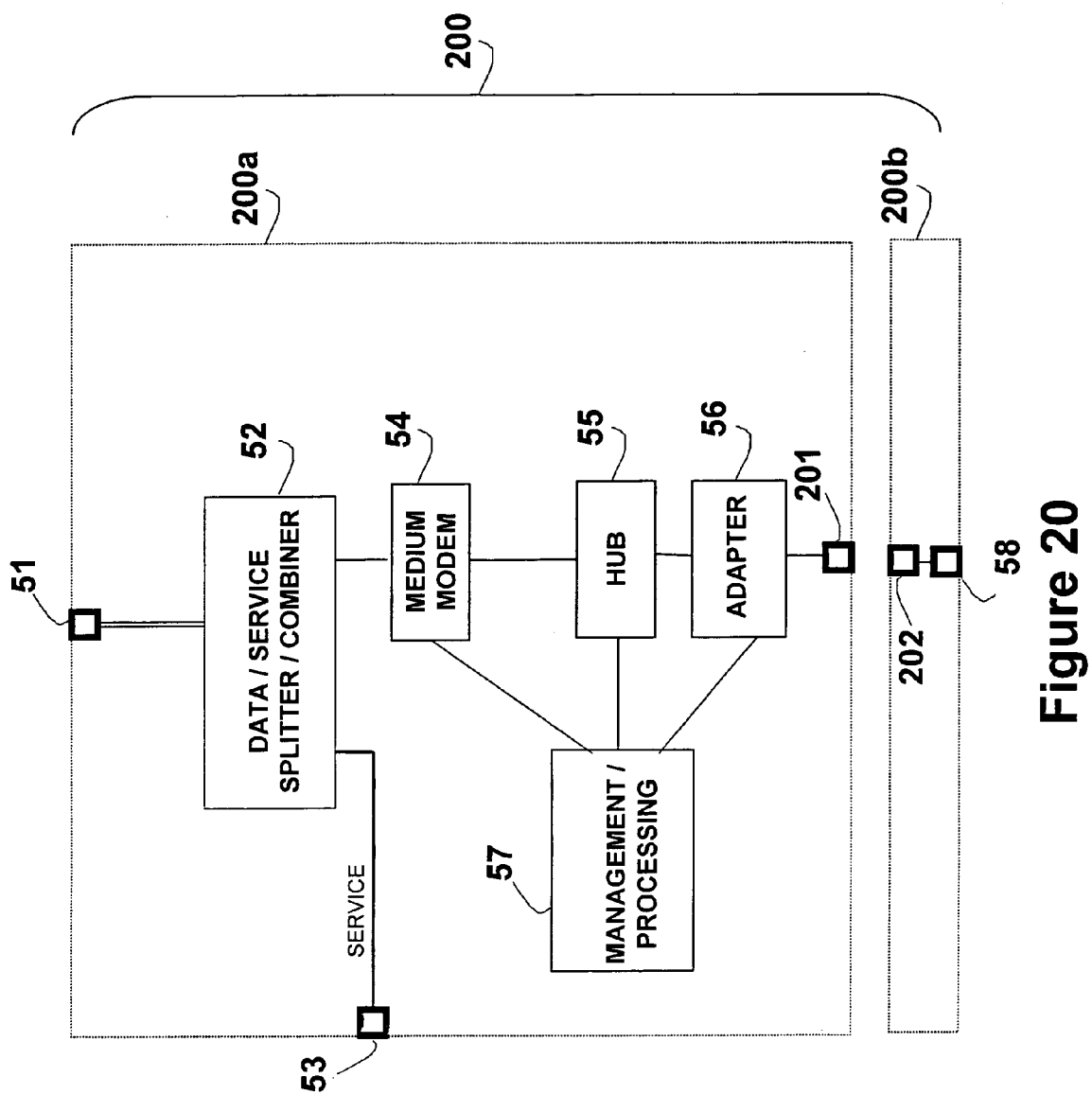
FIG. 20 shows a block diagram of an exemplary outlet over existing wiring according to the present invention.

Partition E, described by partition line 170 in FIG. 19 involves a passive interface module comprising wiring (connector) for connection to the adapter in the base module. Such partition allows for quick and easy upgrading of the outlet to support evolving and new connectors, wherein the interface electronics is not being modified. In one application example of conditional access the base module, while having all required electronics, still inhibits access to the data network, which can only be obtained by using the interface module, converting the module interface to a standard interface connector. General outlet 200 shown in FIG. 20 implements partition E, comprising base module 200a and interface module 200b, respectively interconnected by the mating connectors 201 and 202.

Partition F

Figure 21:
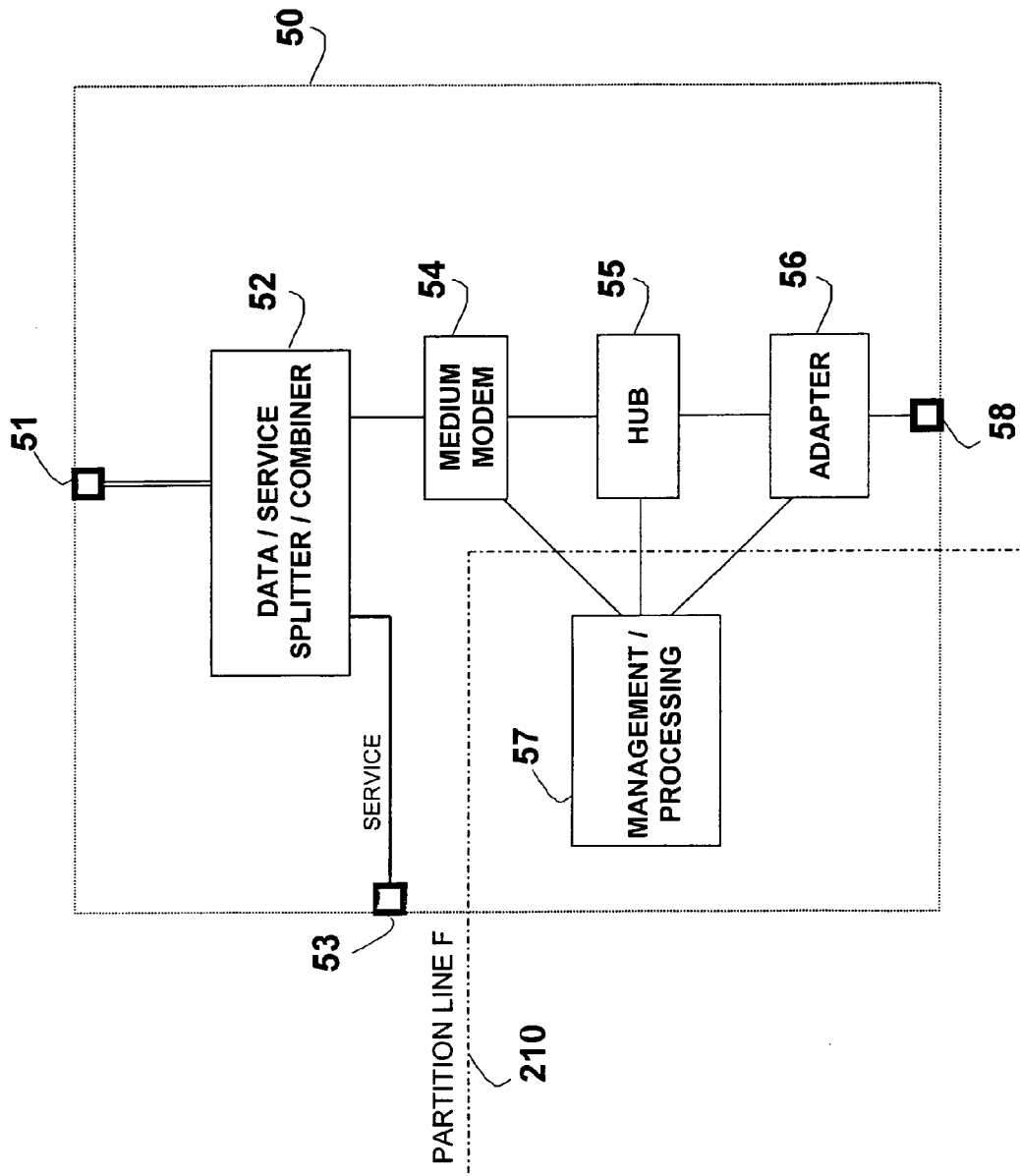
FIG. 21 shows a partition F of a block diagram of an exemplary outlet over existing wiring.
Figure 22:
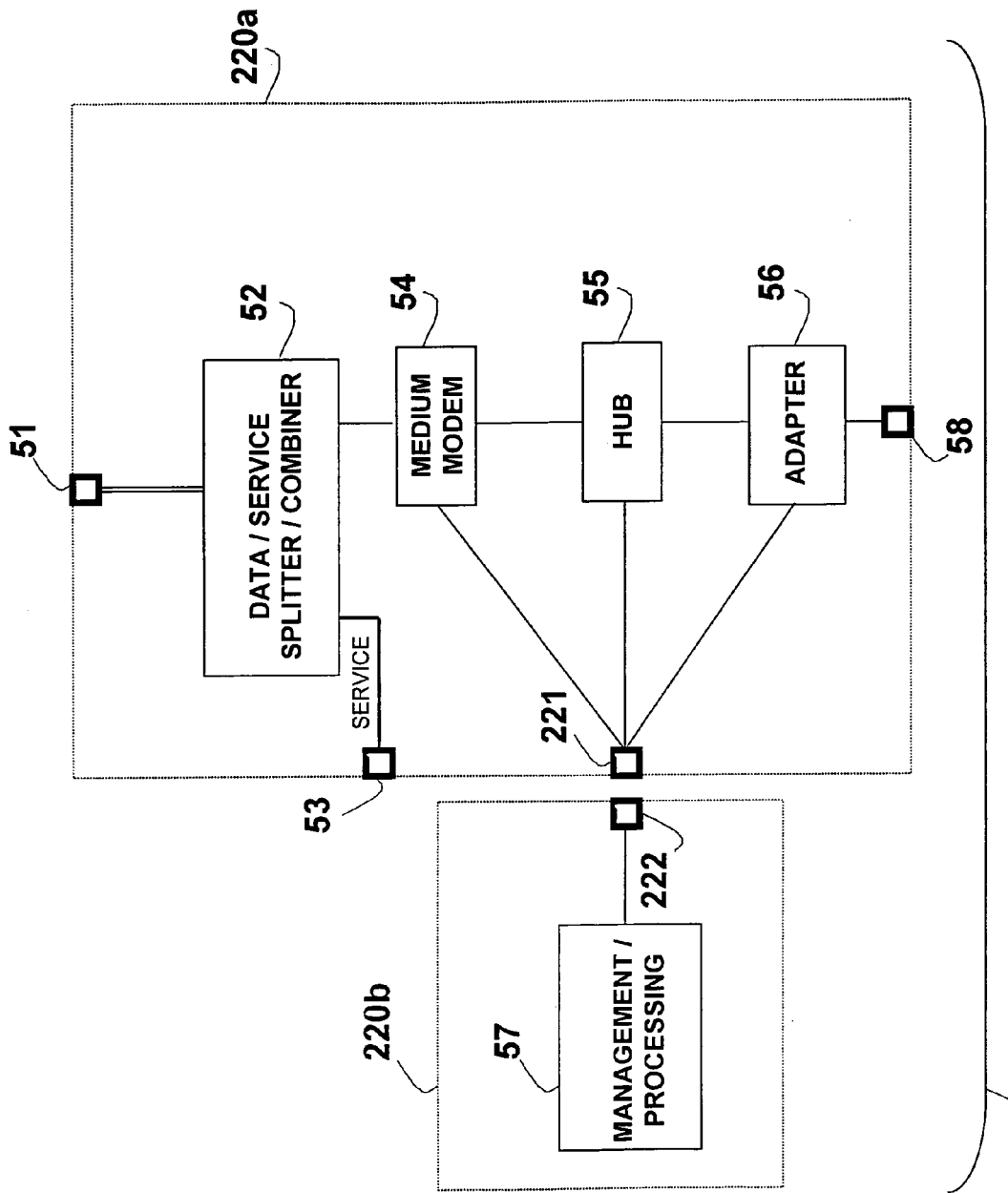
FIG. 22 shows a block diagram of an exemplary outlet over existing wiring according to the present invention.

All above partitions involves are oriented to the data flow between the data unit connected to the outlet to the wiring. Partition F, described by partition line 210 in FIG. 21 involves an interface module comprising all network management relating components such as part or all management/processing function 57. Such partition allows for quick and easy upgrading of the management functionality of the outlet. General outlet 220 shown in FIG. 22 implements partition F, comprising base module 220a and interface module 220b, respectively interconnected by the mating connectors 221 and 222.

LAN Environment

While the invention has been described with regard to networks formed over wiring used for basic services (e.g. telephone, CATV and power), it will be appreciated that the invention equally applied to outlet used in networks using dedicated wiring. In such scenario, the basic service is a single data network interface. However, it may be required to provide additional interfaces to an outlet, beyond the basic service of single data connectivity interface. For example, it may be used to provide multiple data interfaces wherein the wiring supports single such data connection. An example for such outlet is the Network Jack™ product family manufactured by 3Com™ of Santa-Clara, Calif., U.S.A. In addition, such outlets are described in U.S. Pat. No. 6,108,331 to Thompson titled: "Single Medium Wiring Scheme for Multiple Signal Distribution in Building and Access Port Therefor" as well as U.S. Patent Application US 2003/0112965 Published Jun. 19, 2003 to McNamara et al. titled: "Active Wall Outlet".

Figure 23:
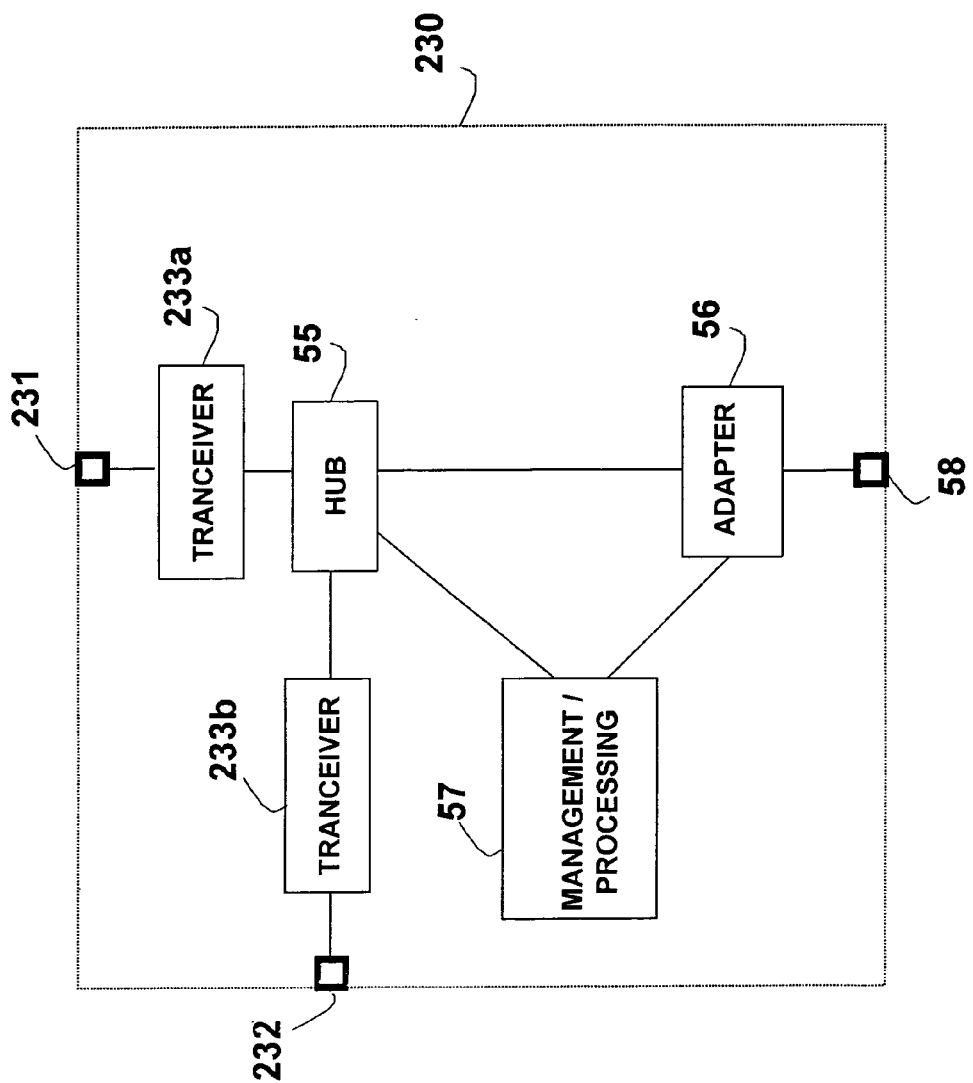
FIG. 23 shows a block diagram of an exemplary outlet over LAN wiring.

A non limiting functional block diagram of such an outlet 230 is shown in FIG. 23. While the general structure is similar to general outlet 50, some adaptations are required to the specific application. The data/service splitter/combiner 52 is not required since only a single type of signal is carried over the wiring. A simple transceiver 233 is used to transmit and receive signals over the network wiring. Transceiver 233a is used to interface the wiring via connector 231. The 'basic service' of data port is provided via data connector 232, using transceiver 233b. Both transceivers, as well as adapter 56 (connected to interface connector 58) all share the data via hub 55. The outlet is managed by management/processing function 57.

Figure 24:
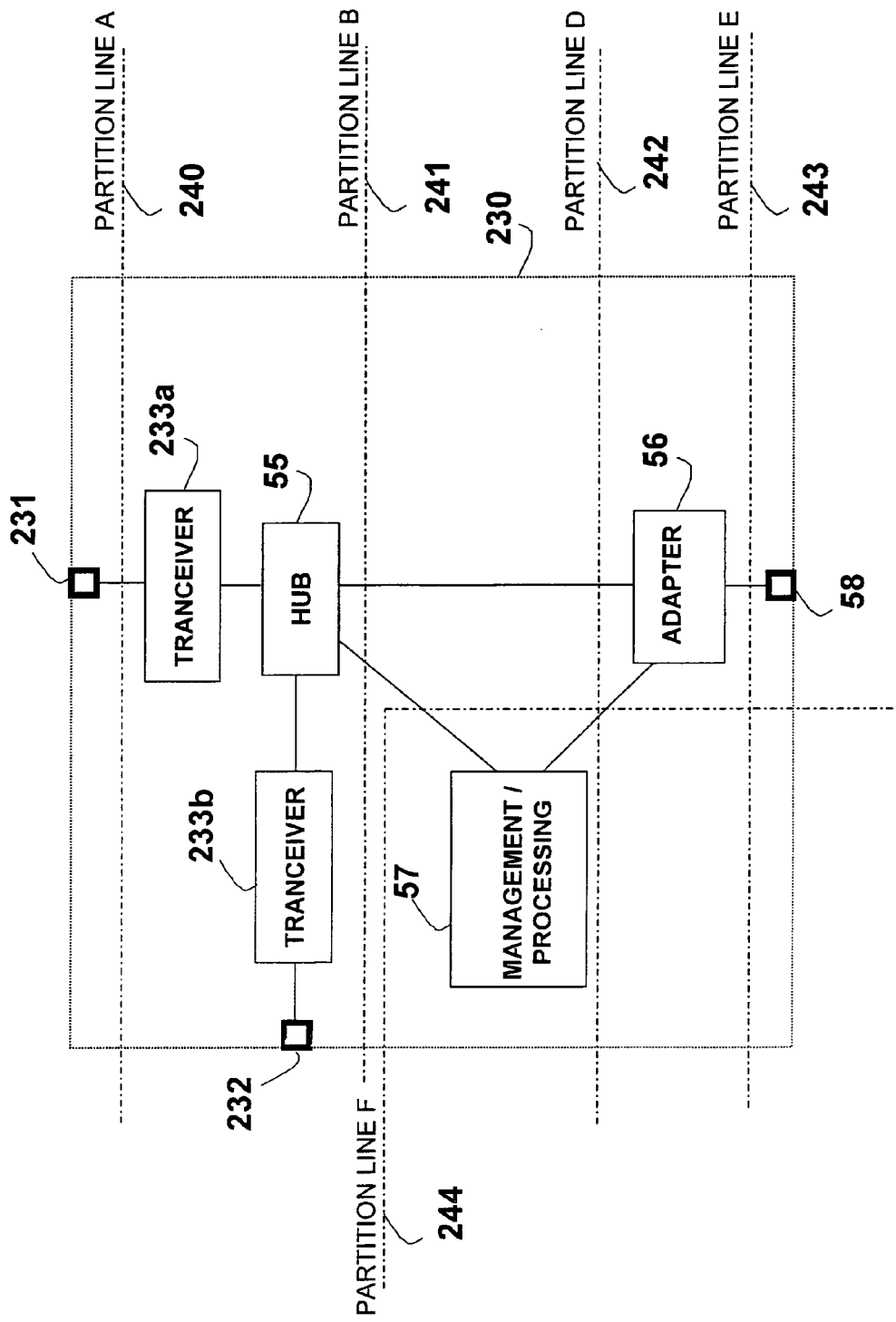
FIG. 24 shows multiple partitions of a block diagram of an exemplary outlet over LAN wiring.

Similar to the discussion above, various partitions may be applied to network outlet 230. As shown in FIG. 24, partition line 240 of partition A, partition line 241 of partition B, partition line 242 of partition D, partition line 243 of partition E or partition line 244 of partition F may be applied to outlet 230. The above pictorial views can equally apply to these partitions, wherein the basic service connector is also a network interface, such as RJ-45 Ethernet IEEE802.3 10/100/1000BaseT connector. Each such partition involves a set of mating connectors and mechanical fixtures to enable electrical connection and mechanical attachment of the formed modules.

General

Figure 25:
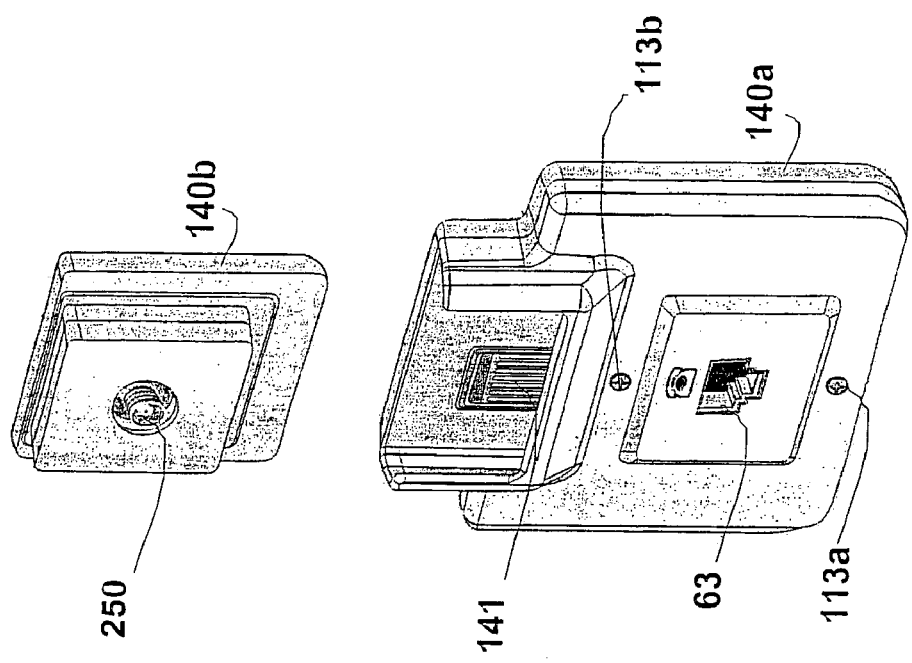
FIG. 25 shows a front pictorial view of an exemplary outlet over telephone wiring supporting video interface according to the present invention.
Figure 26:
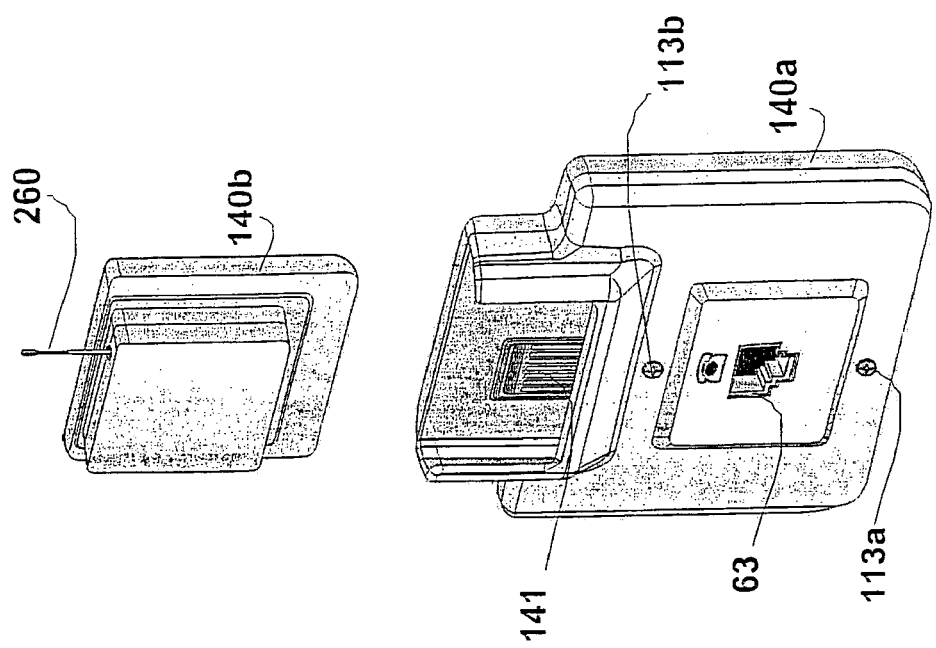
FIG. 26 shows a front pictorial view of an exemplary outlet over telephone wiring supporting radio-frequency based interface according to the present invention.

While the invention has been described with regard to digital interfaces, it will be appreciated that the invention equally applies to an outlet wherein the adapter 56 converts to analog signal interface, such as audio or video, as well as analog sensor or analog actuator. Active outlets comprising a built-in analog converter are described for example in WO 03/039150 to the present inventor published May 8, 2003 and entitled: "Outlet with Analog Signal Adapter, A Method for Use Thereof and a Network Using Said Outlet". An example of pictorial view of outlet 140 shown in FIG. 14a with video interface is shown in FIG. 25. Data connector 58 comprised in module 140b of FIG. 14a is substituted with video connector (F-Type) 250 shown in FIG. 25. The relevant adapter 56 will include analog to digital (or digital to analog or both) functions. It should be noted that connector 250 is part of the interface module 140b and relates to video (or any analog signal) carried in digital form over the network, and should be distinguished from connector 83 of base module 185a of FIG. 18b, wherein the video is the basic service and thus carried in analog form over the network While the invention has been described with regard to wired and connector-based interface 58, it will be appreciated that the invention equally applies to an outlet wherein a data unit uses non-wired interface, such as audio, light (e.g. infrared) and radio frequency (commonly referred to as wireless). Such outlet is described in WO 01/80543 Published Oct. 25, 2001 to the present inventor, titled: "Network Combining Wired and Non-Wired Segments". In such a case, the connector 58 will be substituted with non-wired transceiver, such as light emitter/receiver or antenna for RF. An example of pictorial view of outlet 140 as shown in FIG. 14a with wireless interface is shown in FIG. 26. The data connector 58 in module 140b of FIG. 14a is substituted with an antenna 260 shown in FIG. 26.

While the invention has been described with regard to outlets having a single network interface (e.g. single connector 58), it will be appreciated that the invention equally applies to the case wherein multiple network interfaces are supported. Furthermore, mix of interface types may be employed, such as wired digital, wired analog and non-wired interfaces all in the same outlet. Similarly, while the invention has been described with regard to outlets having single basic service connection, such as telephone connector 63, power connector 73, CATV connector 83 or data network connector 232, it will be appreciated that the invention equally applies to the case wherein multiple such connections are provided.

While the invention has been described with regard to outlets having a single interface module, such as module 130b of outlet 130 or module 140b or outlet 140, it will be appreciated that the invention equally applies to the case wherein multiple interface modules are used with a single base module or wherein multiple base modules are used with single interface module.

While the invention has been described with regard to partitions requiring only a pair of mating connectors to allow for electrical connection, good engineering practice may require additional interface electronics to support the connection. One such embodiment comprises a set of line drivers and line receivers to enable good communication between the modules. In addition, short protection circuits, live-insertion and other connection-associated means may also be employed.

While the invention has been described with regard to outlets and networks based on conductive media such as wires and cables, it will be appreciated that the invention equally applies to the case wherein the network medium is non-conductive, such as fiber-optical cabling. In such a case, transceiver 233a of outlet 230 should be substituted with a fiber optic transceiver and similarly wiring connector 231 should be replaced by a fiber optic connector. Active outlets supporting data interfaces and based on fiber optic cabling are described in U.S. Patent Application US 2002/0146207 Published Oct., 10 2002 to Chu, titled: Fiber Converter Faceplate Outlet", as well as in U.S. Pat. No. 6,108,331 to Thompson titled: "Single Medium Wiring Scheme for Multiple Signal Distribution in Building and Access Port Therefor". As such, the term wiring in this application should be interpreted to include networks based on non-conductive medium such as fiber-optics cabling.

Mechanics.

In order to allow the base module and the interface module to jointly form a complete outlet, the interface module should be mechanically attached to the base module. Such mechanical attachment should also effect a proper coupling between the two mating connectors, thus allowing for good electrical connection. The pictorial views above show side rails 115a and 115b into which the interface module slides as the mechanical attachment means, and wherein surface mating connectors type are used. However, it will be appreciated that the invention equally applies to the case wherein other means of mechanical attachment are used and wherein other types of mating connectors are employed. Moreover, some connectors are designed to provide mechanical support and thus can be also aid in the mechanical aspect, added to the electrical function. In all cases, the mechanical arrangement should allow for easy installation and replacement of interface modules.

Figure 27:
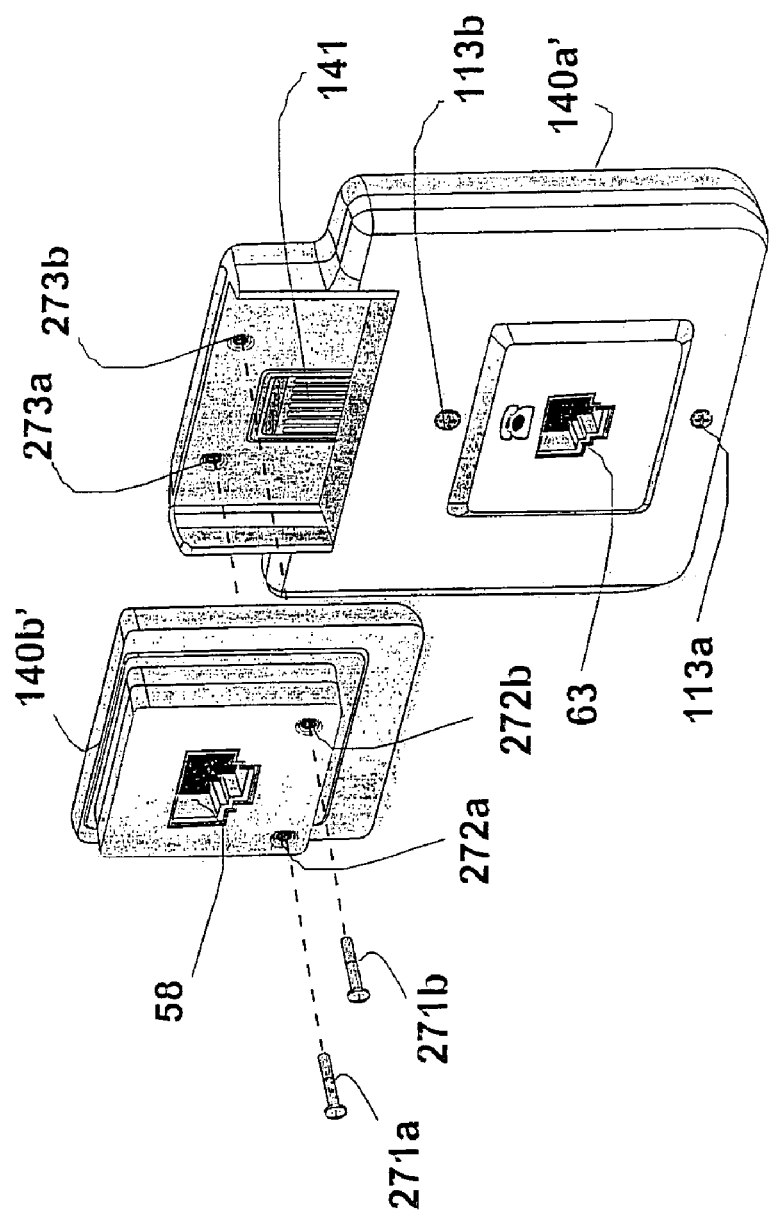
FIG. 27 shows a front pictorial view of an exemplary outlet over telephone wiring wherein the interface module is front attached and screws secured to the base module according to the present invention.

One such alternate attachment is shown in FIG. 27. Telephone outlet 140 is pictorially shown, supporting functionality similar to FIG. 14 above. As shown in the figure, the interface module 140b' is attached to base module 140a' by means of two screws. The two screws 271a and 271b pass through the respective holes 272a and 272b in the interface module 140b' and respectively fit into 273a and 273b thread embedded in the base module 140a'.

Figure 28:
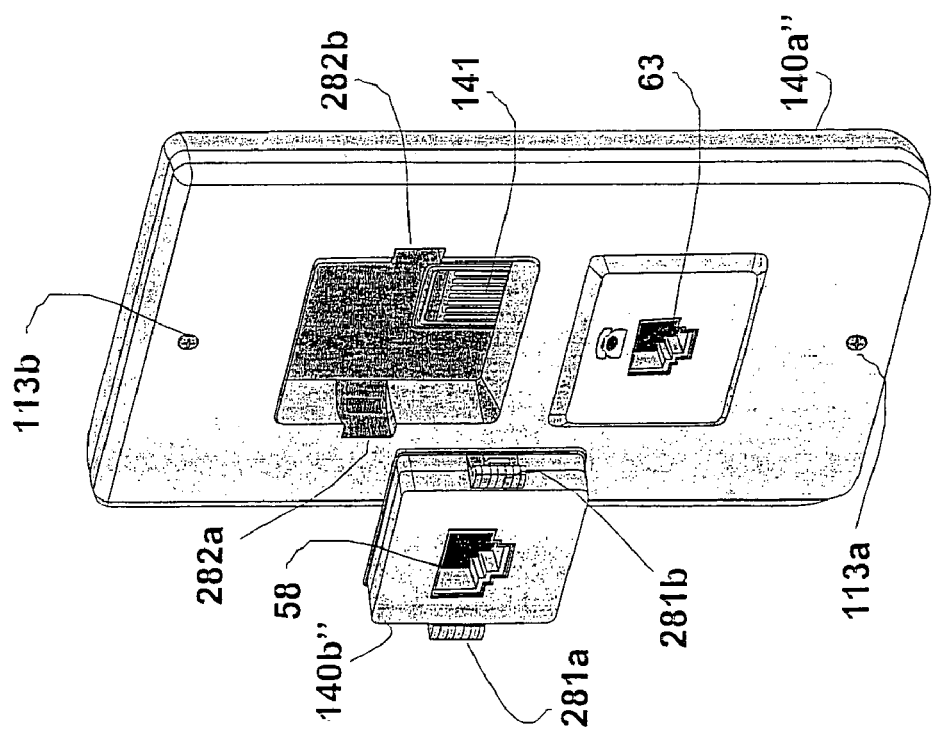
FIG. 28 shows a front pictorial view of an exemplary outlet over telephone wiring wherein the interface module is front-side loaded and snap-in attached to the base module according to the present invention.

Another mechanical attachment concept is illustrated in FIG. 28, with regard to outlet 140 modules 140a" and 140b". The attachment makes use of resiliently biased latches 281 and 281b located over the interface module 140b". Upon inserting the interface module 140b" onto the respective cavity in the base module 140a", the latches lock into their respective receptacles 282a and 282b to form a rugged connection between the modules. Both arrangements of FIGS. 27 and 28 also demonstrate front module loading rather than top loading described above.

Standard Expansion Module.

Expansion modules are known in the art and are widely used for adding capacity and functionality to personal computers and other electronic equipment (such as PDAs). Examples of such expansion modules include communication cards to allow electrical communication to be established between electronic devices or to allow electronic devices to be connected. The communications cards, for example, are commonly used with modems, fax/modems, Local Area Network (LAN) adapters and cellular telephone equipment. Other examples of expansion modules include additional memory, processing power and peripheral devices interfaces. The typical expansion module is designed to plug into a port, slot, or socket of a host computing device, and uses a bus structure for data interface with the computing unit. Such expansion modules are typically built in accordance with prescribed physical and electrical standards, so as to insure compatibility between different manufacturers. Examples of such industry standards are PCMCIA, ISA, EISA, PCT.

Figure 29:
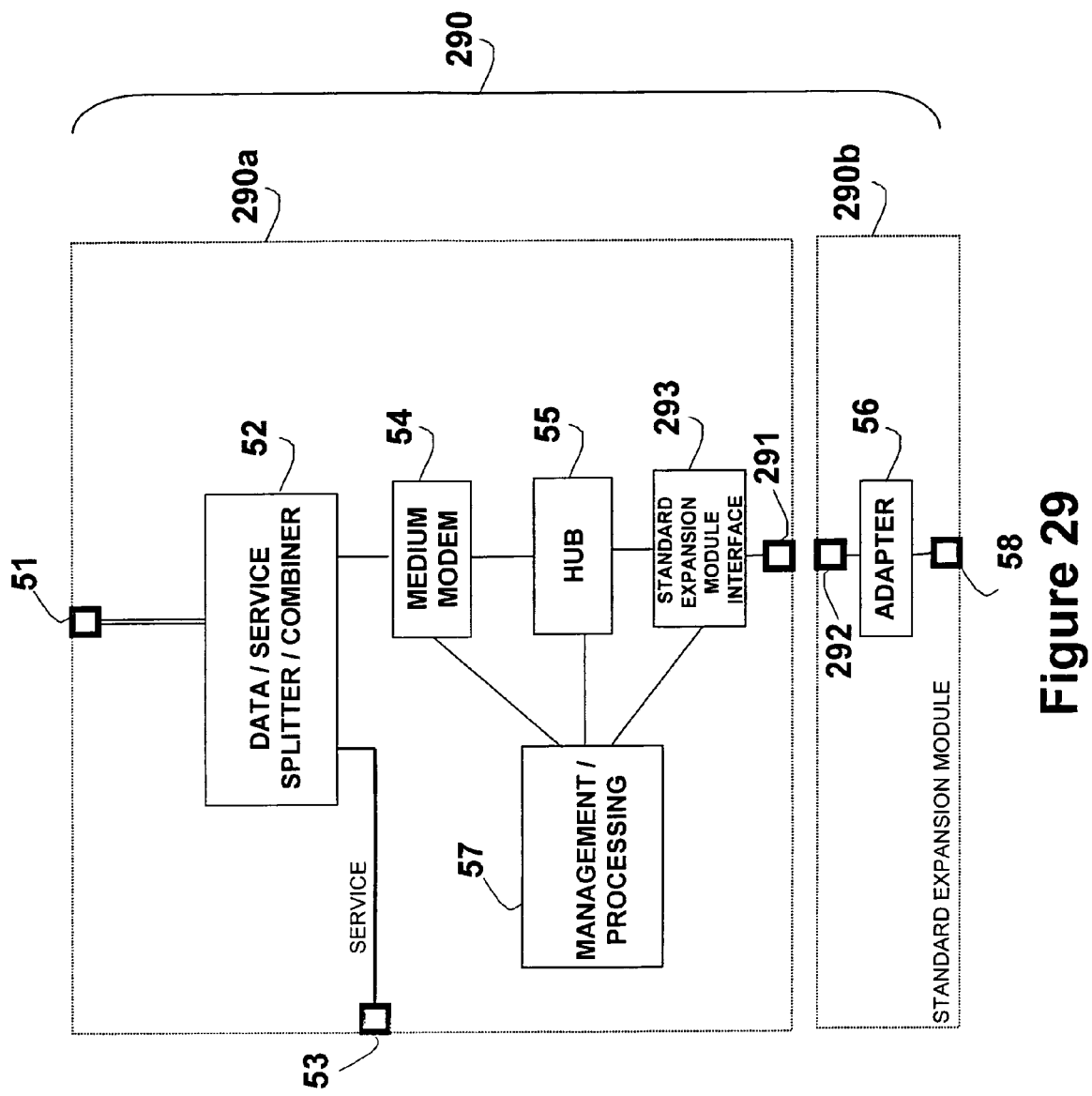
FIG. 29 shows a block diagram of an exemplary outlet wherein the interface module is a standard expansion module according to the present invention.

While the invention has been described with regard to general interface modules, it will be appreciated that the invention equally applies to the case wherein the interface module is an expansion module and the physical and electrical specifications adhere to industry standards. FIG. 29 shows an outlet 290 based on the adapter from outlet 180 of FIG. 18 to support standard expansion module as the interface module. Interface module 180b of the outlet 180 is implemented by a standard expansion module 290b, which interfaces to a base module 290a, being a modified version of the base module 180a of the outlet 180. The two modules are connected via connectors 291 and 292, conforming to the expansion module connector specifications. In most cases, the base module 290a should also include a standard expansion module interface (not shown), supporting the electrical and functional specifications of the interface and conforming to the standard expansion module interface 293 in the expansion module 290b.

Figure 30B:
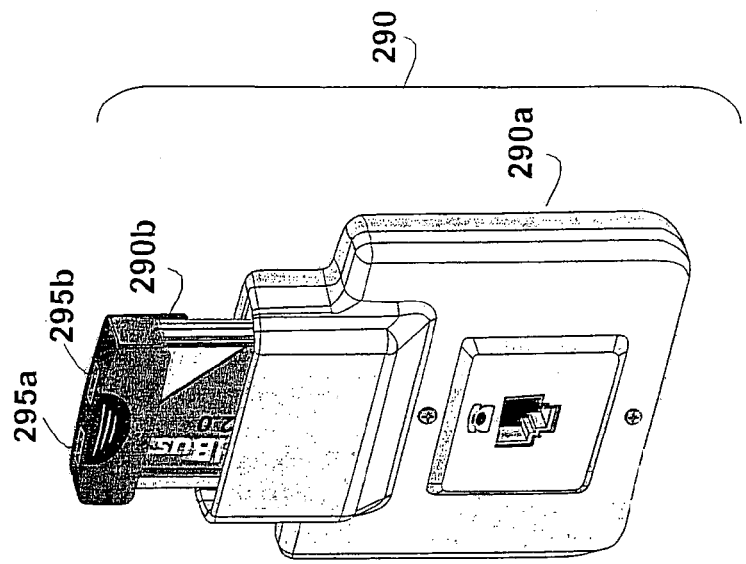
FIGS. 30a and 30b show a front pictorial view of an exemplary outlet over telephone wiring wherein the interface module is a USB PCMCIA-based expansion module according to the present invention.
Figure 30A:
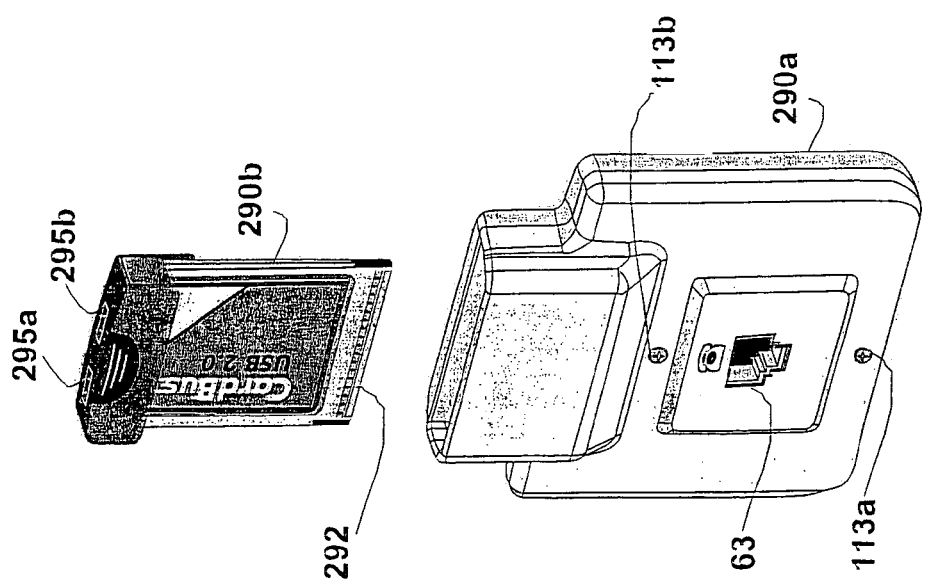
Figure 31B:
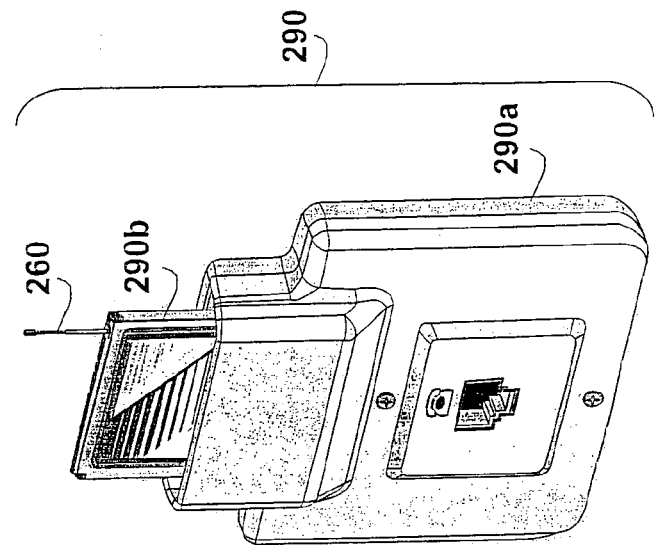
FIGS. 31a and 31b show a front pictorial view of an exemplary outlet over telephone wiring wherein the interface module is a wireless PCMCIA-based standard expansion module according to the present invention.
Figure 31A:
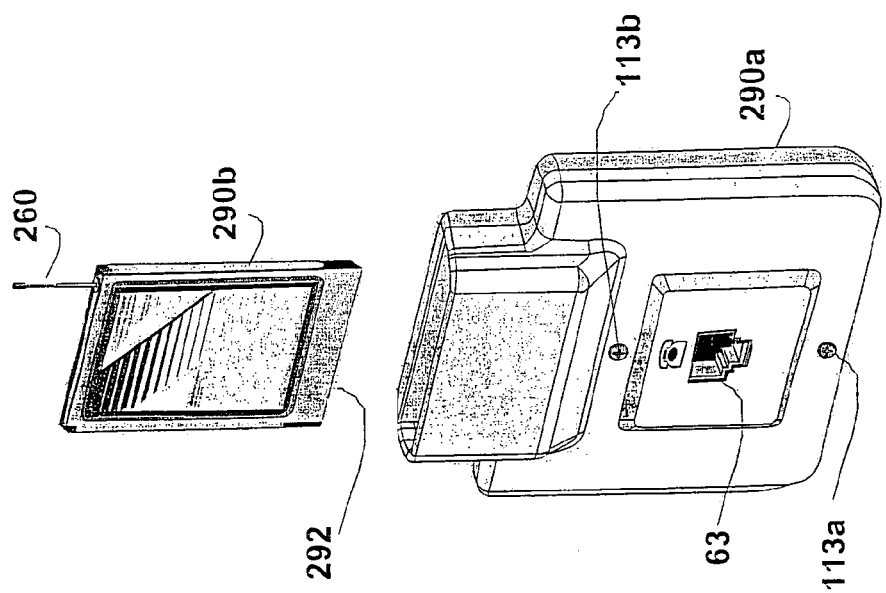

A pictorial view of outlet 290 is shown in FIGS. 30a and 30b, wherein the PCMCIA standard is used. The interface module 290b is shown to be the market available standard USB 2.0 PCMCIA card, which fits mechanically and electrically on to the base module 290a. PCMCIA connector 292 is shown on the expansion module 290b. The expansion card shown provides two USB 2.0 interfaces via USB connectors 295a and 295b. Similarly, the expansion card 290b can implement any functionality, such as memory, processing and connectivity, either wired or non-wired. An example of wireless connectivity is shown in FIGS. 31a and 31b, wherein antenna 260 is also shown as part of the expansion module 290b.

Figure 31D:
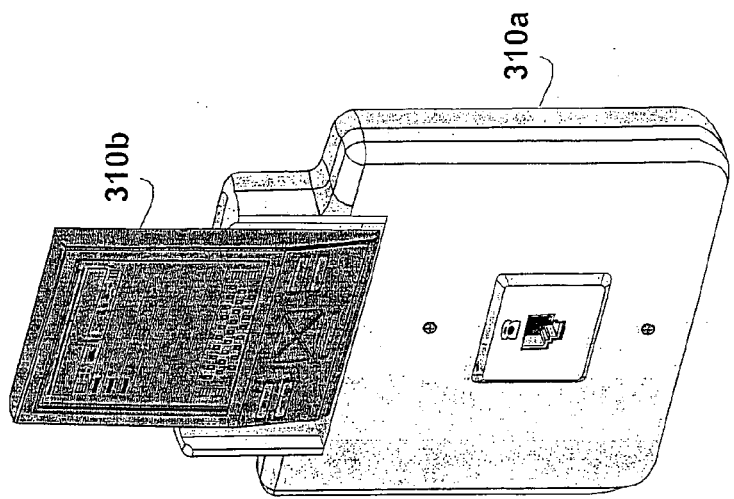
FIGS. 31c and 31d show a front pictorial view of an exemplary outlet over telephone wiring, wherein the interface module is a PDA according to the present invention.
Figure 31C:
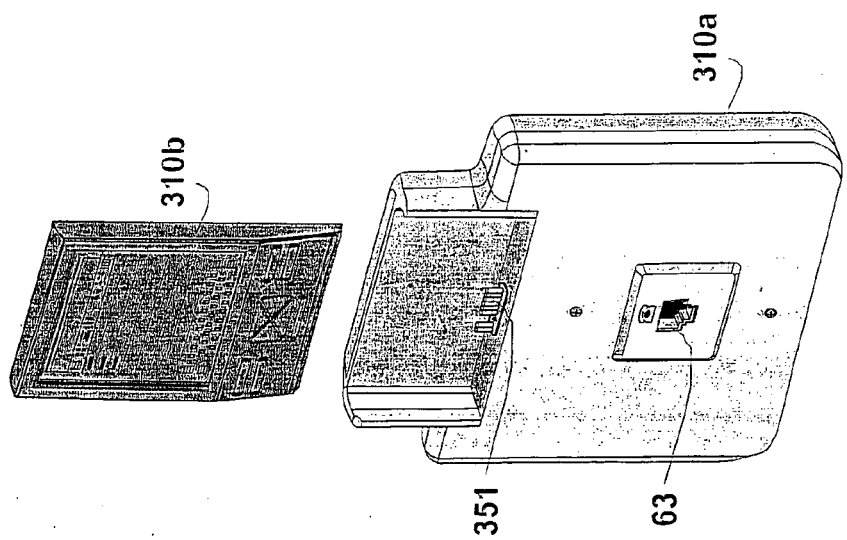

While the invention has been described with regard to standard modules, wherein the base module serves as virtual host and provides host interface, it will be appreciated that the invention equally applies to the case wherein the host interface is part of the interface module, and the base module comprises the expansion card interface. In such configuration, data units such as Personal Digital Assistants (PDA) or cellular phones or any other small data unit can be used as interface module, and couple the network signal carried over the wiring. Such example is pictorially shown in FIGS. 31c and 31d. In FIG. 31c, the base module 310a is similar to base module 290a, with the exception of connector 351 being expansion card type of connector, allowing for mating with the connector on the PDA 310b. FIG. 31d shows the modules attached to form full functioning outlet.

Base Module Powering.

With the exception of partition line A, in most implementations the base module includes active components, and as such needs to be powered. Three non limiting power sources as described hereinafter include local feeding, power over wiring and via the interface module.

Local Feeding.

Figure 32A:
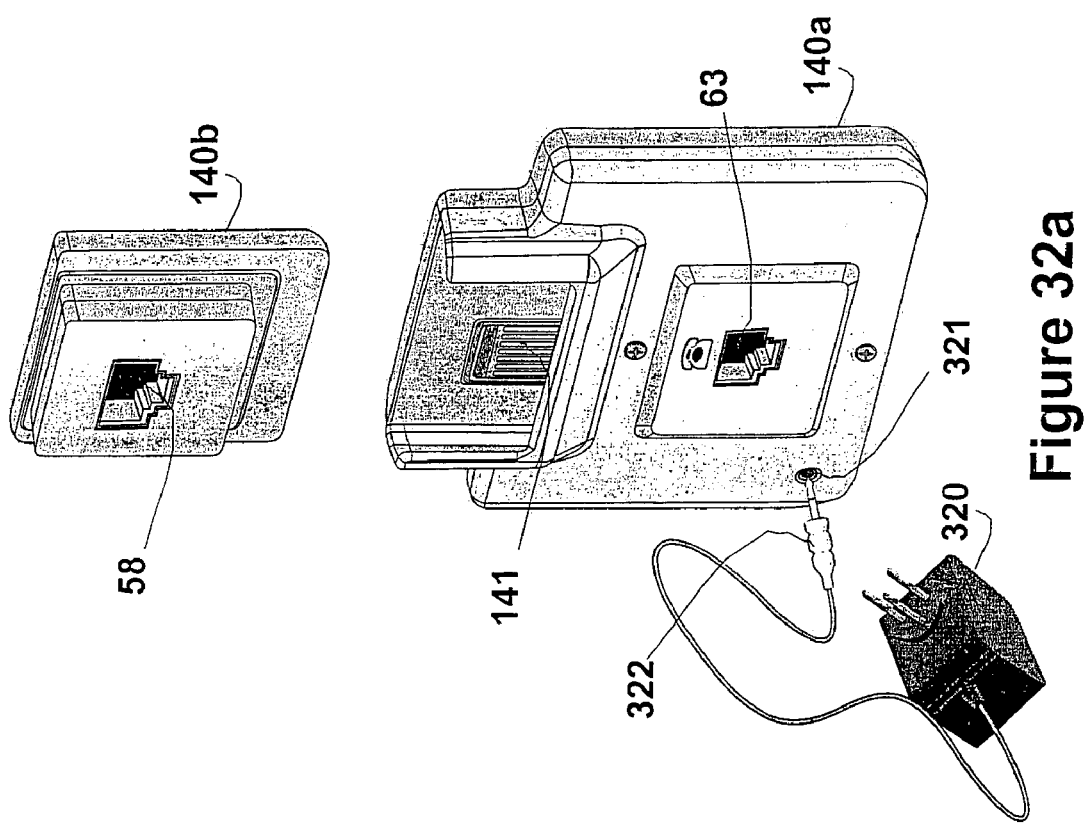
FIGS. 32a and 32b show a front pictorial view of an exemplary outlet over telephone wiring, wherein the base module is fed by an external AC/DC converter according to the present invention.
Figure 32B:
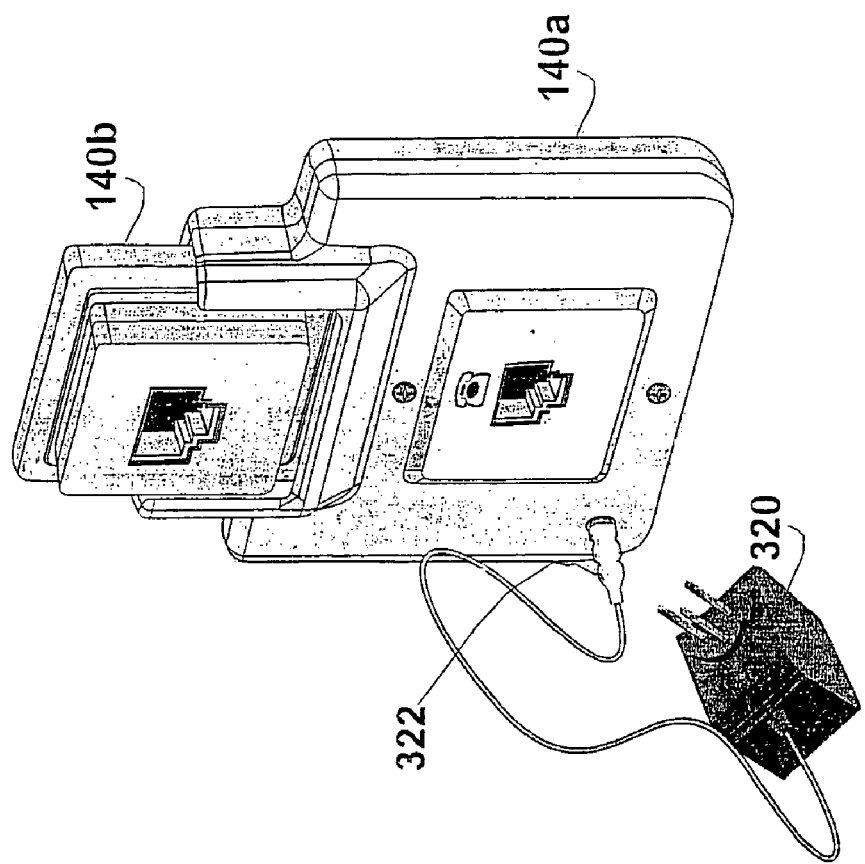

In this implementation the base module is connected to a power source which feeds its active components. A pictorial view of such a mechanism is shown in FIGS. 32a and 32b. A common small AC/DC converter 320 is used, connected to the base module via plug 322 and respective jack 321 on the base module. FIG. 32b shows the outlet with the adapter inserted into the base module.

Figure 33:
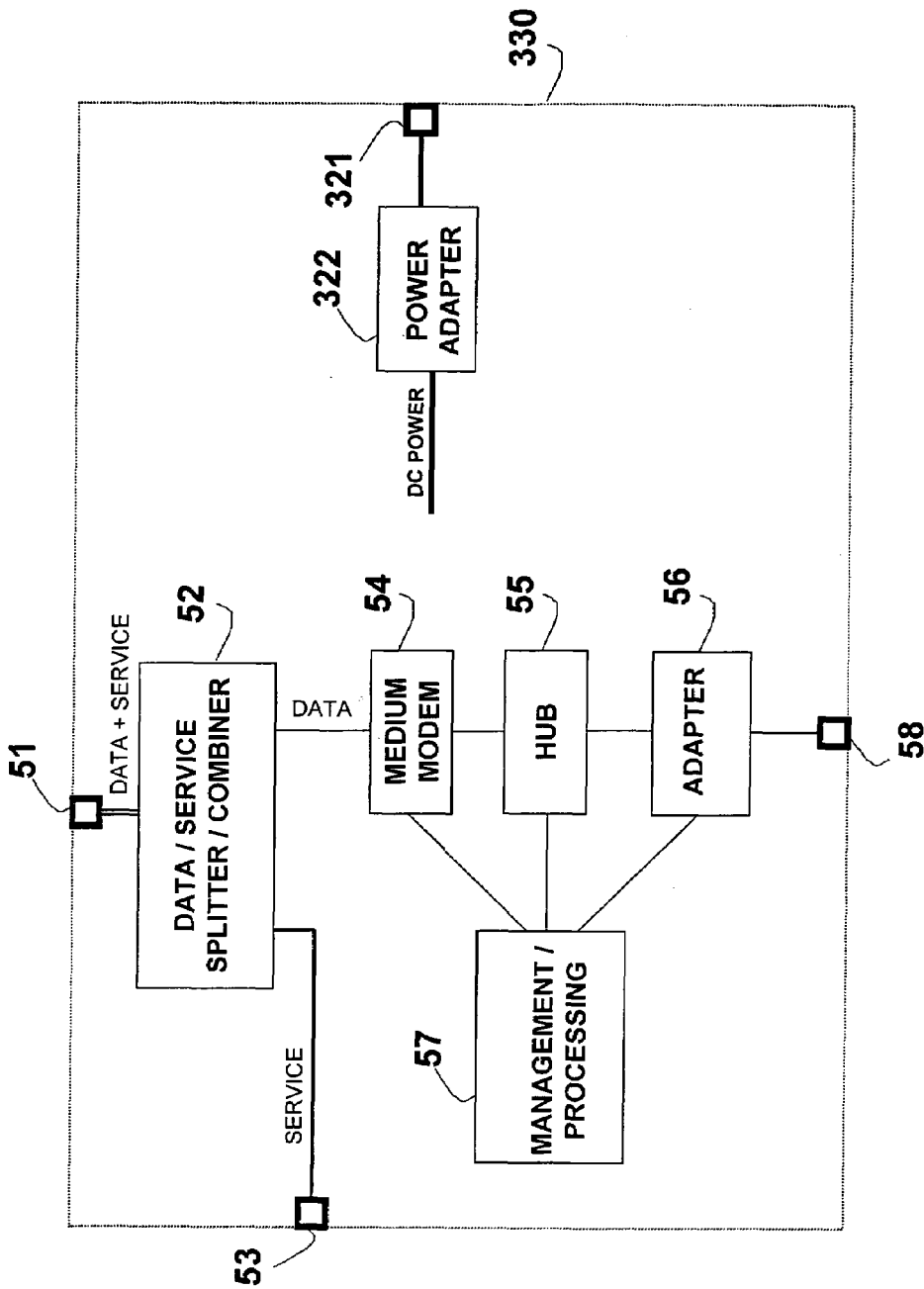
FIG. 33 shows a block diagram of an exemplary outlet wherein the outlet is power fed by external dedicated power source according to the present invention.

A power adapter may be used in the base module, for adapting the external power to the internal needs. Such adapter may include voltage conversion (such as DC to DC converter) in order to adapt to specific voltages required, protection circuits (such as fuse or current limiting), regulation and noise filtration, as well as other functionality as known in the art. In addition, such adapter may comprise an external AC/DC converter 320, allowing the base module to be directly connected to the mains. An outlet 330, based on outlet 80 above, comprising such power adapter function 322 is shown schematically in FIG. 33. The power adapter is fed from an external source via connector 321, and outputs the required DC power to all power-fed components in the base outlet. While outlet 330 shows a complete non-partitioned outlet, it should be apparent that in each relevant partition discussed above, the power adapter 322 and its respective connector 321 are part of the base outlet.

Power Over Wiring.

In this embodiment, the base module is fed by power carried over the wiring to which the outlet is connected. The power may be carried over separated conductors. In this case, the same wiring connector 51 may be used to connect to the power carrying conductors using separated pins. Alternatively, additional power dedicated connector may be used.

Figure 34:
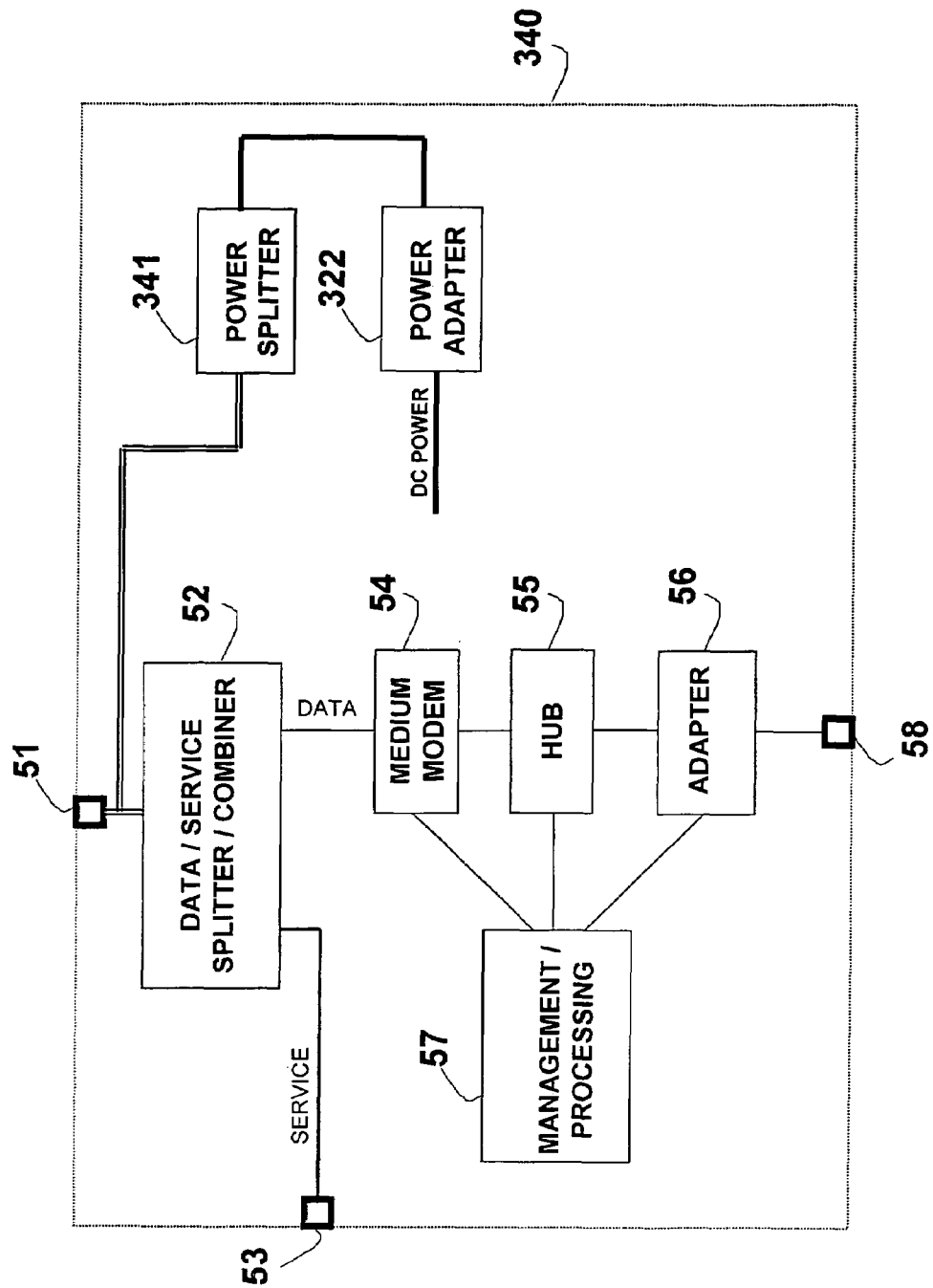
FIG. 34 shows a block diagram of an exemplary outlet wherein the outlet is power fed by power carried over the wiring according to the present invention.

In one preferred embodiment, the power is carried simultaneously over the wiring carrying the data network signals and/or the basic service signal. Such an outlet 340 is shown schematically in FIG. 34. The power splitter function 341 serves to extract the power carried over the wiring, and feed it to the power adapter 322, rather than the adapter 322 being externally fed. In most cases, the power splitter 341 operation should not interfere with the data and basic service also carried over the same wiring (e.g. loading effects and impedance matching).

The implementation of such a mechanism is trivial wherein the basic service is AC power as described above with respect to outlet 70 shown in FIG. 7. The power splitter 341 comprises a simple filter and the power adapter 322 comprises a standard AC/DC converter (similar to the external unit 320 described above).

Recent techniques developed allow for carrying simultaneously power and basic service (and data) over the same wiring infrastructure. U.S. patent publication 20020003873 to Rabenko et al. titled: "System and method for providing power over a home phone line network" teaches carrying AC power over telephone wiring carrying both telephony and data, by using a part of the spectrum not used by the other signals. Similarly, a recent technique known as Power over Ethernet (PoE) (a.k.a. Power over LAN) and standardized under IEEE802.3af, also explained in U.S. Pat. No. 6,473,609 to Lehr et al. titled: "Structure Cabling System", describes a method to carry power over LAN wiring, using the phantom mechanism. The above technologies, as well as others, may be used to provide power to any of the base modules described above.

Powering Via Interface Module.

In this embodiment the base module is fed from the interface module. Possible power sources for the interface module are described below. The above-described modules mating connectors used for data transfer may also be used for power transfer from the interface module to the base module. Alternatively, additional set of mating connectors may be used, dedicated for the power transfer between the modules.

Interface Module Powering.

With the exception of partition line E, in most implementations the interface module includes active components, and as such needs to be powered. Furthermore, some interfaces (such as USB or IEEE802.3af) require the interface to supply power to the connected data unit via the same data connector. Three non-limiting power sources examples include local feeding, power via the base module and via the data unit and are now described.

Local Feeding.

Similar to the description relating to the base module, the interface module may be powered from a local power source, using a dedicated power connector. Power adapter functionality may be required as explained above regarding the power adapter 322.

Powering Via the Base Module.

In this configuration the interface module is powered via the connection to the base module, either using power dedicated or by data and power connectors set. The power adapter 322 functionality may be shared and used by both modules or a dedicated power adapter function may be used independently by each module.

Powering Via the Data Unit.

As explained above, several data interface standards also carry power over the interface. For example, in the case where the interface module is connected to USB host unit, the USB interface may feed the interface module.

While the invention has been described with regard to single power source, it will be appreciated that the invention equally applies to the case wherein multiple power sources are used either for redundancy or load sharing.

Those of skill in the art will understand that the various illustrative logical blocks, modules and circuits described in connection with the embodiments disclosed herein may be implemented in any number of way including electronic hardware, computer software, or combinations of both. The various illustrative components, blocks, modules and circuits have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

What is claimed is:

1. An outlet constituting part of a local area network in a building for coupling a digital data signal to a detachable plug-in module and for coupling an analog CATV signal to an analog CATV set, the network including at least part of a CATV coaxial cable that is at least in part in walls of the building and is terminated at an outlet opening, the CATV coaxial cable being connected for carrying an analog CATV signal in an analog CATV frequency band frequency multiplexed with a bi-directional serial digital data signal in a digital data frequency band that is distinct from the analog CATV frequency band, said outlet comprising:
   a coaxial connector for connecting said outlet to the CATV coaxial cable;
   a CATV connector connectable to an analog CATV set for coupling the analog CATV signal to the analog CATV set;
   a first filter coupled between said coaxial connector and said CATV connector for substantially passing only signals in the analog CATV frequency band;
   a coaxial cable modem for bi-directional digital data signal communication with one or more additional modems of the same type as said coaxial cable modem over the CATV coaxial cable;
   a second filter coupled between said coaxial cable modem and said CATV connector for substantially passing only signals in the digital data frequency band;
   a power port connectable to receive a power signal from a power signal source;
   a power supply, including an AC/DC converter or a DC/DC converter, coupled between said power port and said coaxial cable modem for DC powering said coaxial cable modem by the power signal;
   a first connector for connecting to the plug-in module, the first connector being coupled to said power supply for DC powering the plug-in module, said first connector being coupled to said coaxial cable modem for communicatively coupling the plug-in module to the bi-directional digital data signal;
   attachment means to which the plug-in module is mechanically securable; and
   a single enclosure housing said first and second filters, said coaxial cable modem, said coaxial connector, said CATV connector, said first connector and said attachment means,
wherein:
   said single enclosure is mountable into a wall opening or an outlet cavity;
   said first connector and said attachment means cooperatively form an industry standard interface; and
   said outlet is addressable in the local area network.

2. The outlet according to claim 1, further comprising a second connector, in said single enclosure, coupled to said power port for receiving power from the power signal source.

3. The outlet according to claim 1, wherein said industry standard interface is a Personal Computer (PC) expansion slot.

4. The outlet according to claim 3, wherein said PC expansion slot is one of: a PCMCIA slot; an ISA slot; an EISA slot; and a PCI slot.

5. The outlet according to claim 1, wherein:
   the plug-in module is a handheld unit; and
   said industry standard interface is adapted to dock and communicate with the handheld unit.

6. The outlet according to claim 5, wherein the handheld unit is a Personal Digital Assistant (PDA) or a cellular telephone.

7. The outlet according to claim 1, wherein said attachment means is at least one of: a guiding rail; a screw; a latch; and a connector body.

8. The outlet according to claim 1, wherein said industry standard interface is further adapted to provide live-insertion and short circuit protection.

9. The outlet according to claim 1, further comprising at least one of an analog to digital converter and a digital to analog converter, for converting between analog and digital signals, coupled between said first connector and said coaxial cable modem for providing an analog connection to the plug-in module.

10. The outlet according to claim 1, wherein said coaxial cable modem is a HomePNA modem.

11. The outlet according to claim 1, further comprising:
   a data connector for connecting to a data unit; and
   a data transceiver coupled between said data connector and said coaxial cable modem and operative to effect bi-directional digital data communication with the data unit.

12. The outlet according to claim 11, wherein said data connector is an RJ-45 connector, and communication with the data unit is based on Ethernet IEEE802.3-2002 10BaseT, or 100BaseTX, or 1000BaseT.

13. The outlet according to claim 11, wherein said data connector and communication with the data unit are based on one of USB, IEEE1284-1994, and IEEE1394-1995 standard.

14. The outlet according to claim 11, further comprising a multi-port unit coupled between said coaxial cable modem, said data transceiver and said first connector, said multi-port unit constituting one of: a hub; a switch; a router; and a gateway.

15. The outlet according to claim 11, wherein said outlet further supports at least one of: traffic management; Quality-of-Service (QoS) measurement; performance management; configuration management; accounting management; fault management; and security management.

16. The outlet according to claim 1, further comprising a non-wired transceiver coupled to be powered from said power supply, for non-wired bi-directional digital data communication with a non-wired data unit.

17. The outlet according to claim 16, wherein the non-wired communication with the non-wired data unit is carried out with a communication medium using one of: light; infrared radiation; acoustic energy; and radio frequency energy.

18. The outlet according to claim 1, wherein said single enclosure is constructed to have at least one of the following:
   a form substantially similar to that of a standard outlet;
   wall mounting elements substantially similar to those of a standard wall outlet;
   a shape allowing direct mounting in an outlet opening or cavity; and
   a form to at least in part substitute for a standard outlet.

19. An outlet constituting part of a local area network in a building for coupling a digital data signal to a detachable plug-in module and for coupling an AC power signal to an AC powered appliance, the network including at least part of an AC power wiring that is at least in part in walls of the building and is terminated at an outlet opening, the AC power wiring being connected for carrying an AC power signal at an AC power frequency, frequency multiplexed with a bi-directional serial digital data signal in a digital data frequency band that is distinct from and higher than the AC power frequency, said outlet comprising:

an AC power wiring connector for connecting said outlet to the AC power wiring;

an AC socket for connecting to an AC powered appliance for coupling the AC power signal to the AC powered appliance;

a low-pass filter coupled between said AC power wiring connector and said AC socket for substantially passing only the AC power signal at the AC power frequency;

a powerline modem for bi-directional digital data signal communication with one or more additional modems of the same type as said powerline modem over the AC power wiring;

a high-pass filter coupled between said powerline modem and said AC power wiring connector for substantially passing only signals in the digital data frequency band;

a power supply, including an AC/DC converter, coupled between said low pass filter and said powerline modem for DC powering said powerline modem by the AC power signal;

a first connector for connecting to the plug-in module, the first connector being coupled to said power supply for DC powering the plug-in module, said first connector being coupled to said powerline modem for communicatively coupling the bi-directional digital data to the plug-in module;

attachment means to which the plug-in module is mechanically securable; and a single enclosure housing said low pass and high pass filters, said powerline modem, said AC socket, said AC power wiring connector, said power supply, said first connector and said attachment means, wherein:

said single enclosure is mountable into a wall opening or outlet cavity;

said first connector and said attachment means cooperatively form an industry standard interface; and said outlet is addressable in the local area network.

20. The outlet according to claim 19, wherein said industry standard interface is a Personal Computer (PC) expansion slot.

21. The outlet according to claim 20, wherein said PC expansion slot is one of: a PCMCIA slot; an ISA slot; an EISA slot; and a PCI slot.

22. The outlet according to claim 19, wherein:
the plug-in module is a handheld unit; and
said industry standard interface is adapted to dock and communicate with the handheld unit.

23. The outlet according to claim 22, wherein the handheld unit is a Personal Digital Assistant (PDA) or a cellular telephone.

24. The outlet according to claim 19, wherein said attachment means is at least one of: a guiding rail; a screw; a latch; and a connector body.

25. The outlet according to claim 19, wherein the industry standard interface is further adapted to provide live-insertion and short circuit protection.

26. The outlet according to claim 19, further comprising is at least one of an analog to digital converter and a digital to analog converter, for converting between analog and digital signals, coupled between said first connector and said powerline modem for providing an analog connection to the plug-in module.

27. The outlet according to claim 19, further comprising:
a data connector for connecting to a data unit; and
a data transceiver coupled between said data connector and said powerline modem and operative to effect bi-directional digital data communication with the data unit.

28. The outlet according to claim 27, wherein said data connector is an RJ-45 connector, and communication with the data unit is based on Ethernet IEEE802.3-2002 10BaseT, or 100BaseTX, or 1000BaseT.

29. The outlet according to claim 27, wherein said data connector and communication with the data unit are based on one of USB, IEEE1284-1994, and IEEE1394-1995 standard.

30. The outlet according to claim 27, further comprising a multi-port unit coupled between said powerline modem, said data transceiver and said first connector, said multi-port unit constituting one of: a hub; a switch; a router; and a gateway.

31. The outlet according to claim 30, wherein said outlet further supports at least one of: traffic management; Quality-of-Service (QoS) measurement; performance management; configuration management; accounting management; fault management; and security management.

32. The outlet according to claim 19, further comprising a non-wired transceiver coupled to be powered from said power supply, for non-wired bi-directional digital data communication with a non-wired data unit.

33. The outlet according to claim 32, wherein the non-wired communication with the non-wired data unit is carried out with a communication medium using one of: light; infra-red radiation; acoustic energy; and radio frequency energy.

34. The outlet according to claim 19, wherein said single enclosure is constructed to have at least one of the following:
a form substantially similar to that of a standard outlet;
wall mounting elements substantially similar to those of a standard wall outlet;
a shape allowing direct mounting in an outlet opening or cavity; and
a form to at least in part substitute for a standard outlet.

35. An outlet constituting part of a local area network in a building for coupling a digital data signal to a detachable plug-in module, the network including at least part of a local area network wiring that is at least in part in walls of the building and is terminated at an outlet opening, the local area network wiring being connected for carrying a DC power signal and a bi-directional serial digital data signal over the same wires, said outlet comprising:

a wiring connector for connecting said outlet to the local area network wiring;

a LAN transceiver for bi-directional digital data signal communication with one or more additional modems of the same type as said LAN transceiver over the local area network wiring;

a power supply, including a DC/DC converter, coupled between said wiring connector and said LAN transceiver for DC powering said LAN transceiver by the DC power signal;

a first connector for connecting to the plug-in module, the first connector being coupled to said power supply for DC powering the plug-in module, said first connector being coupled to said LAN transceiver for communicatively coupling the bi-directional digital data to the plug-in module;

attachment means to which the plug-in module is mechanically securable; and a single enclosure housing said LAN transceiver, said wiring connector, said power supply, said first connector and said attachment means, wherein:

said single enclosure is mountable into a wall opening or an outlet cavity;

said first connector and said attachment means cooperatively form an industry standard interface; and said outlet is addressable in the local area network.

36. The outlet according to claim 35, wherein said industry standard interface is a Personal Computer (PC) expansion slot.

37. The outlet according to claim 36, wherein said PC expansion slot is one of: a PCMCIA slot; an ISA slot; an EISA slot; and a PCI slot.

38. The outlet according to claim 35, wherein:
the plug-in module is a handheld unit; and
said industry standard interface is adapted to dock and communicate with the handheld unit.

39. The outlet according to claim 38, wherein the handheld unit is a Personal Digital Assistant (PDA) or a cellular telephone.

40. The outlet according to claim 35, wherein said attachment means is at least one of: a guiding rail; a screw; a latch; and a connector body.

41. The outlet according to claim 35, wherein the industry standard interface is further adapted to provide live-insertion and short circuit protection.

42. The outlet according to claim 35, further comprising at least one of an analog to digital converter and a digital to analog converter, for converting between analog and digital signals, coupled between said first connector and said LAN transceiver for providing an analog connection to the plug-in module.

43. The outlet according to claim 35, further comprising:
a data connector for connecting to a data unit; and
a data transceiver coupled between said data connector and said LAN transceiver and operative to effect bi-directional digital data communication with the data unit.

44. The outlet according to claim 43, wherein said data connector is an RJ-45 connector, and communication with the data unit is based on Ethernet IEEE802.3-2002 10BaseT, or 100BaseTX, or 1000BaseT.

45. The outlet according to claim 43, wherein said data connector and communication with the data unit are based on one of USB, IEEE1284-1994, and IEEE1394-1995 standard.

46. The outlet according to claim 43, further comprising a multi-port unit coupled between said LAN transceiver, said data transceiver and said first connector, said multi-port unit constituting one of: a hub; a switch; a router; and a gateway.

47. The outlet according to claim 46, wherein said outlet further supports at least one of: traffic management; Quality-of-Service (QoS) measurement; performance management; configuration management; accounting management; fault management; and security management.

48. The outlet according to claim 35, further comprising a non-wired transceiver coupled to be powered from said power supply, for non-wired bi-directional digital data communication with a non-wired data unit.

49. The outlet according to claim 48, wherein the non-wired communication with the non-wired data unit is carried out with a communication medium using one of: light; infrared radiation; acoustic energy; and radio frequency energy.

50. The outlet according to claim 35, wherein said single enclosure is constructed to have at least one of the following:
a form substantially similar to that of a standard outlet;
wall mounting elements substantially similar to those of a standard wall outlet;
a shape allowing direct mounting in an outlet opening or cavity; and
a form to at least in part substitute for a standard outlet.

* * * * *

UNITED STATES PATENT AND TRADEMARK OFFICE
CERTIFICATE OF CORRECTION

PATENT NO. : 7,688,841 B2  
APPLICATION NO. : 11/514140  
DATED : March 23, 2010  
INVENTOR(S) : Binder Page 1 of 1

It is certified that error appears in the above-identified patent and that said Letters Patent is hereby corrected as shown below:

Title Page, Item (30) Foreign Application Priority Data delete "Jul. 9 2004  (IL)" and insert --Sep. 7, 2003  (IL)--.

Signed and Sealed this  
Fifth Day of June, 2012

David J. Kappos  
*Director of the United States Patent and Trademark Office*